(12) United States Patent
Matsui et al.

(10) Patent No.: US 7,740,026 B2
(45) Date of Patent: Jun. 22, 2010

(54) THERMAL STORAGE TYPE GAS TREATING APPARATUS

(75) Inventors: Yoshiaki Matsui, Tokyo (JP); Yuji Nagata, Tokyo (JP); Satoshi Horisawa, Tokyo (JP); Tomotaka Miwa, Tokyo (JP)

(73) Assignee: Taikisha Ltd., Tokyo (JP)

( * ) Notice: Subject to any disclaimer, the term of this patent is extended or adjusted under 35 U.S.C. 154(b) by 805 days.

(21) Appl. No.: 11/630,933

(22) PCT Filed: Jun. 28, 2005

(86) PCT No.: PCT/JP2005/011793

§ 371 (c)(1),
(2), (4) Date: Dec. 27, 2006

(87) PCT Pub. No.: WO2006/001437

PCT Pub. Date: Jan. 5, 2006

(65) Prior Publication Data

US 2008/0029001 A1 Feb. 7, 2008

(30) Foreign Application Priority Data

Jun. 28, 2004 (JP) ............................. 2004-189497
Sep. 29, 2004 (JP) ............................. 2004-284326
Dec. 24, 2004 (JP) ............................. 2004-373449

(51) Int. Cl.
*B01D 47/06* (2006.01)
*F17C 11/00* (2006.01)

(52) U.S. Cl. ....................... 137/311; 137/630.16; 165/7; 110/244

(58) Field of Classification Search ................ 137/311, 137/630.16, 628; 165/4, 7, 9; 110/244
See application file for complete search history.

(56) References Cited

U.S. PATENT DOCUMENTS

| 1,673,018 A | * | 6/1928 | Perdue ....................... 137/250 |
| 4,578,918 A | | 4/1986 | Yost et al. |
| 5,628,629 A | | 5/1997 | Mitani et al. |
| 6,274,097 B1 | | 8/2001 | Sefalidis et al. |
| 6,978,977 B2 | * | 12/2005 | Cash et al. ................... 137/311 |

FOREIGN PATENT DOCUMENTS

| JP | 60-75898 | 5/1985 |
| JP | 61-39598 | 4/1986 |
| JP | 06-257349 | 9/1994 |

(Continued)

*Primary Examiner*—Kevin L Lee
(74) *Attorney, Agent, or Firm*—The Webb Law Firm

(57) ABSTRACT

A thermal storage type gas treating apparatus has a high sealing performance while achieving a simple apparatus construction. The thermal storage type gas treating apparatus includes a valve member rotatable to place successively a supply port for a gas to be treated and an exhaust port for a treated gas formed in the valve member, in an opposed and communicating relationship with supply and exhaust ports formed in a distributor, thereby successively passing gas to be treated and treated gas through a plurality of thermal storage chambers communicating at one end with a combustion chamber. The valve member is supported to be displaceable toward and away from the distributor. A valve biasing device is provided for pressing the valve body to the distributor, while being inoperative with respect to a gas chamber device.

30 Claims, 46 Drawing Sheets

FOREIGN PATENT DOCUMENTS

| | | |
|---|---|---|
| JP | 06-343814 | 12/1994 |
| JP | 07-305824 | 11/1995 |
| JP | 08166124 | 6/1996 |
| JP | 09-053888 | 2/1997 |
| JP | 09-217918 | 8/1997 |
| JP | 10-061940 | 3/1998 |
| JP | 11-006616 | 1/1999 |
| JP | 11006616 | 1/1999 |
| JP | 11-230530 | 8/1999 |
| JP | 2001-074225 | 3/2001 |
| JP | 200107425 | 3/2001 |
| JP | 2001-304531 | 10/2001 |

\* cited by examiner

[Fig.1]
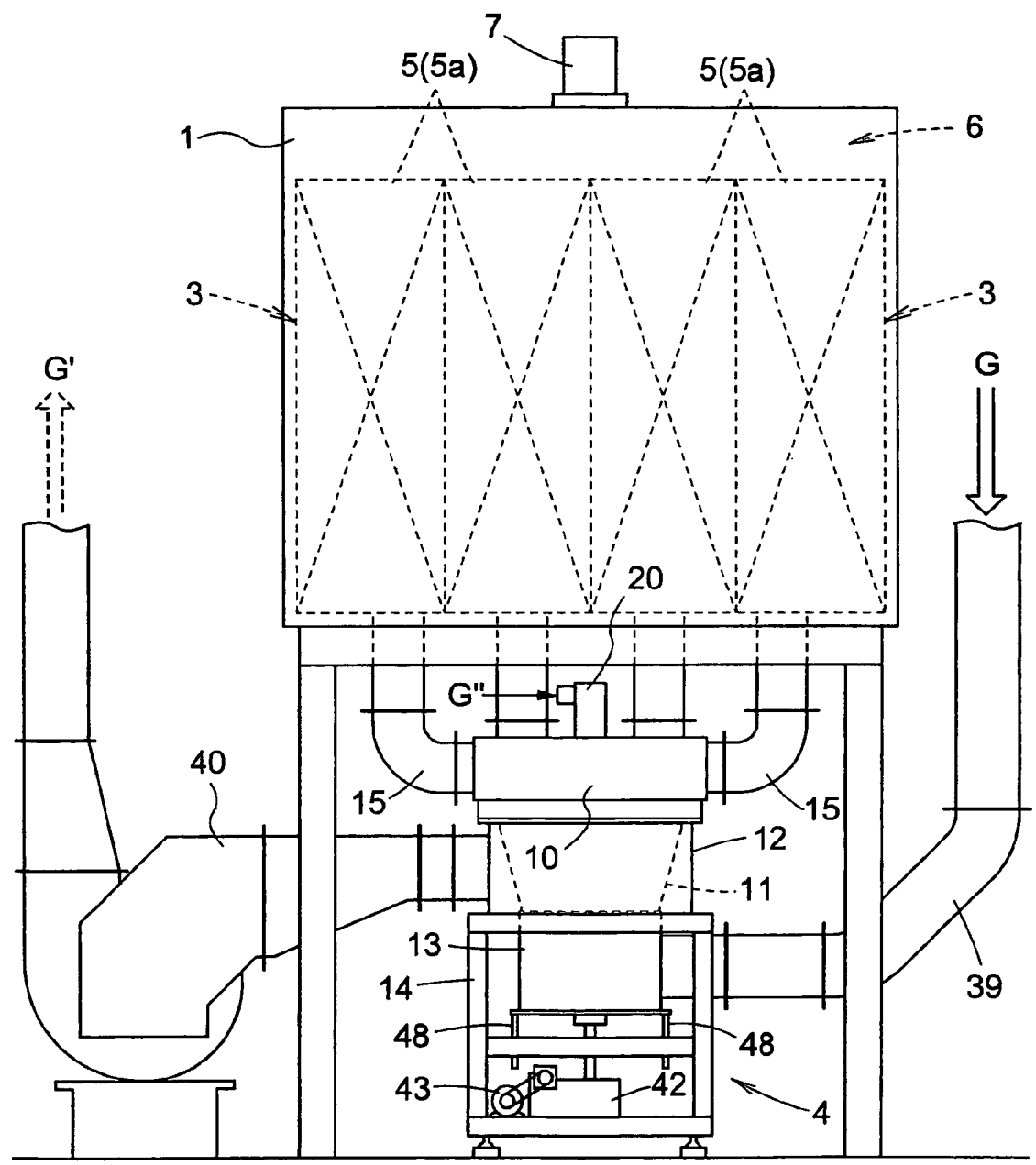

[Fig.2]
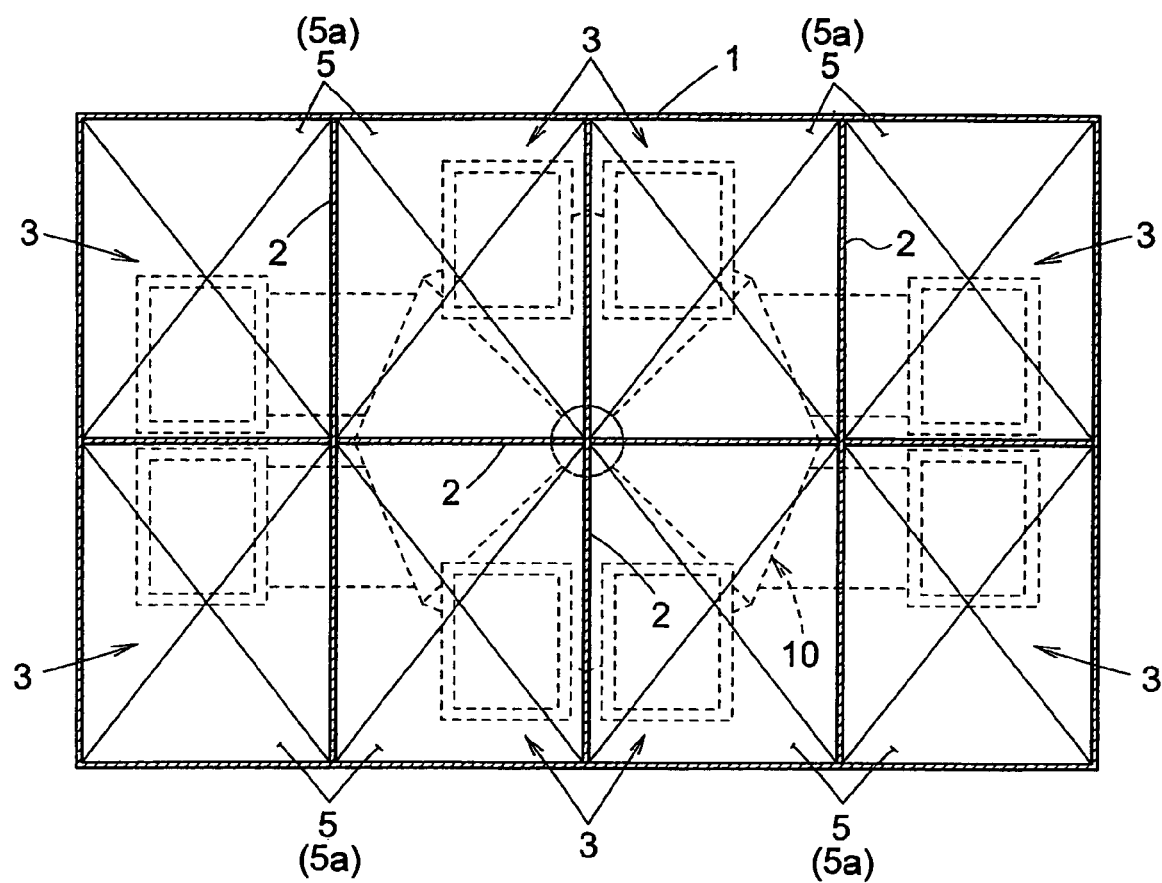

[Fig.3]
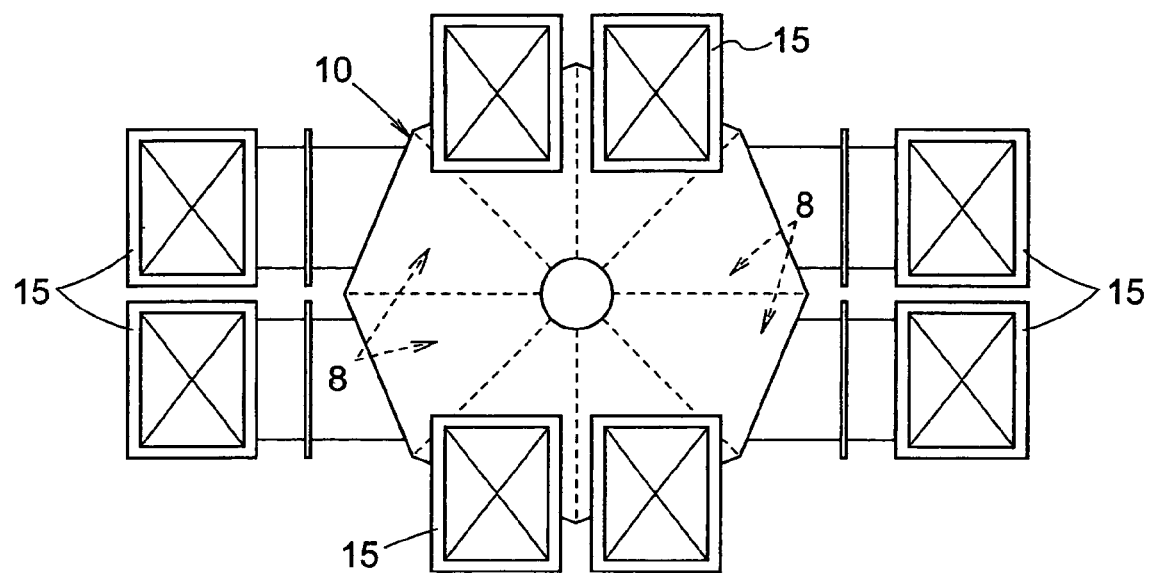

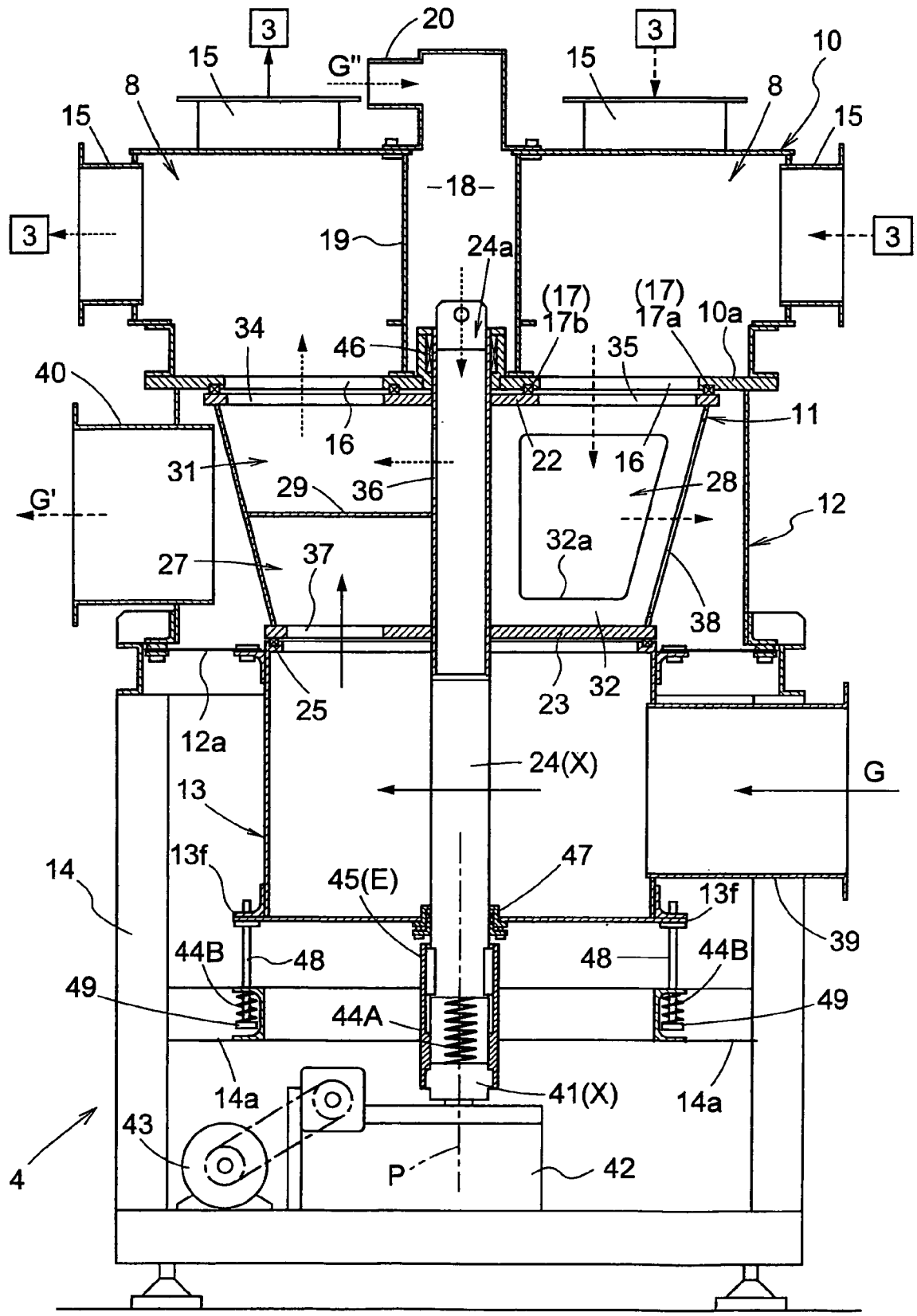
[Fig.4]

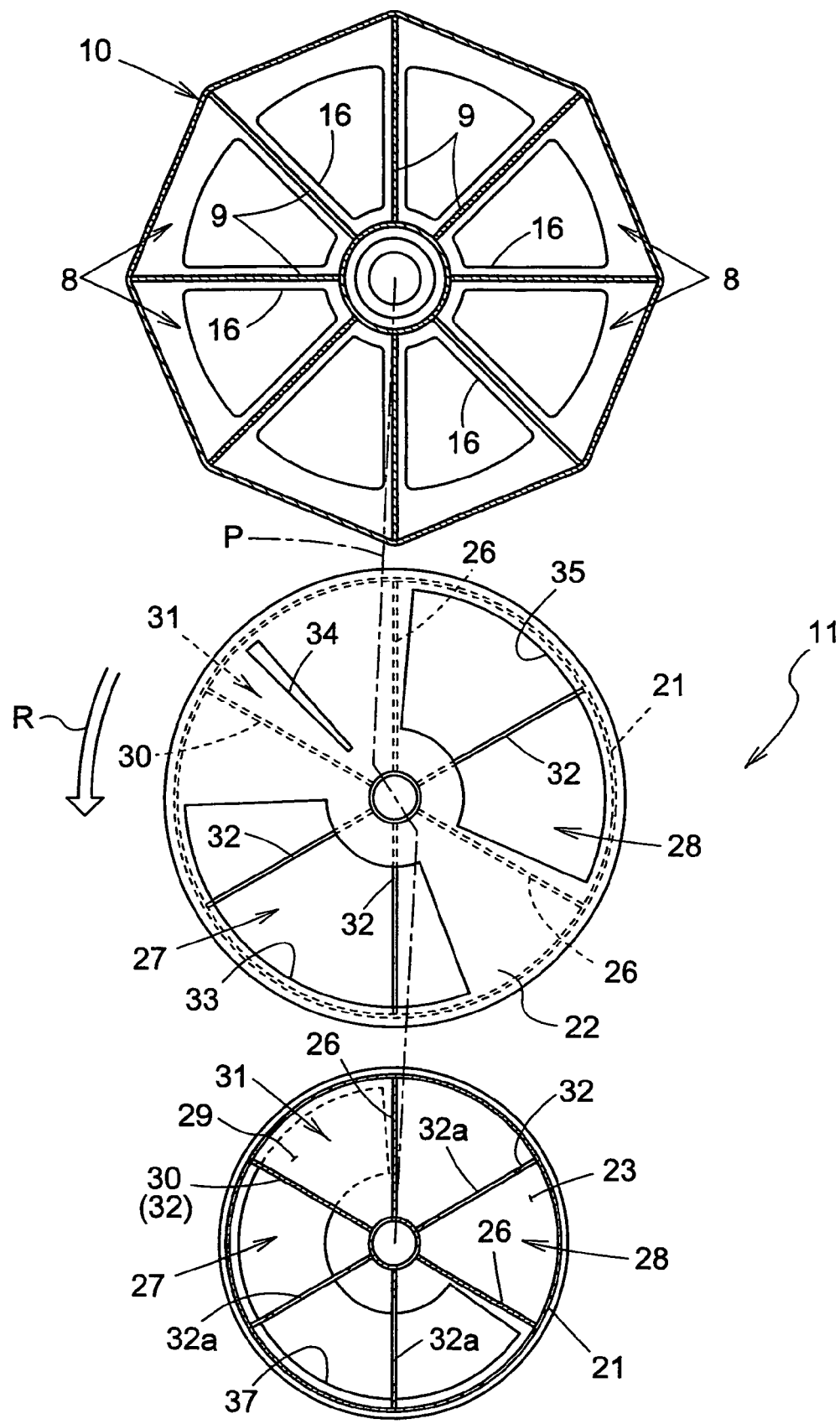
[Fig.5]

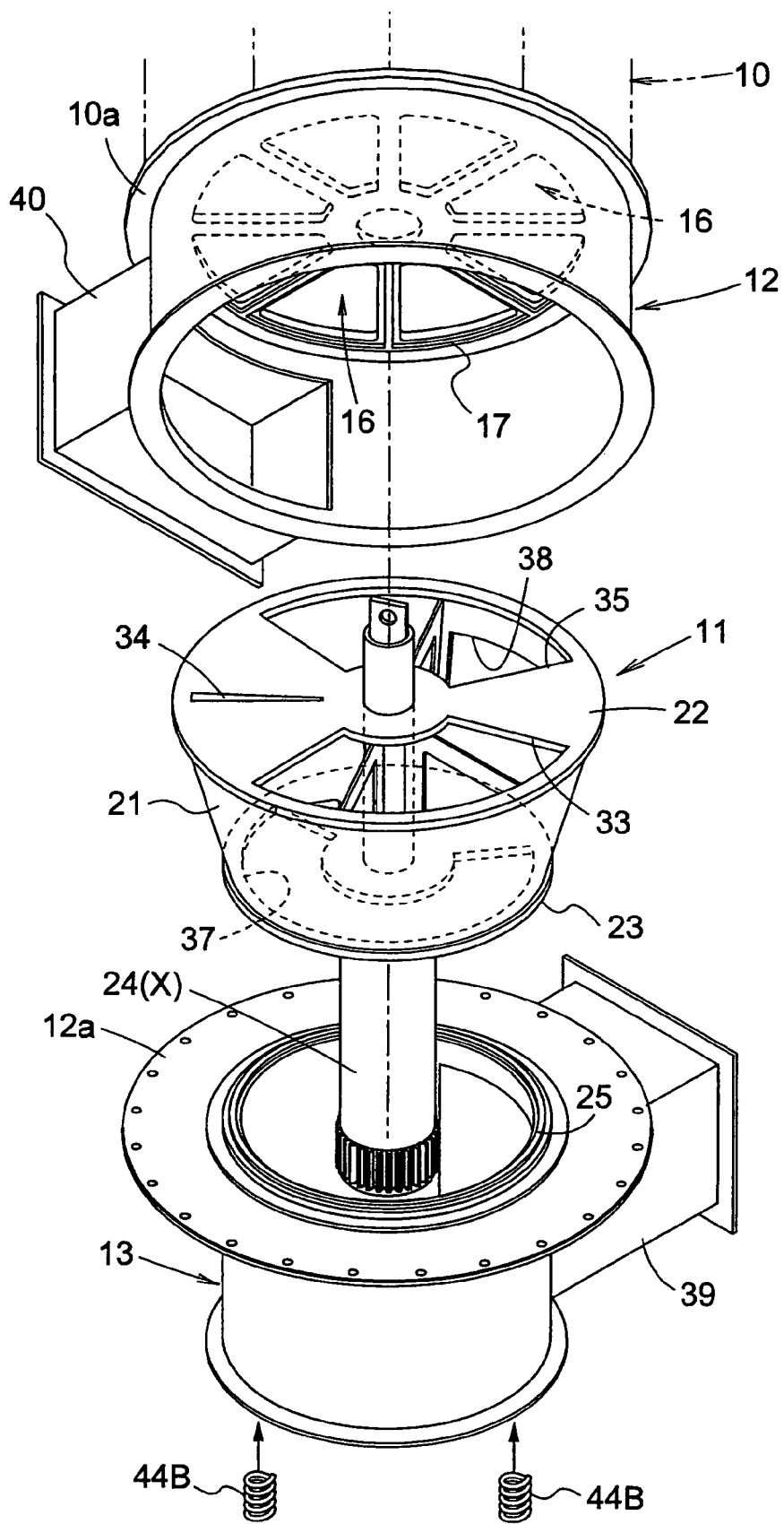
[Fig.6]

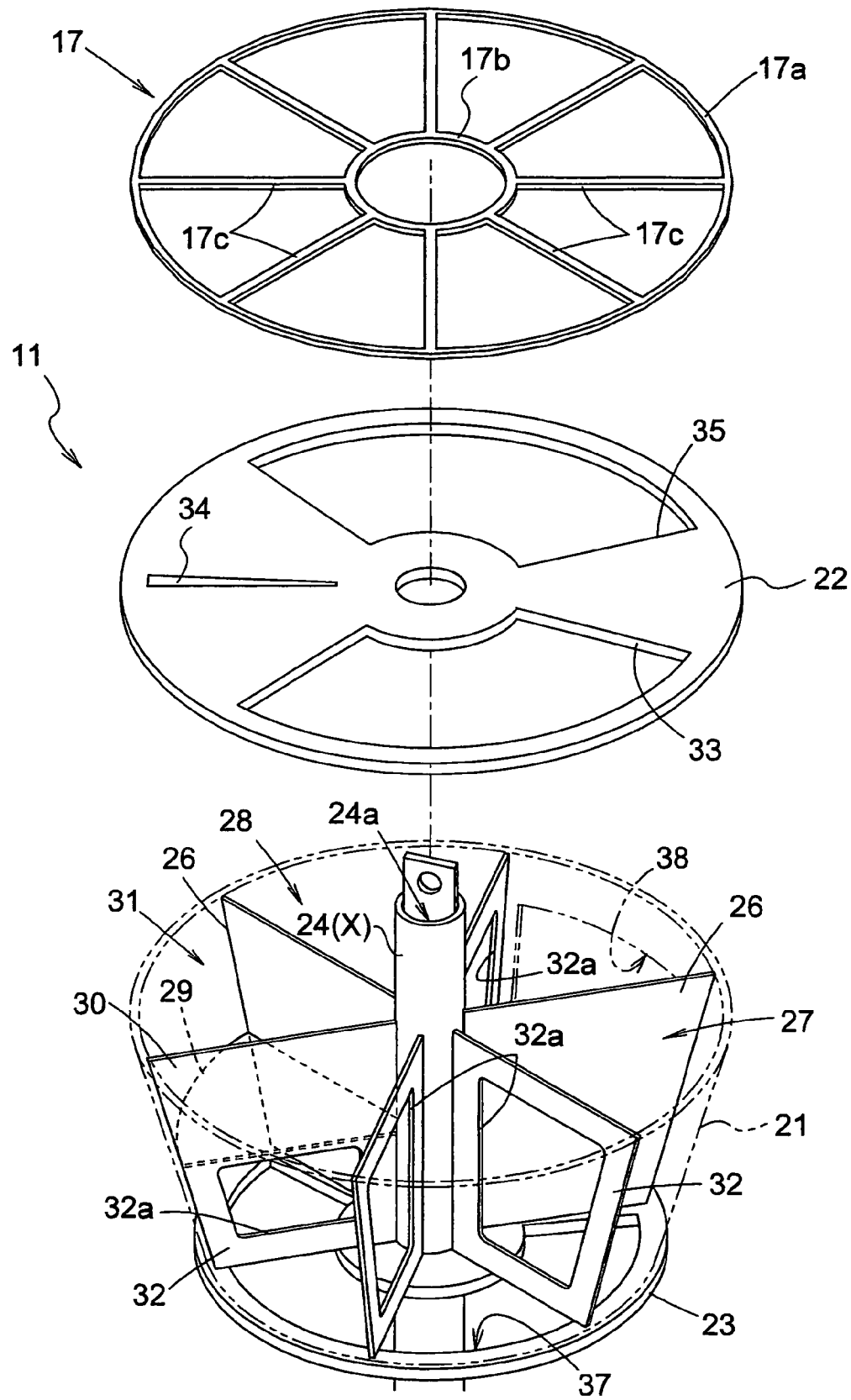
[Fig. 7]

[Fig.8]
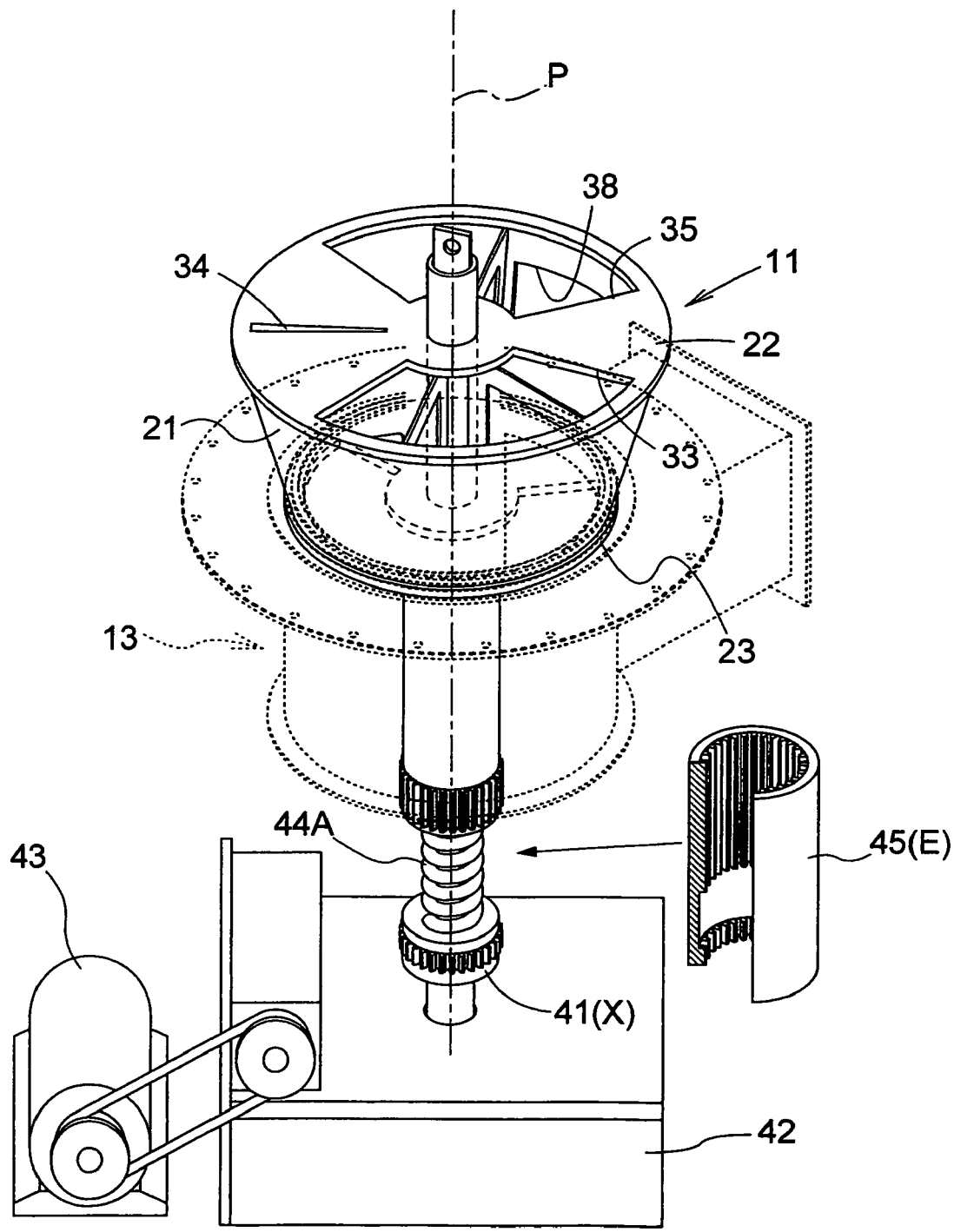

[Fig.9]
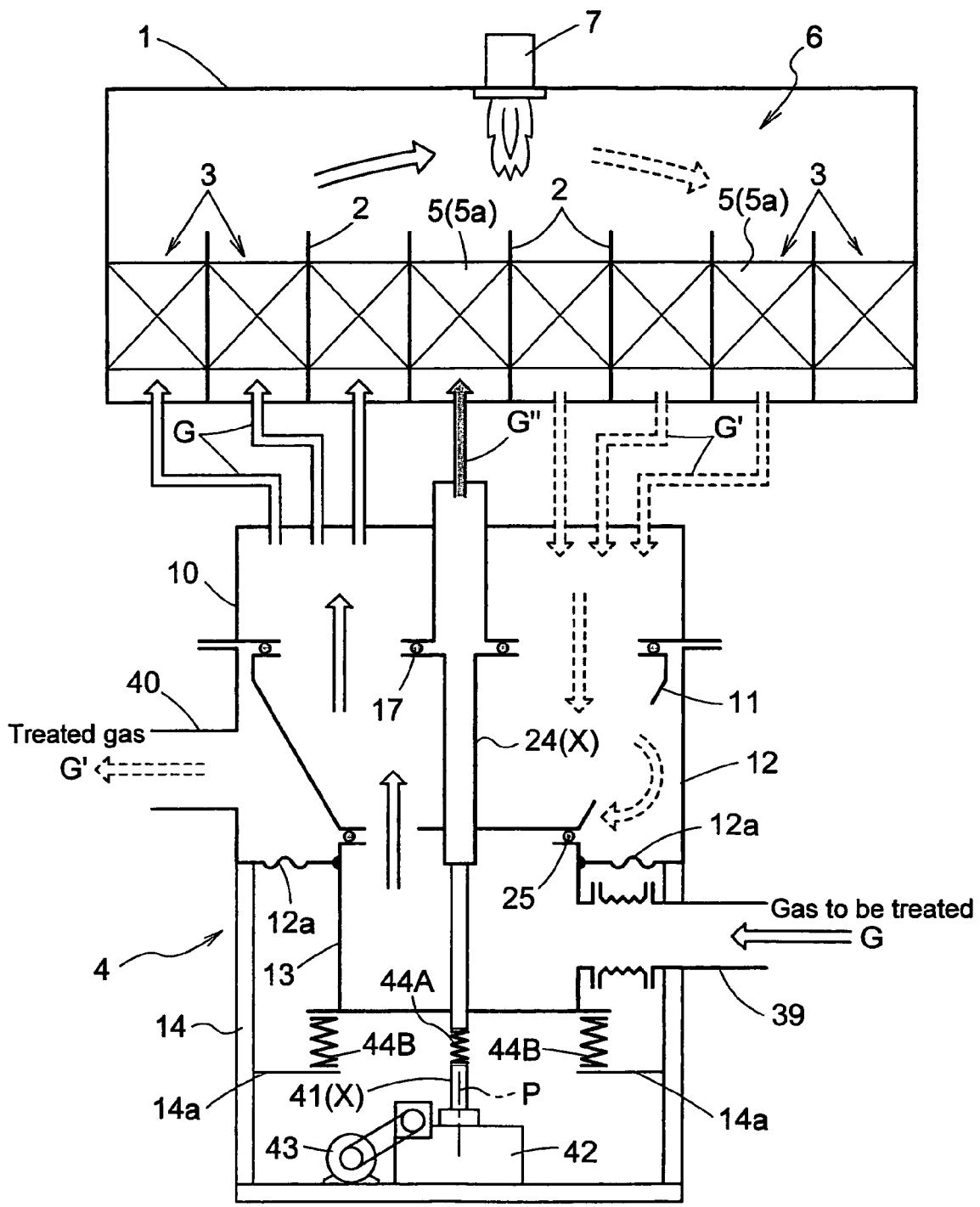

[Fig.10]
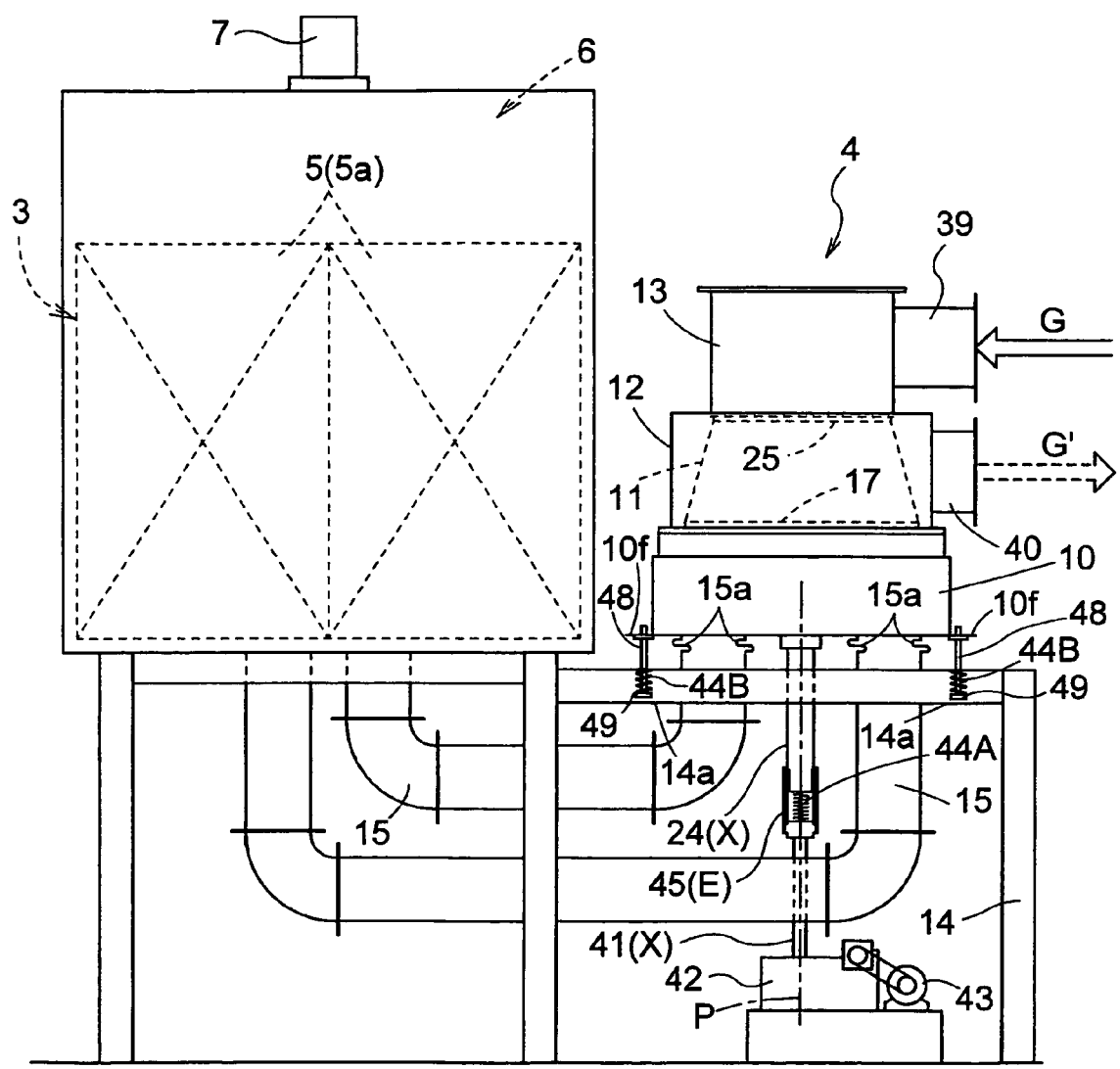

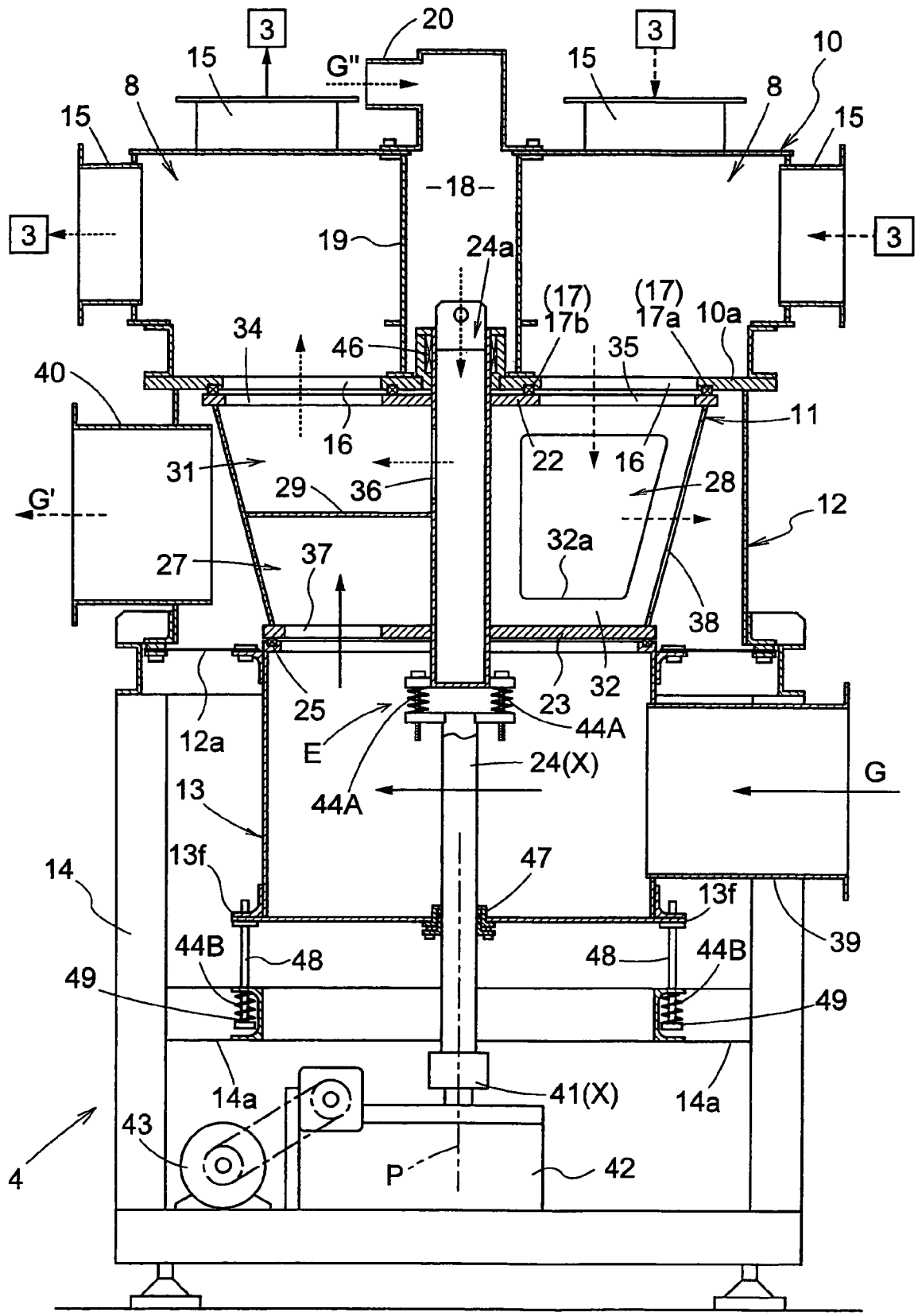
[Fig. 11]

[Fig.12]
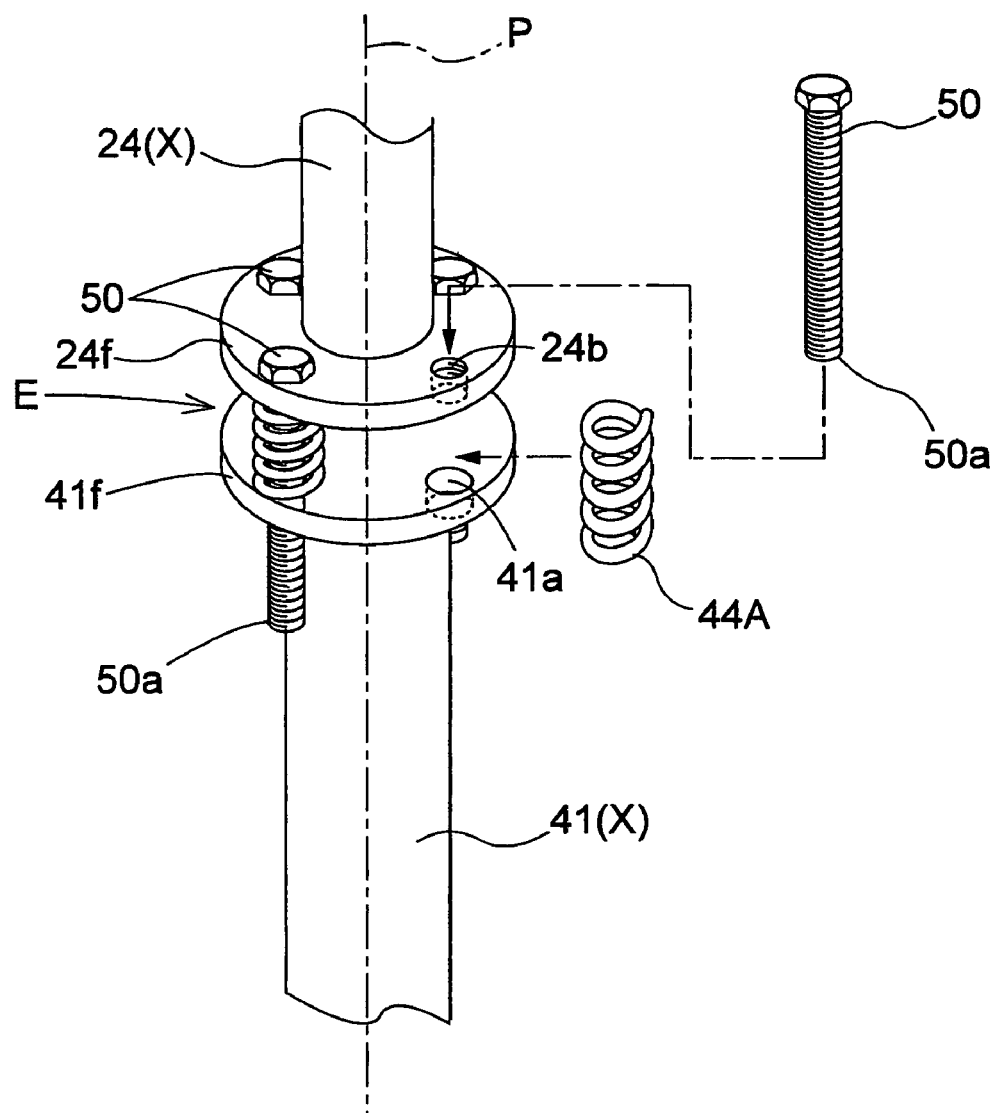

[Fig.13]
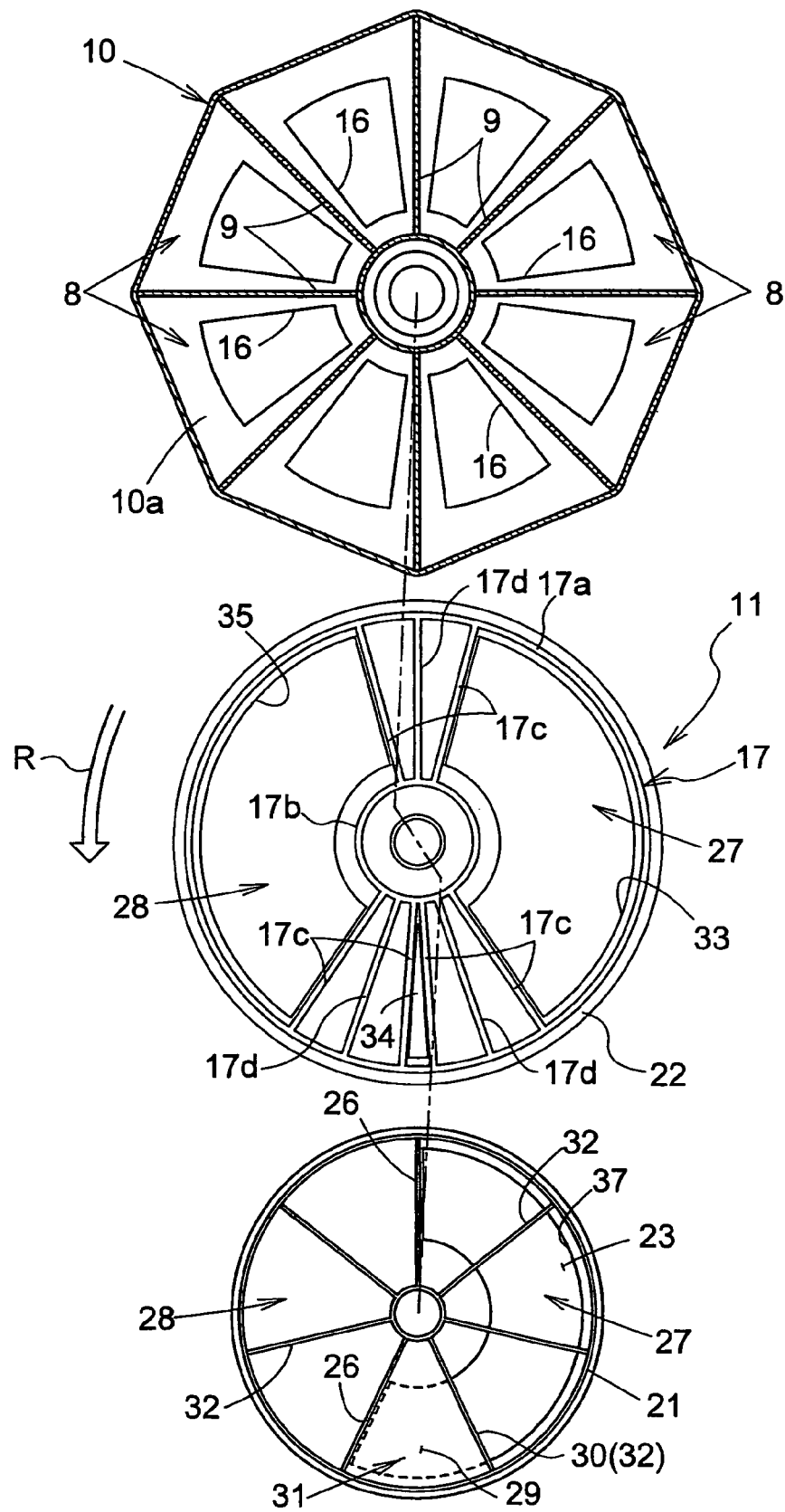

[Fig.14]
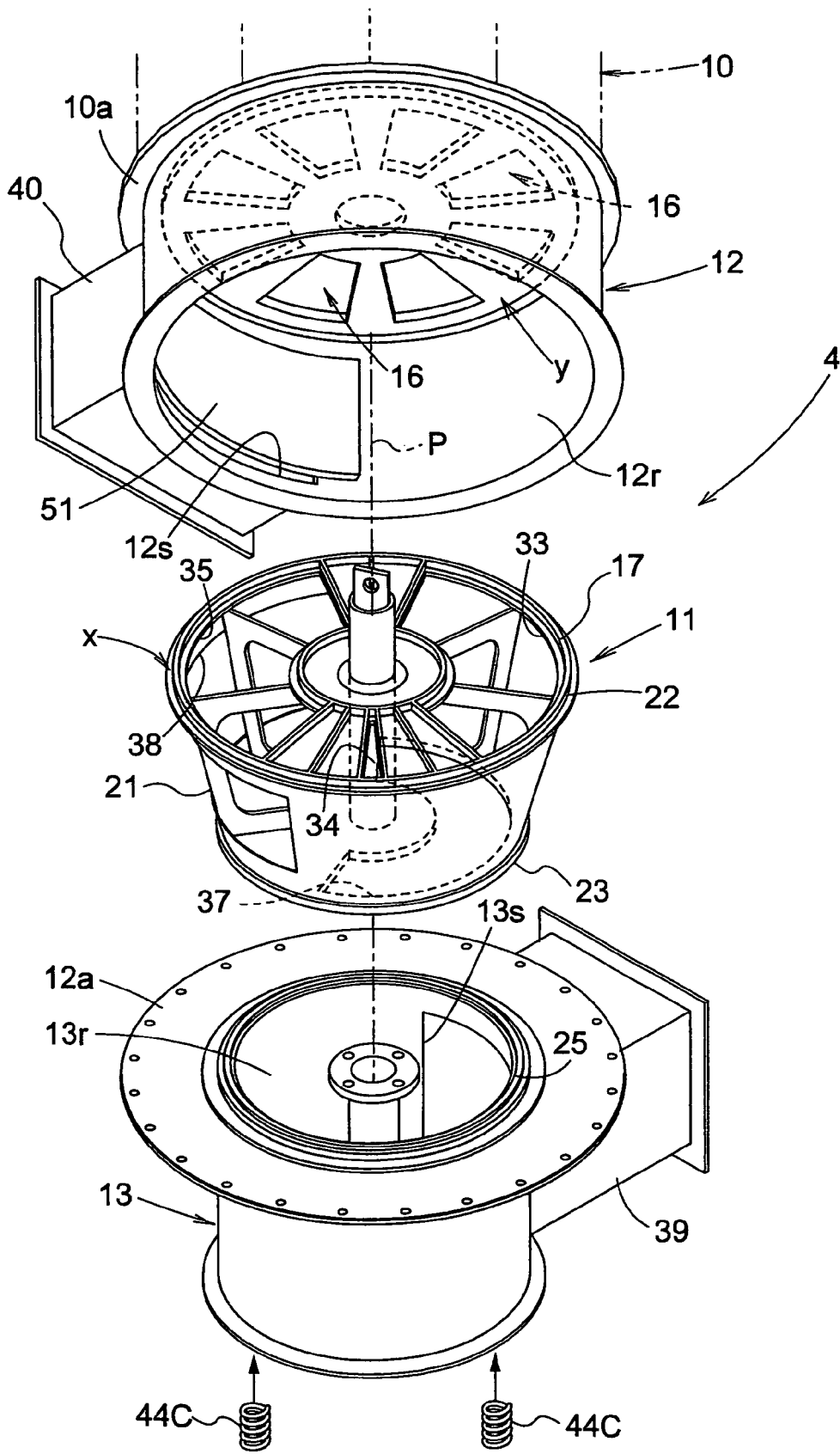

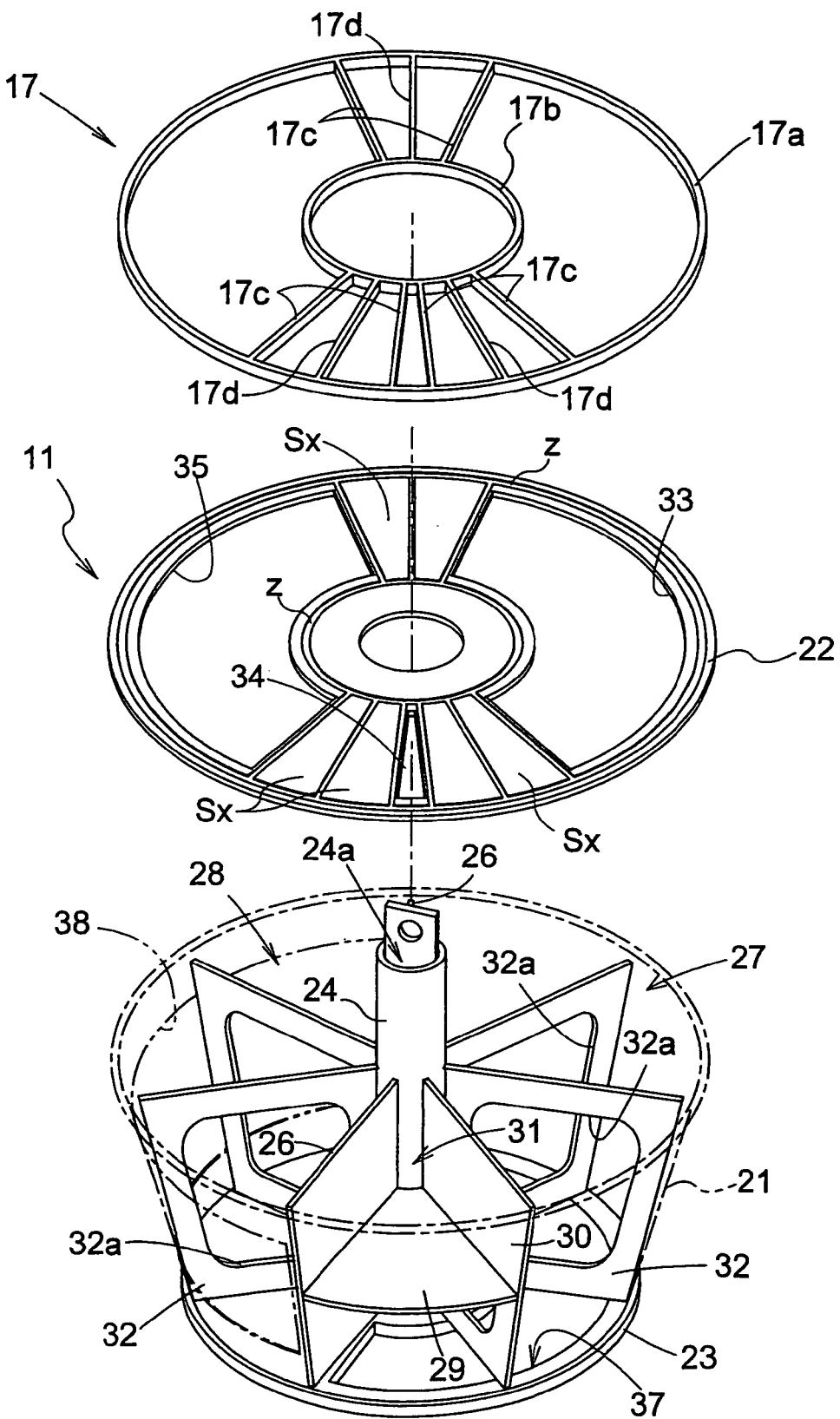
[Fig.15]

[Fig.16]
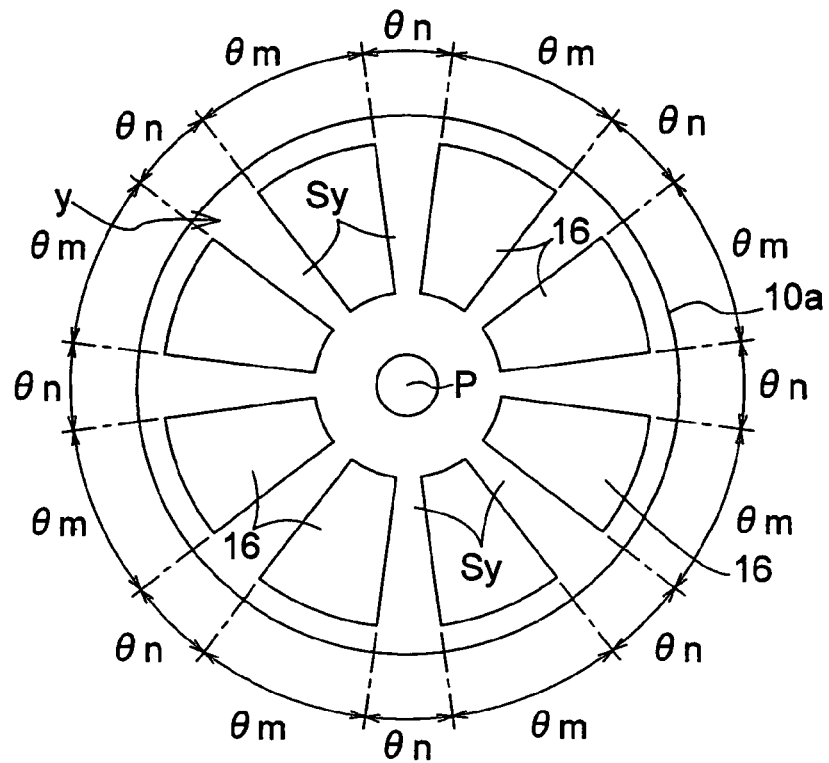
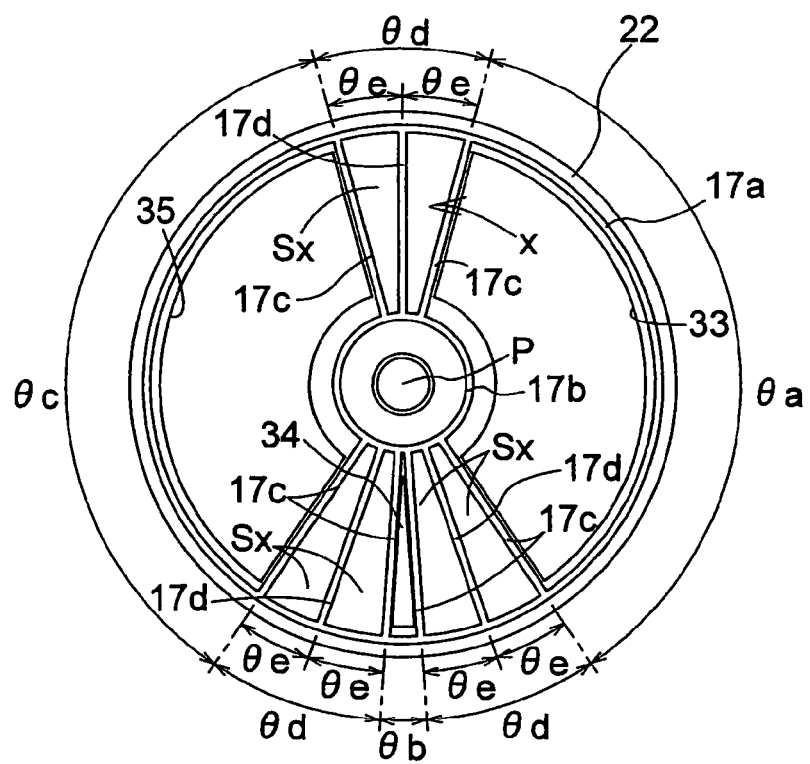

[Fig.17]
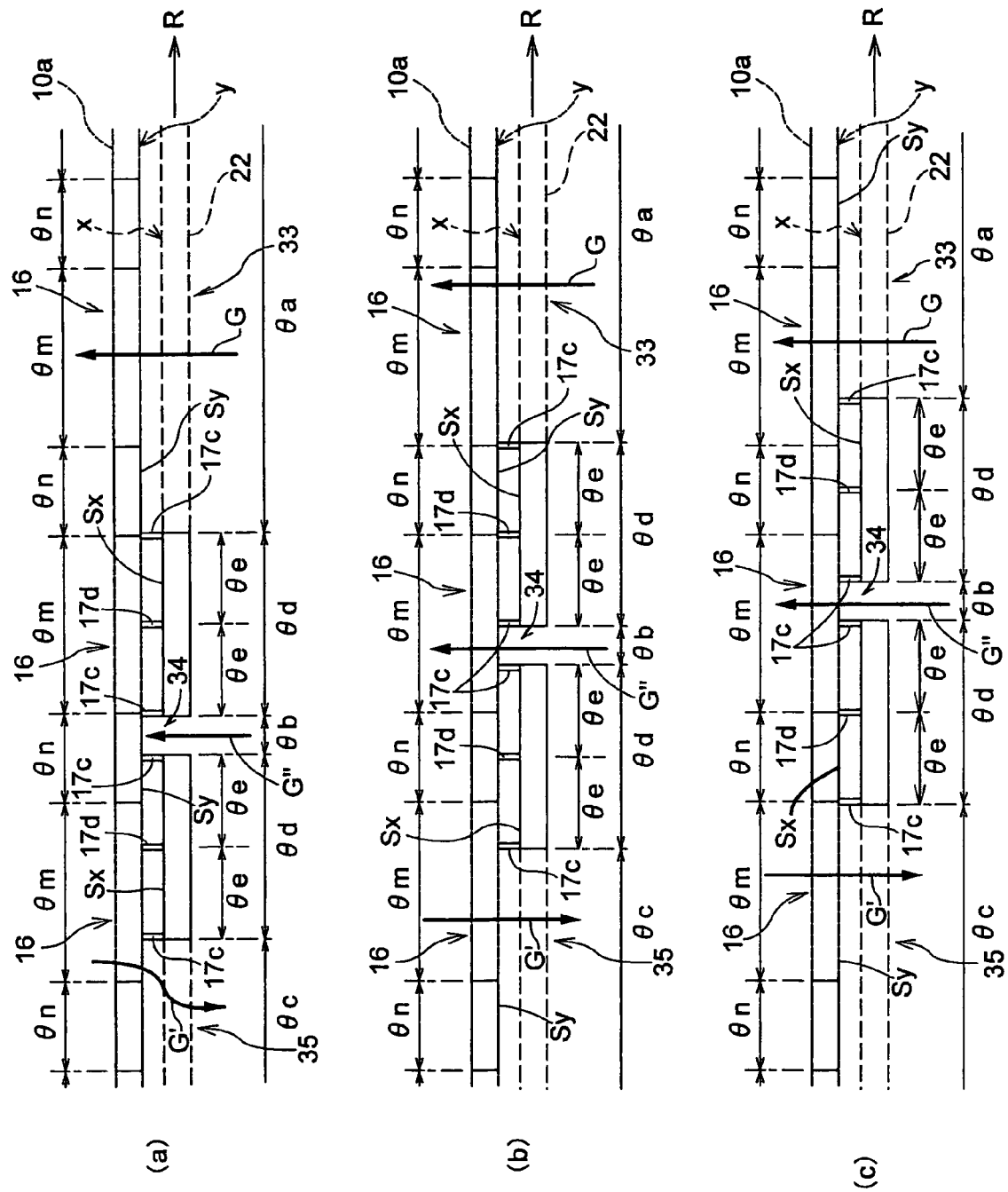

[Fig.18]
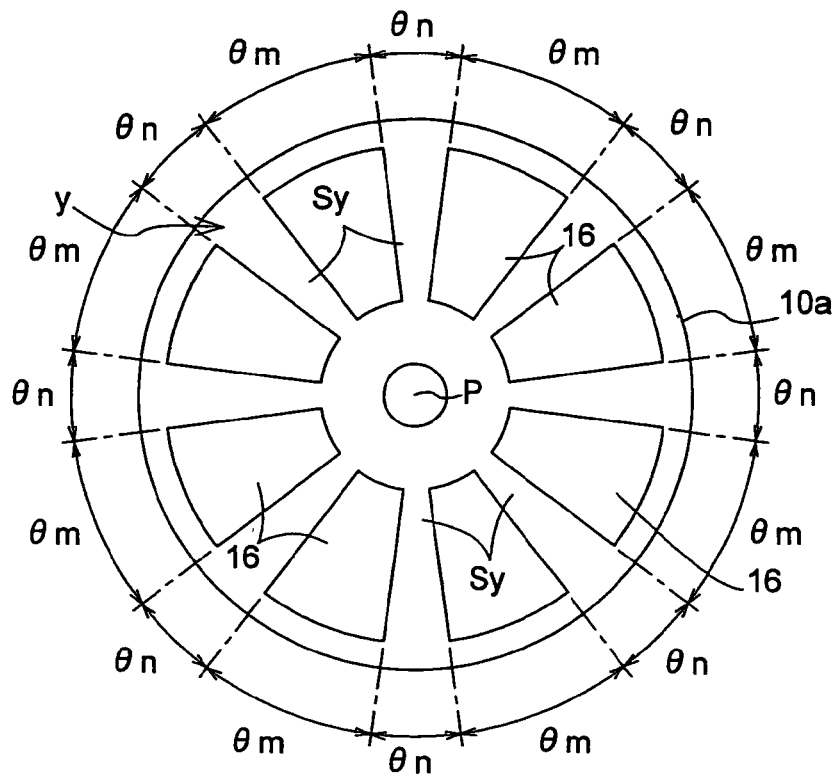
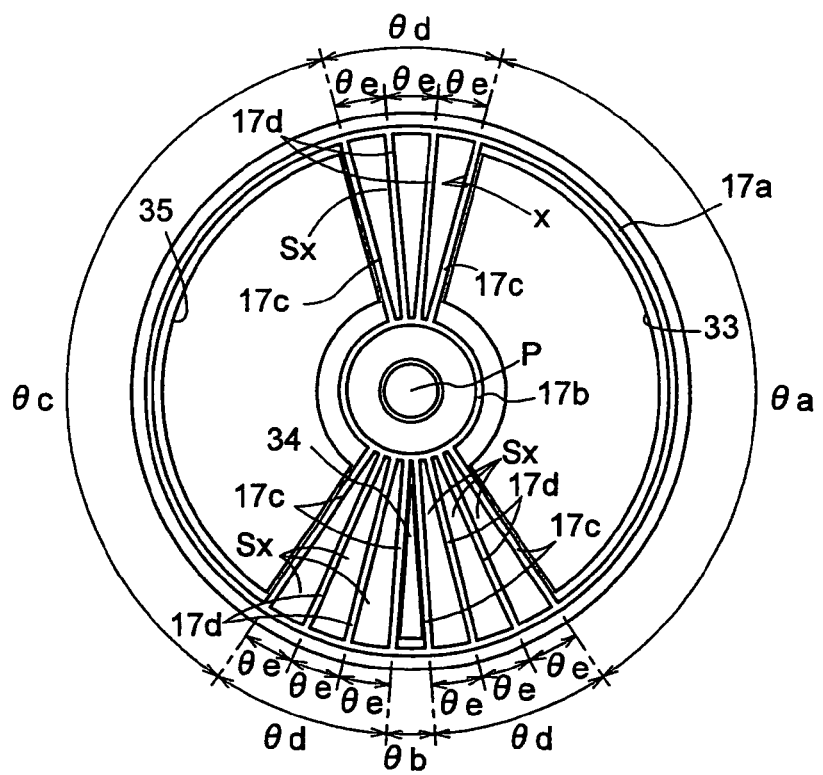

[Fig. 19]
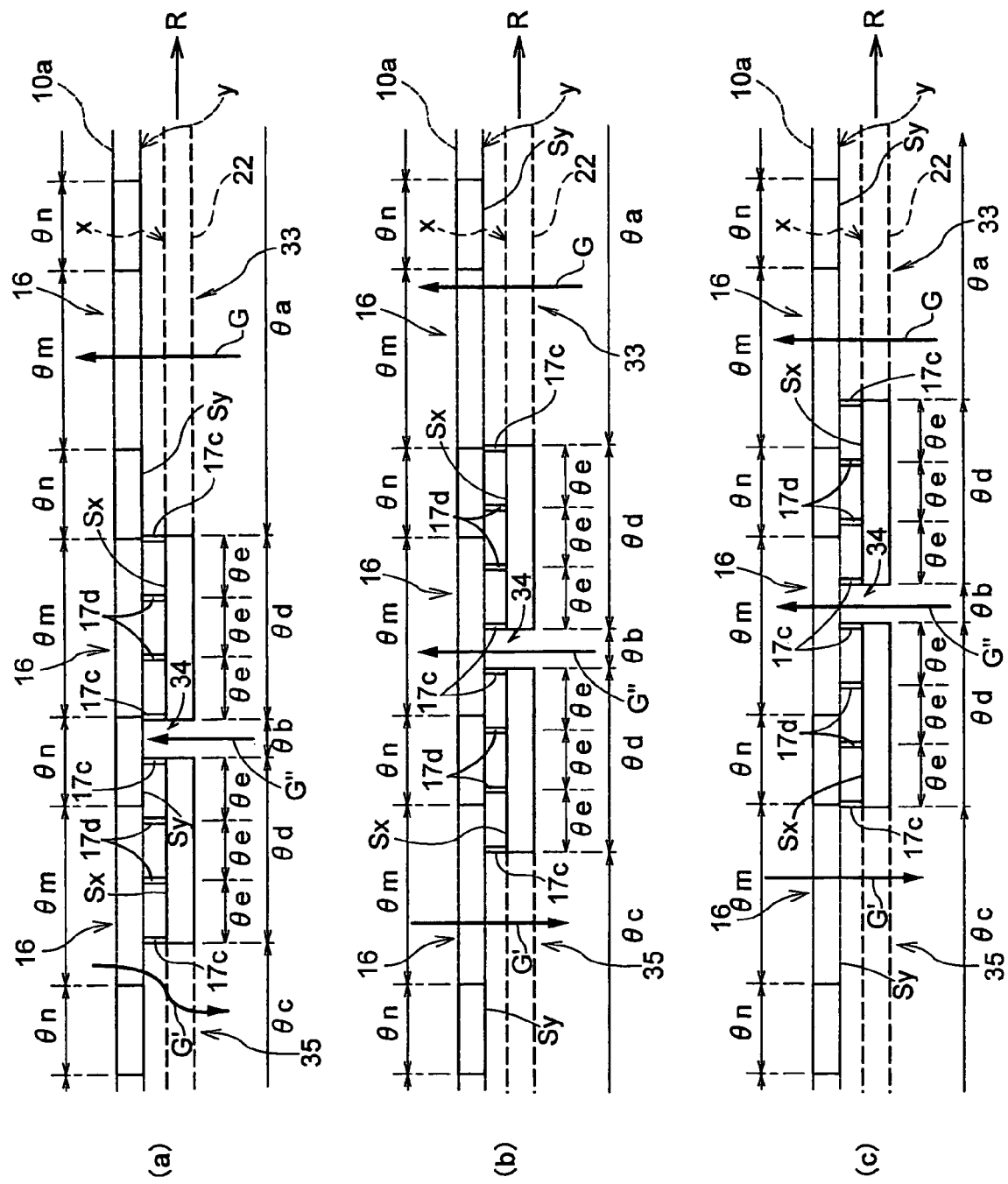

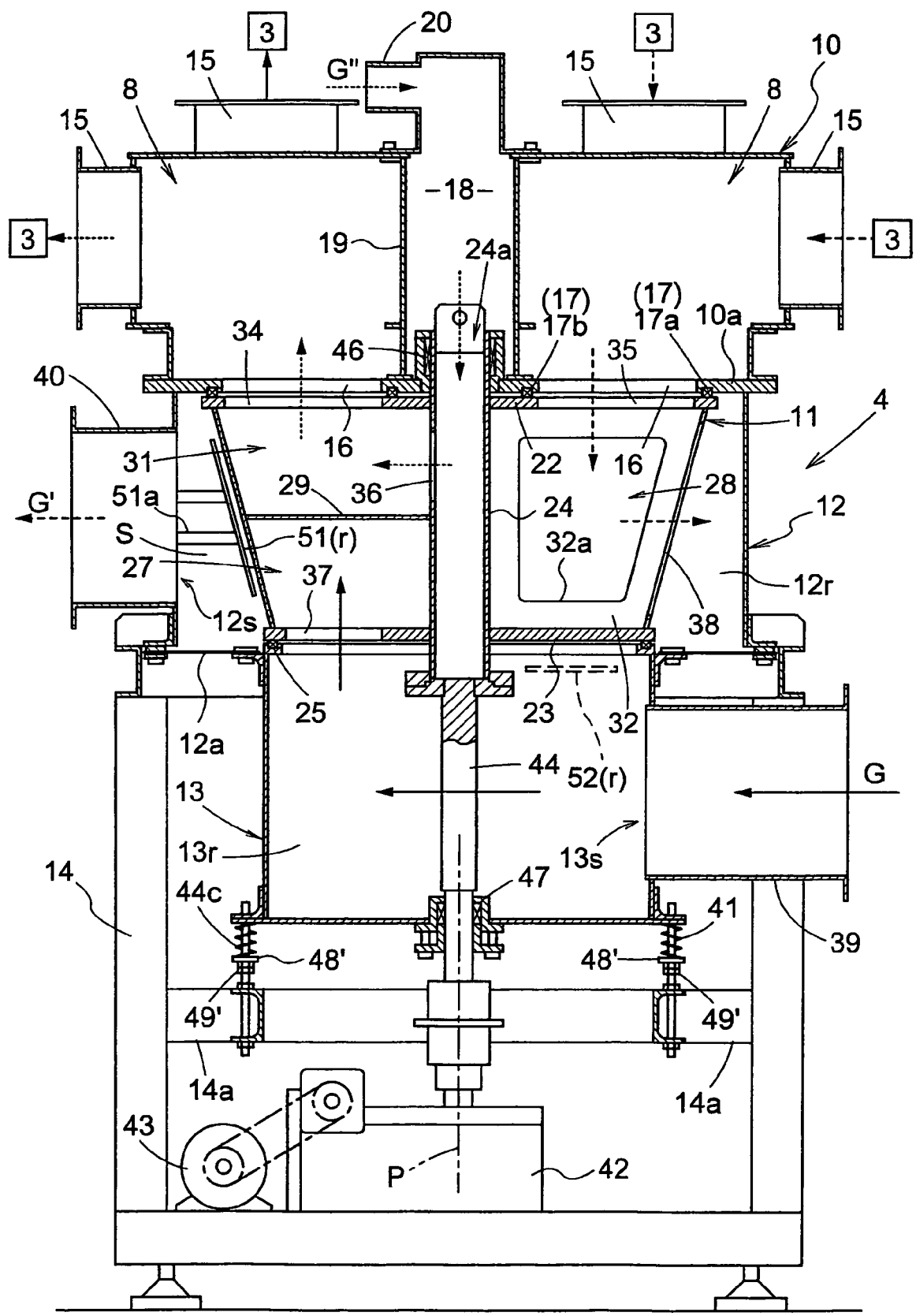
[Fig.20]

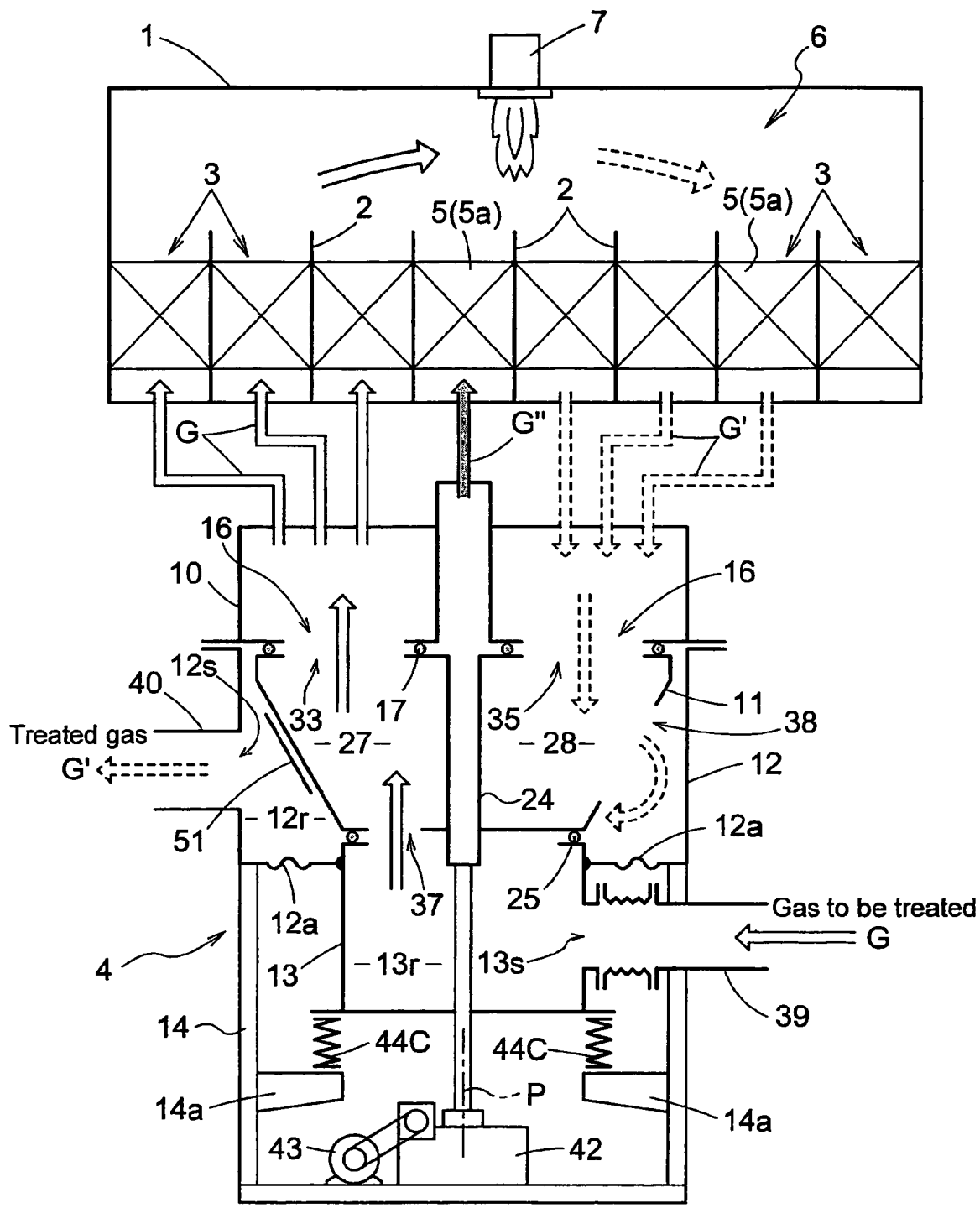
[Fig.21]

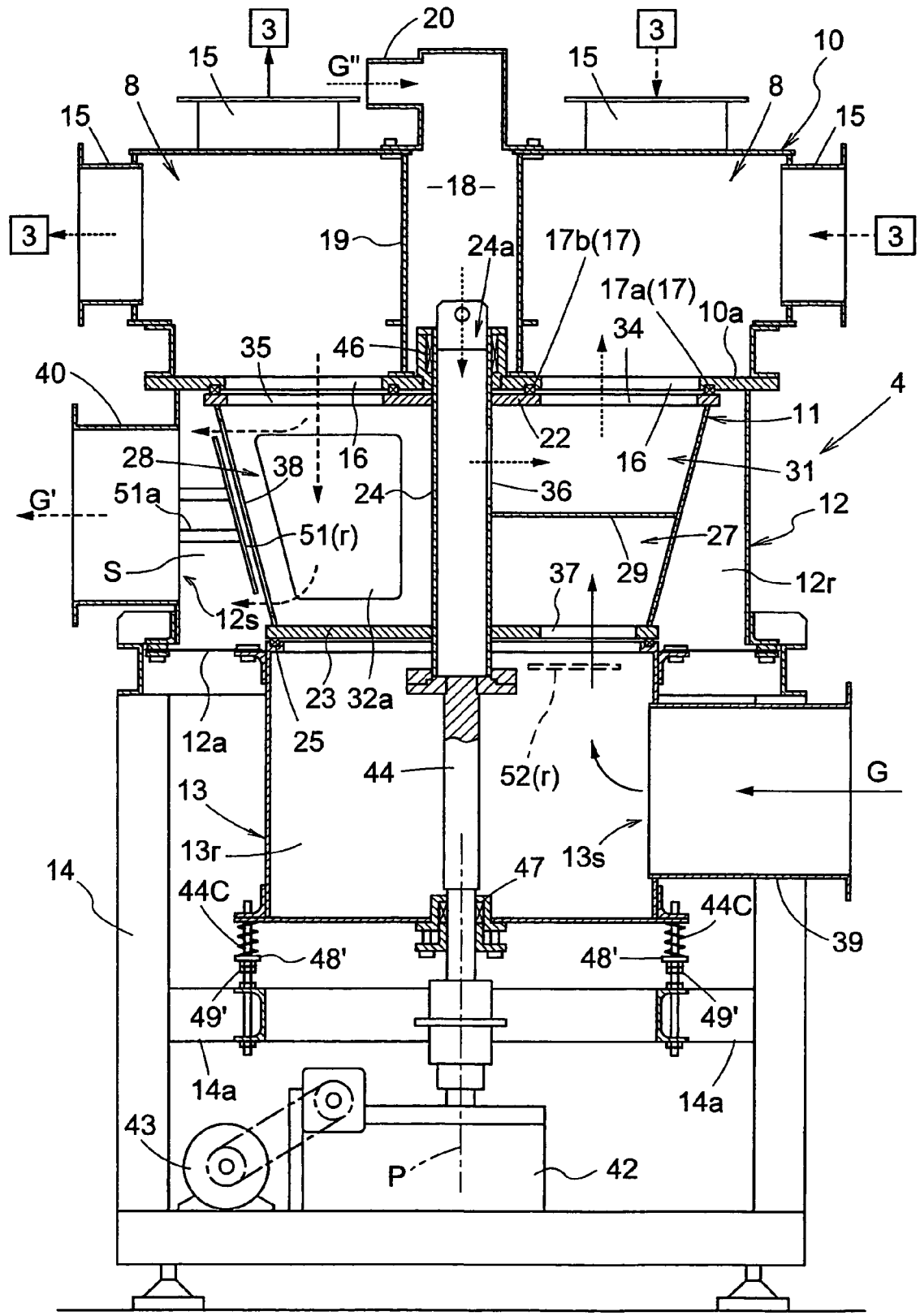
[Fig.22]

[Fig.23]
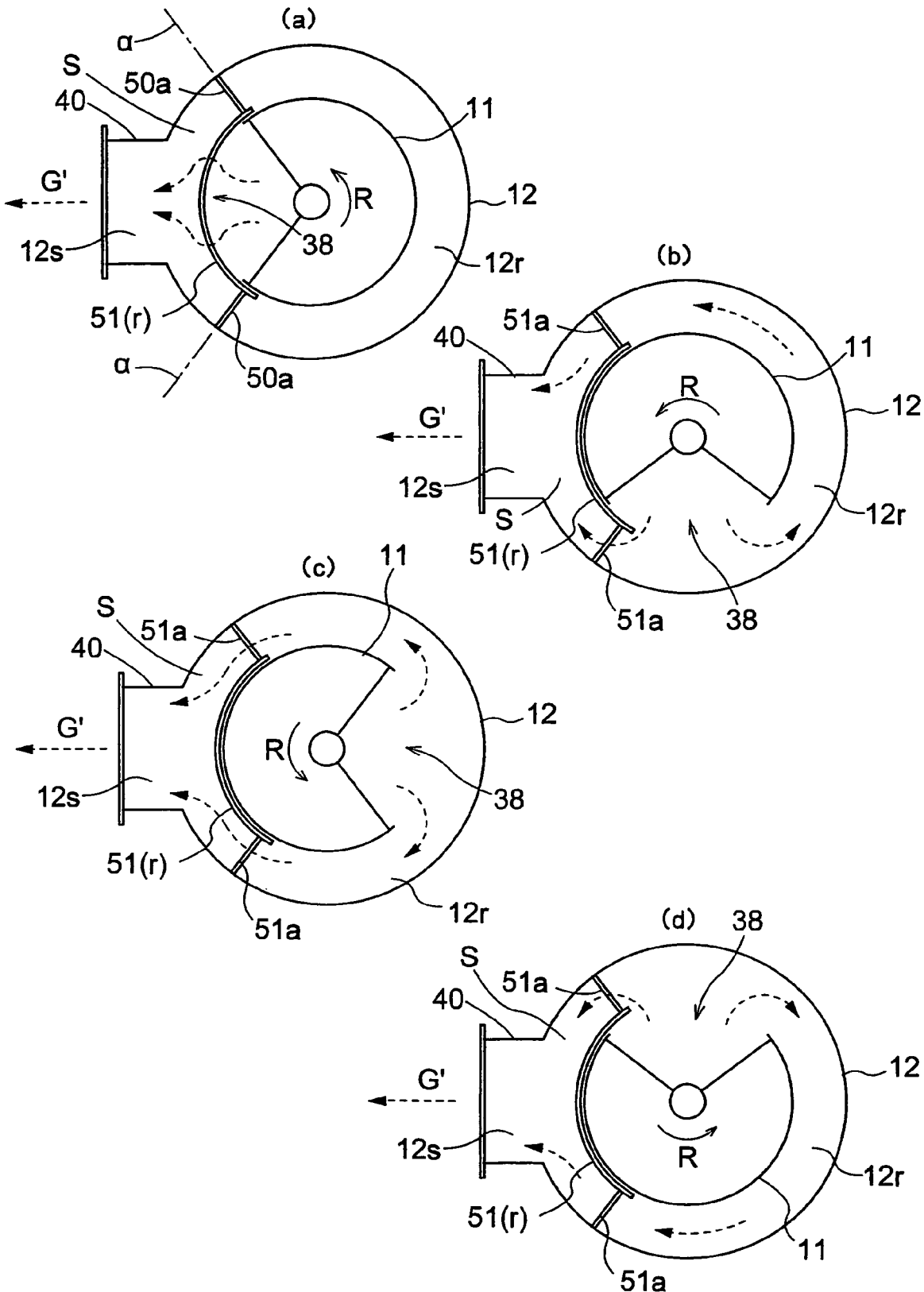

[Fig.24]
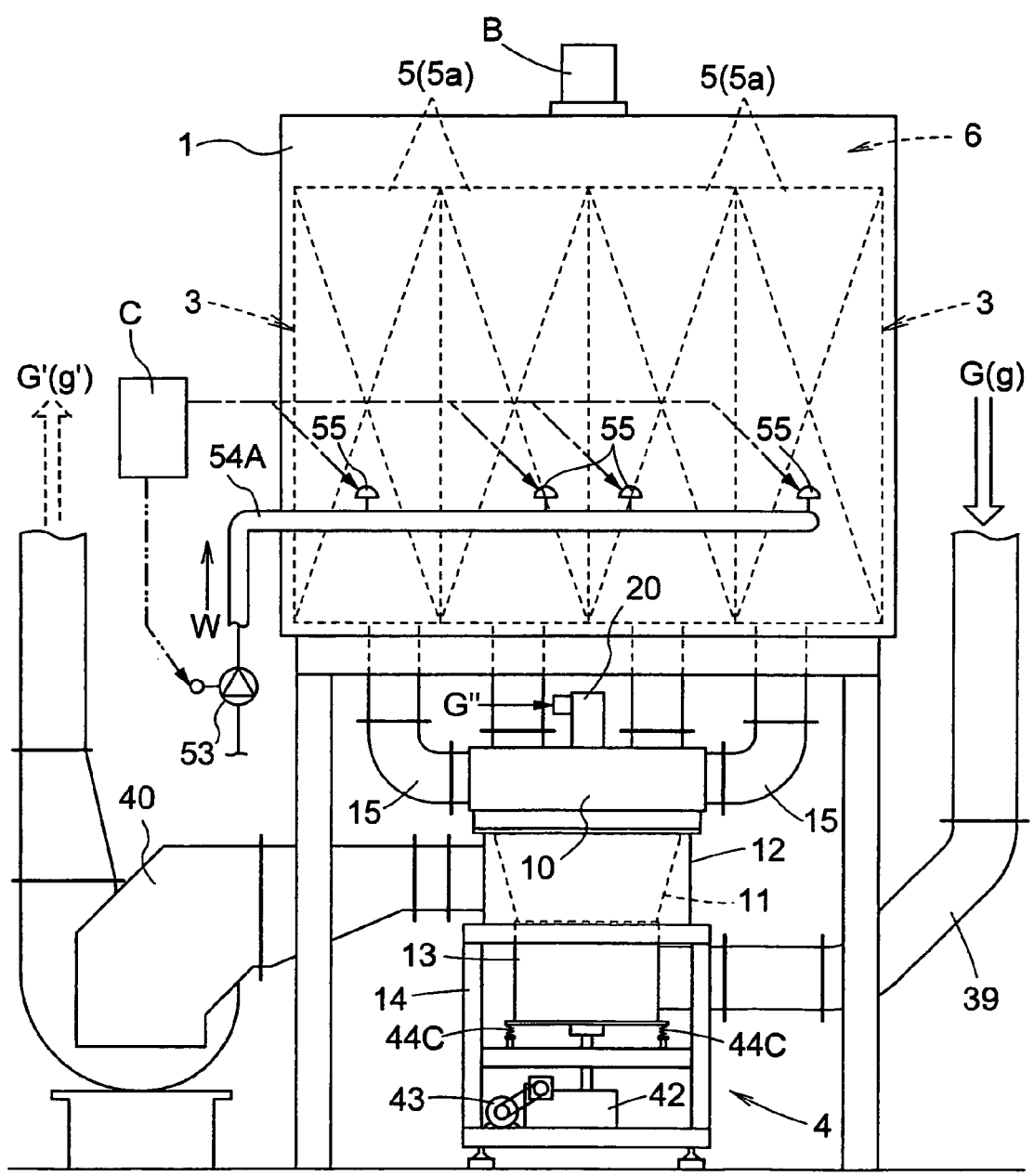

[Fig.25]
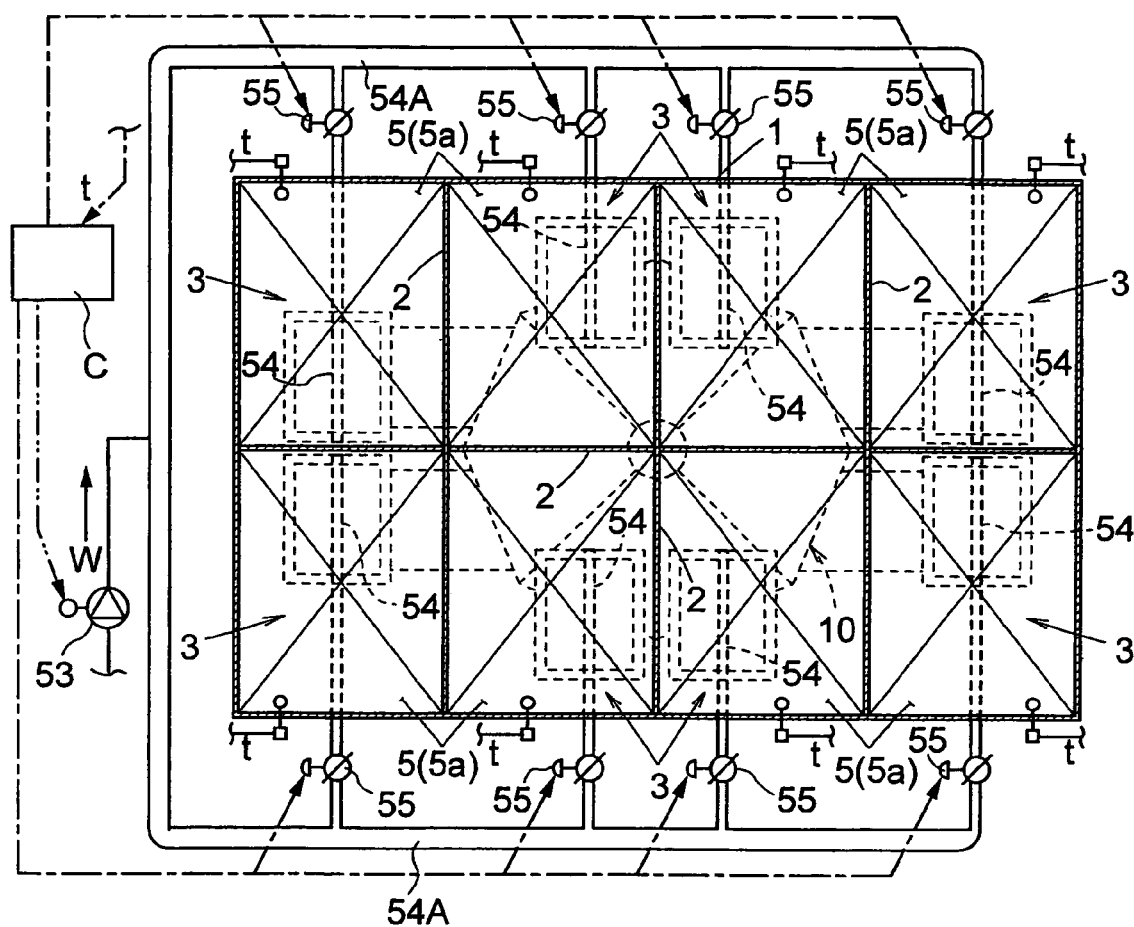

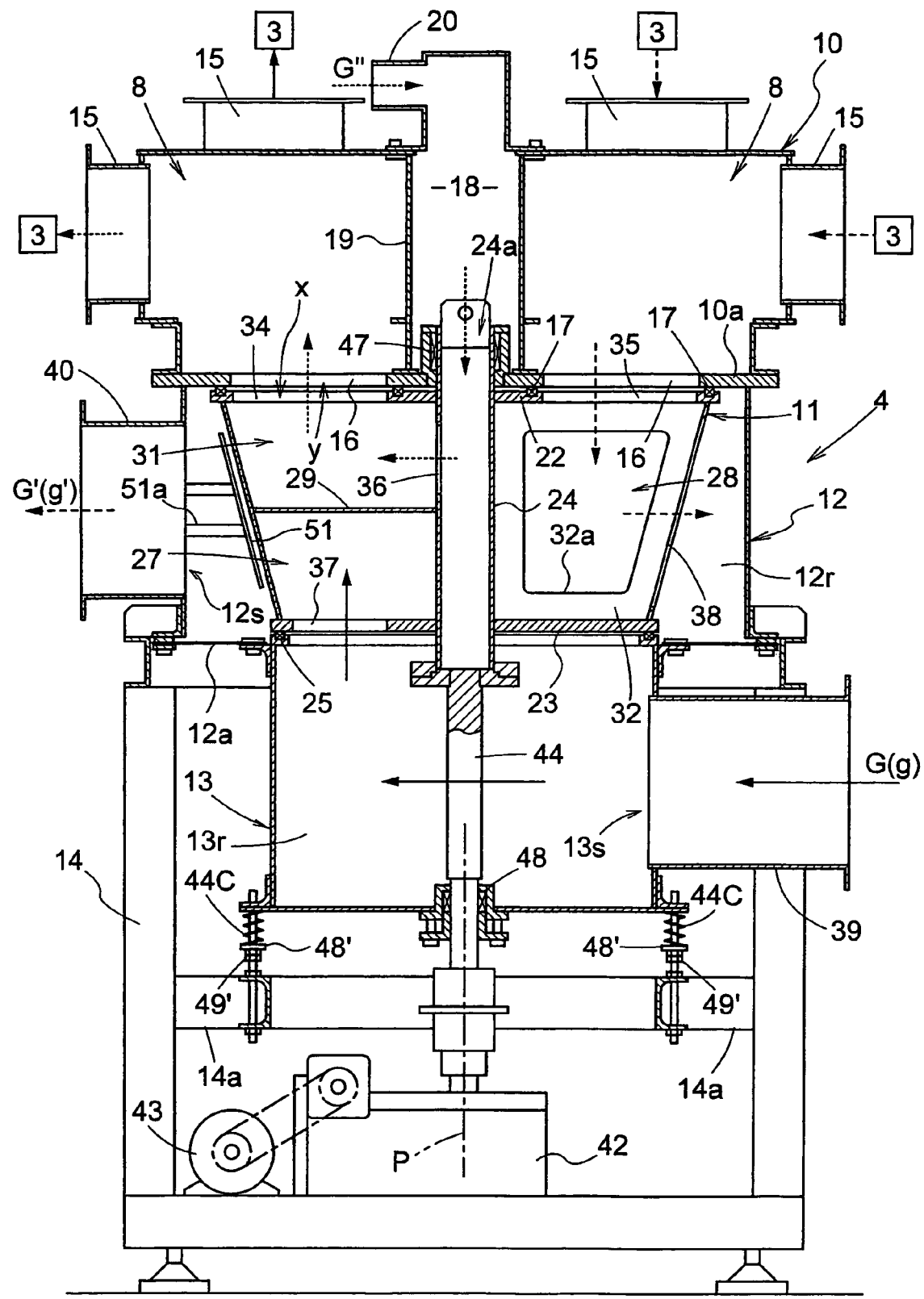
[Fig.26]

[Fig. 27]
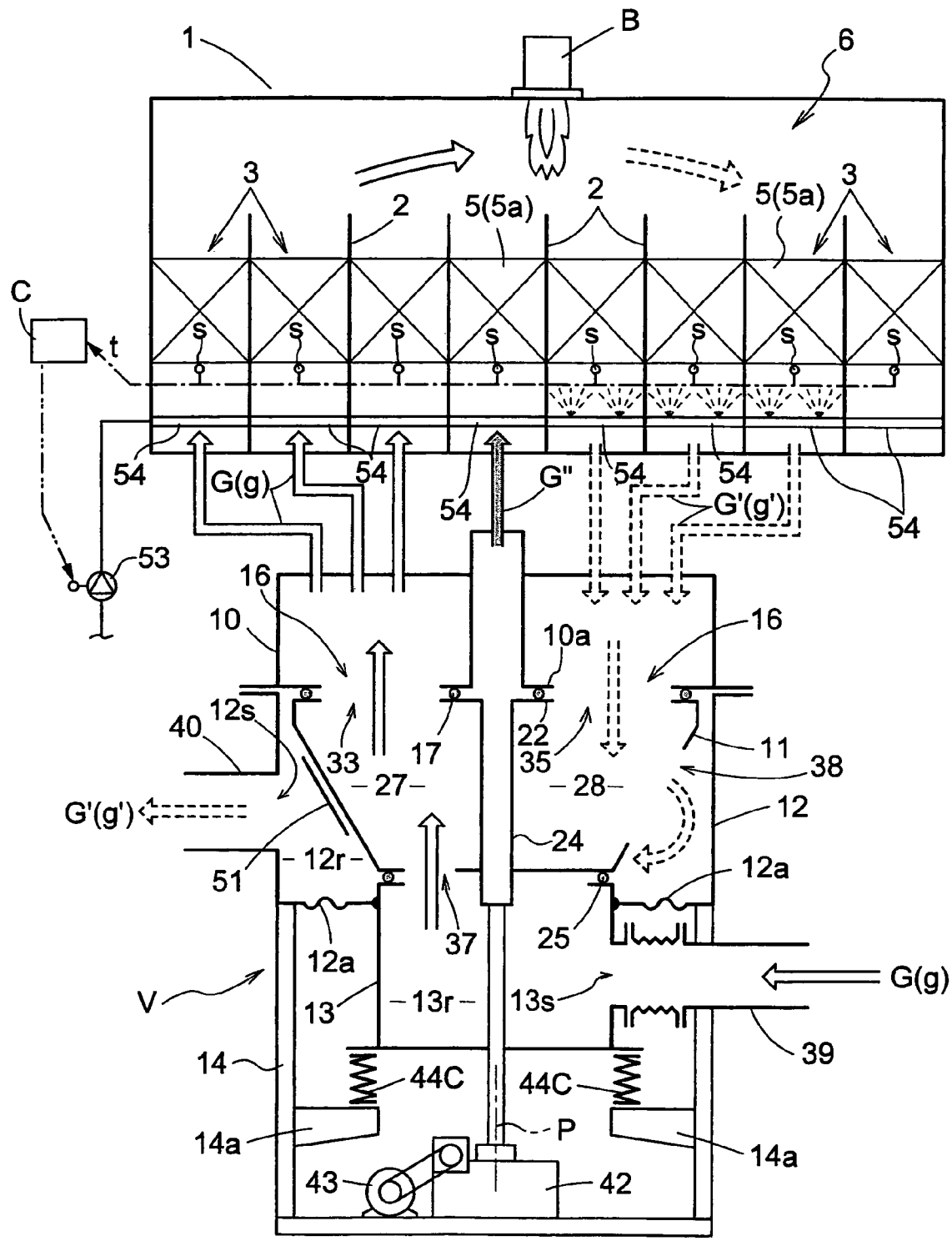

[Fig.28]
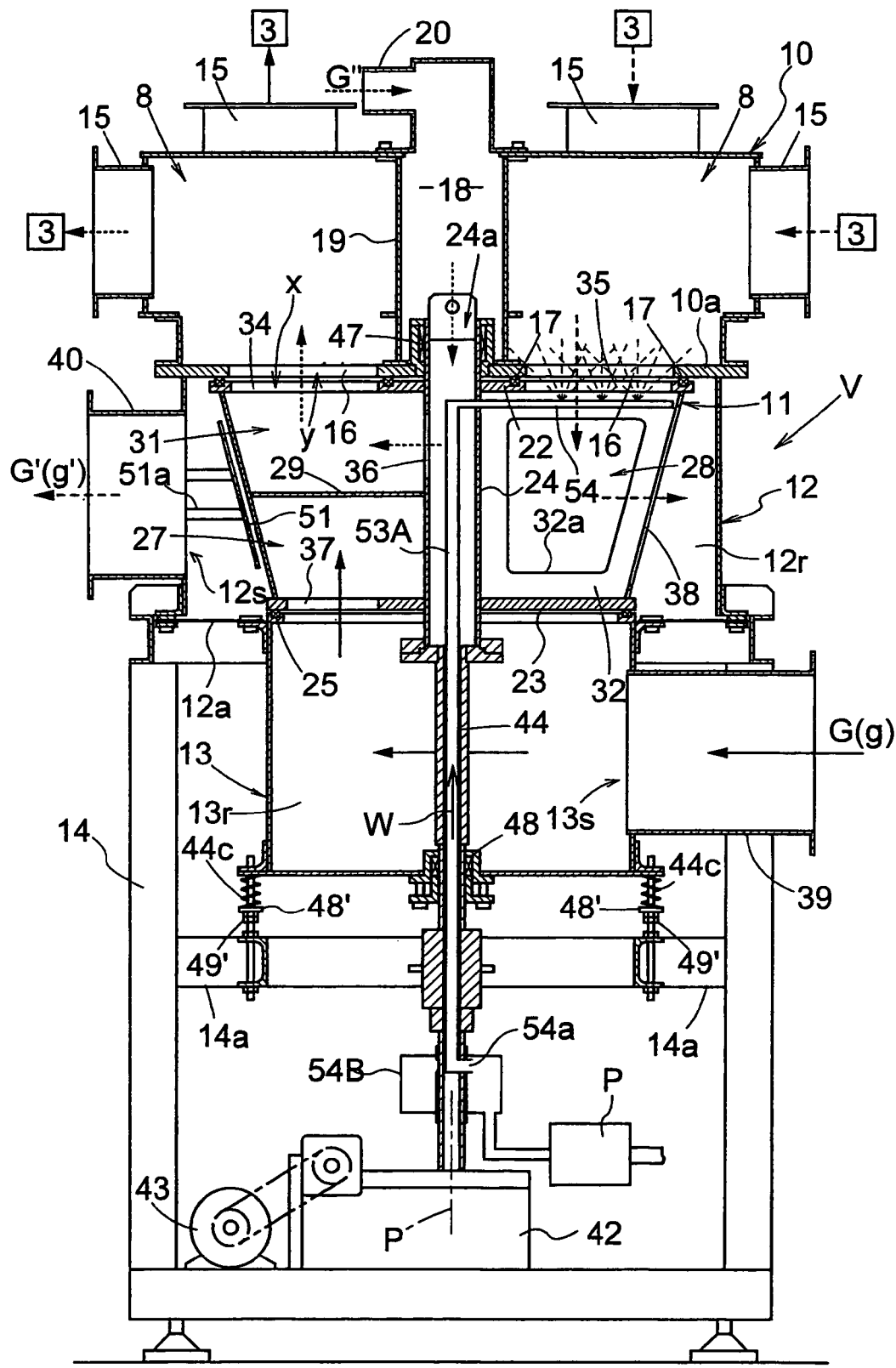

[Fig.29]
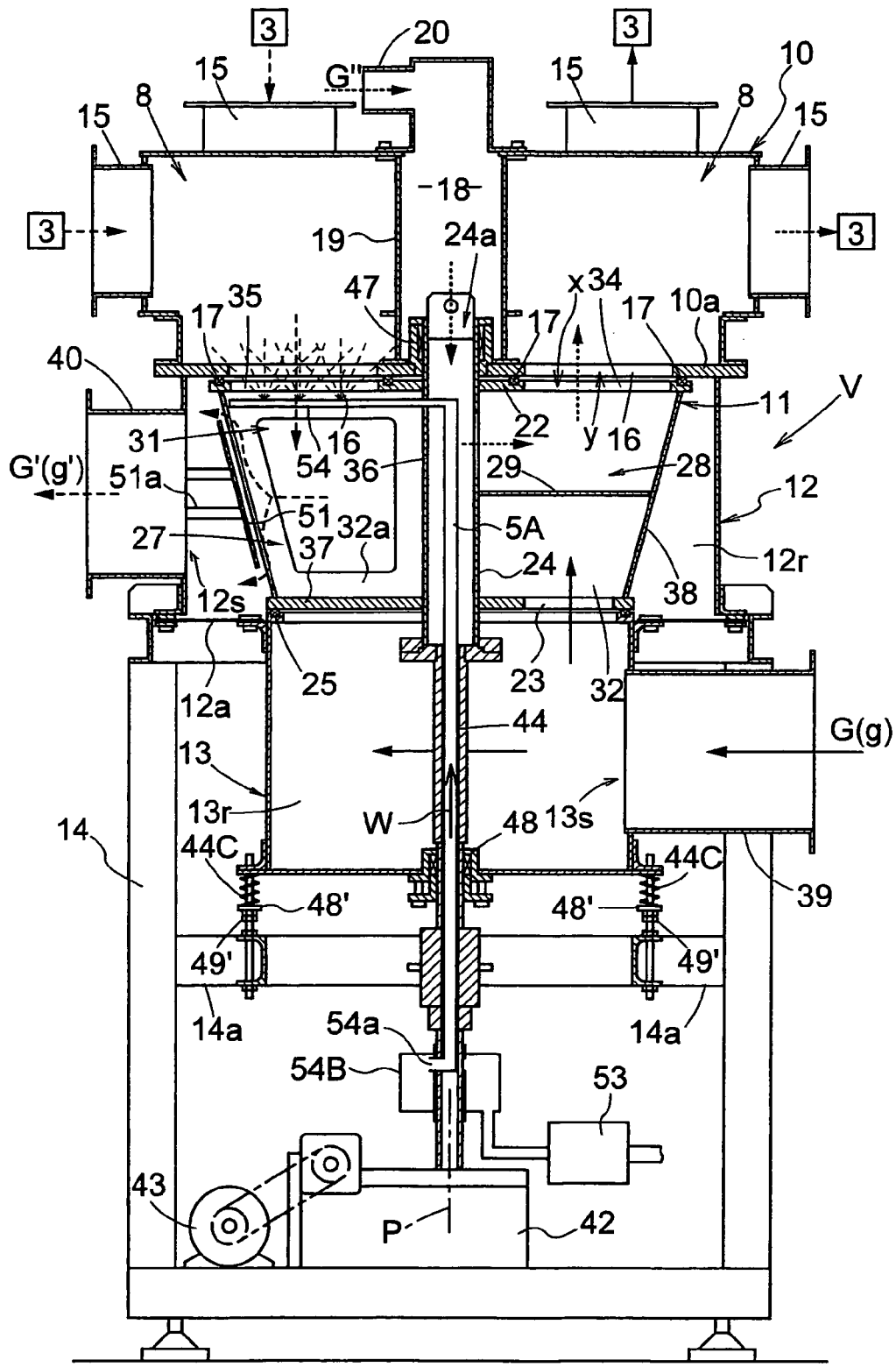

[Fig.30]
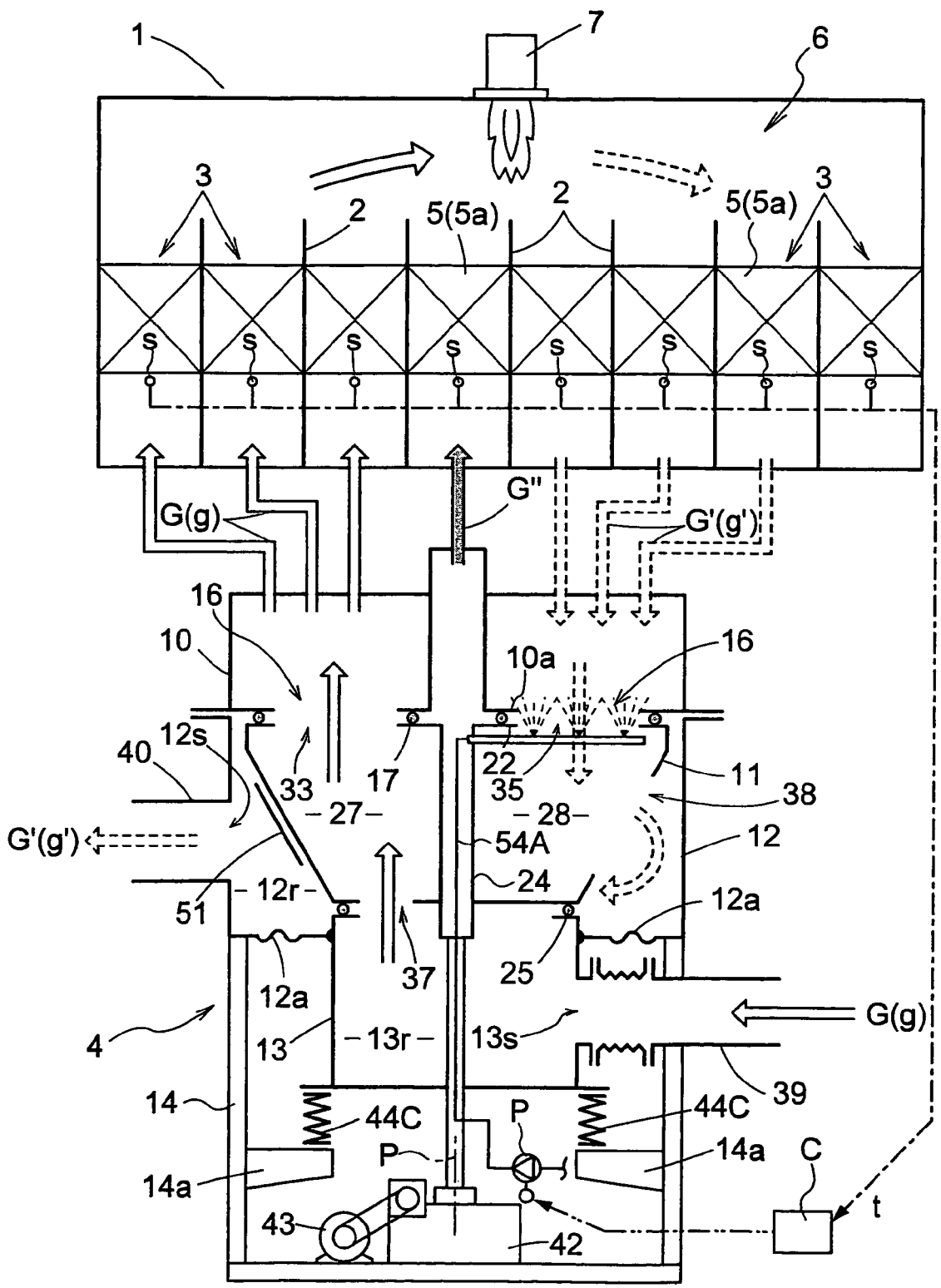

[Fig.31]
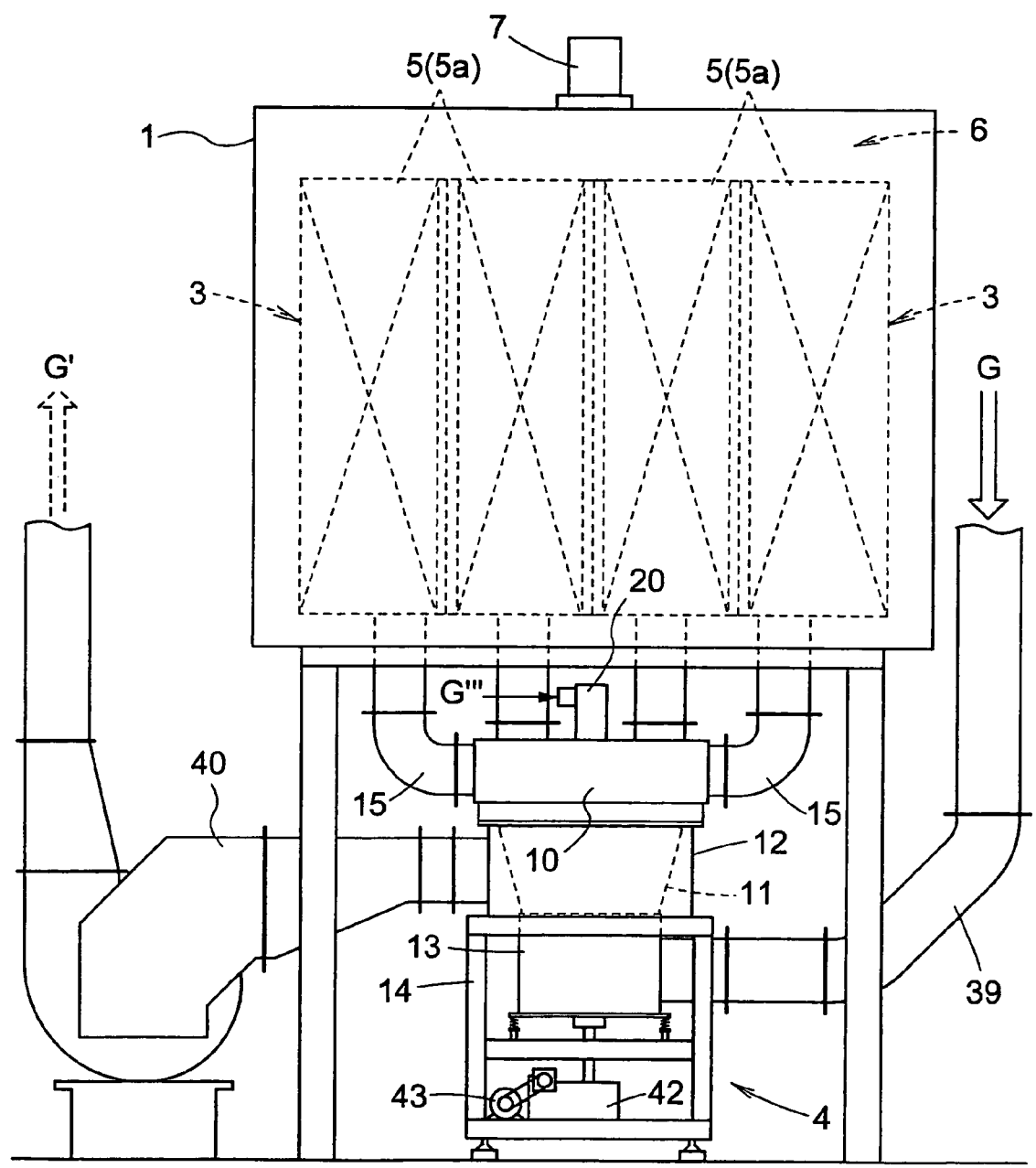

[Fig.32]
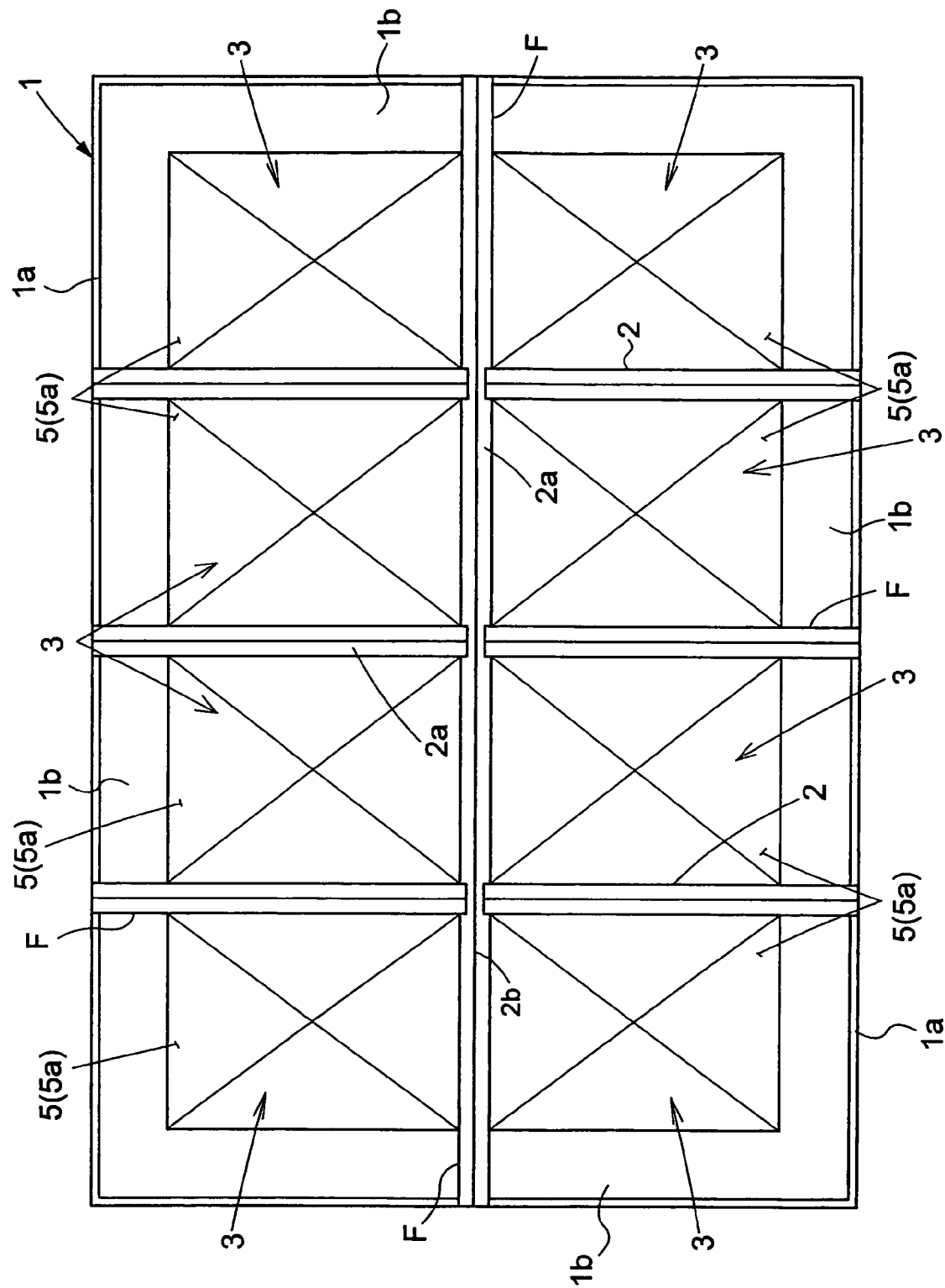

[Fig.33]
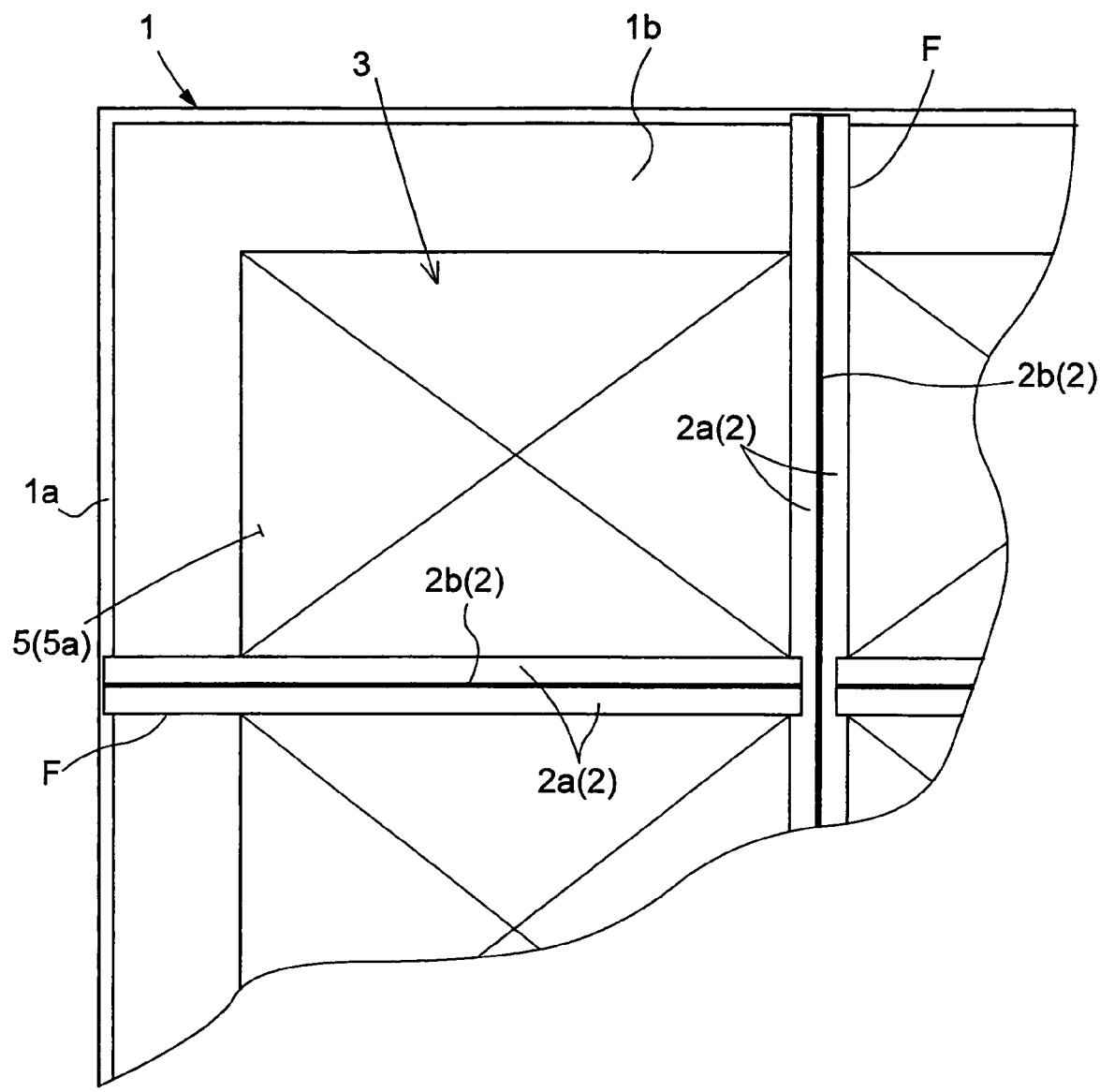

[Fig.34]
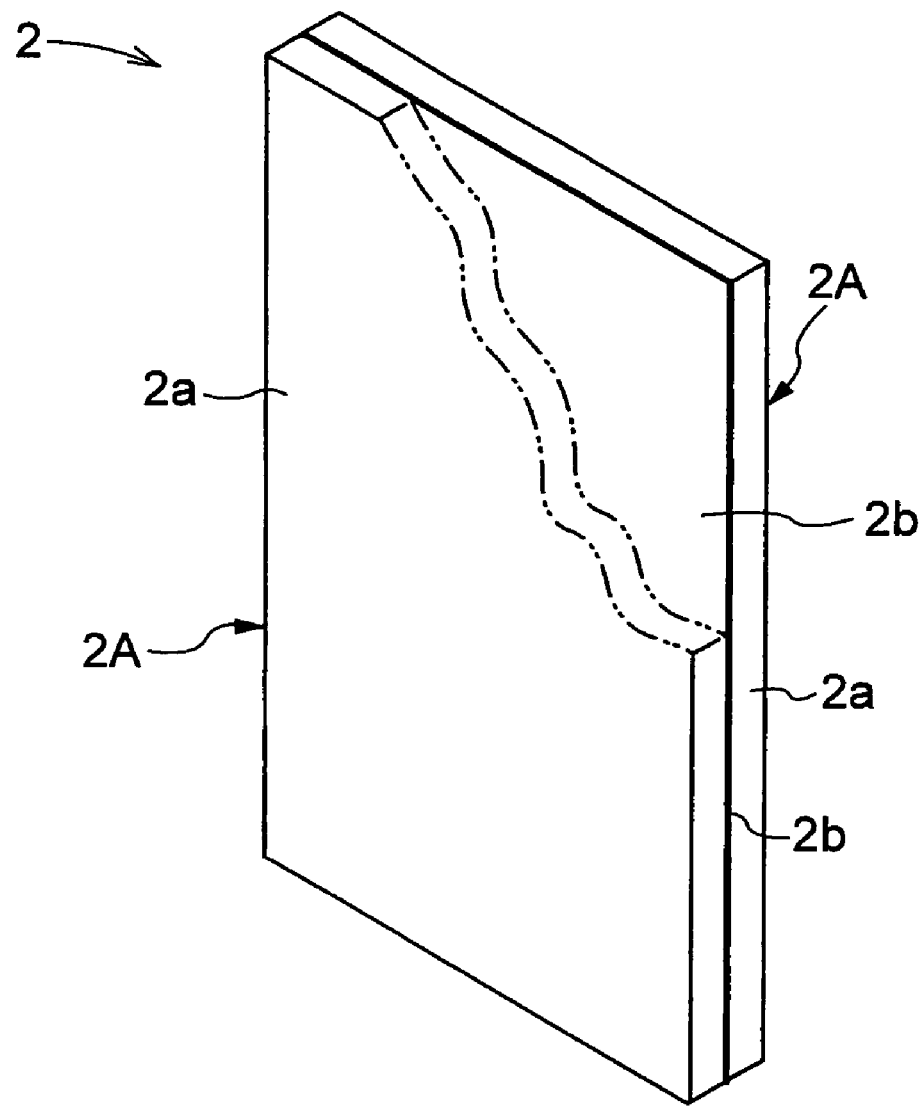

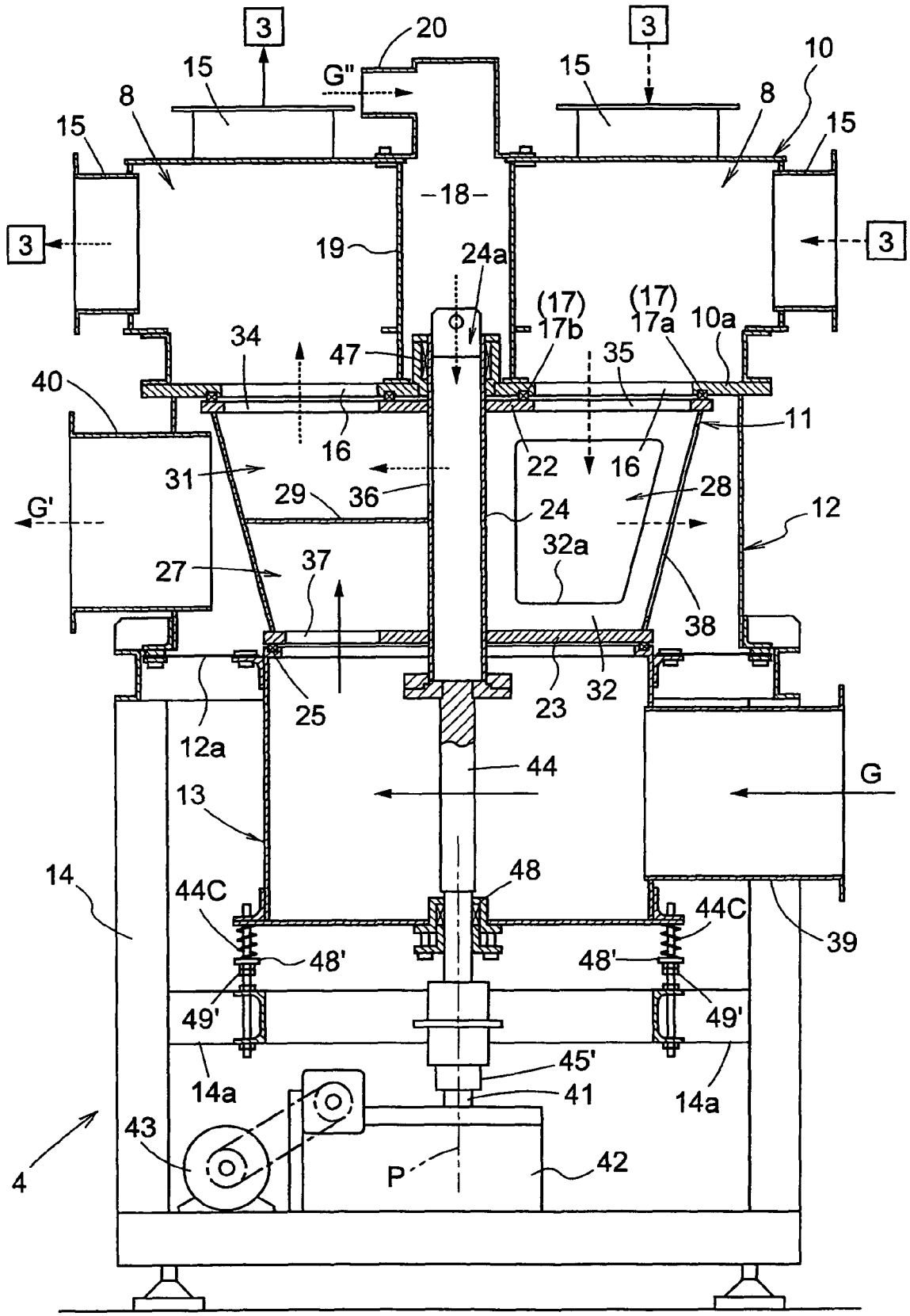
[Fig.35]

[Fig.36]
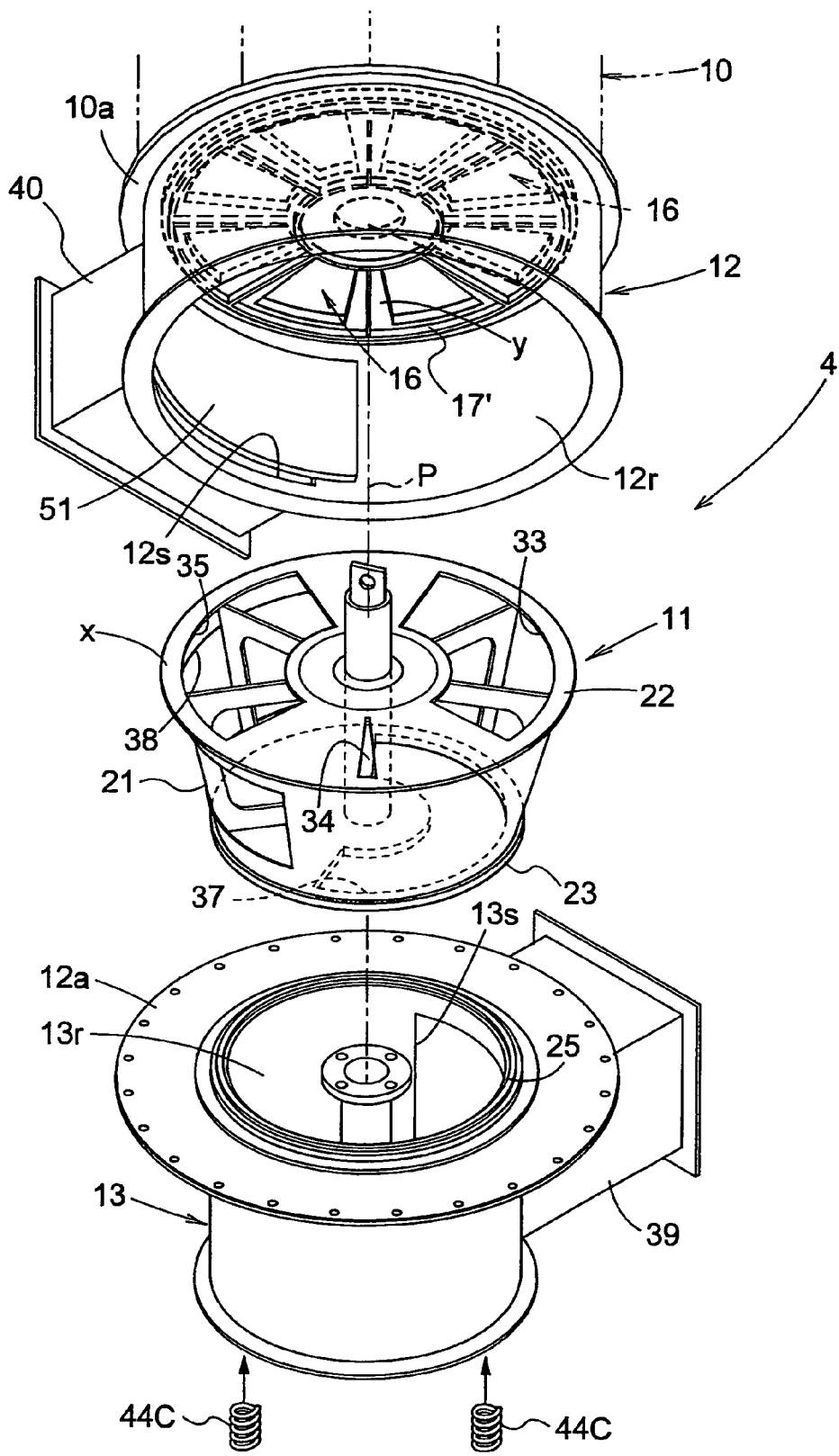
PRIOR ART

[Fig.37]
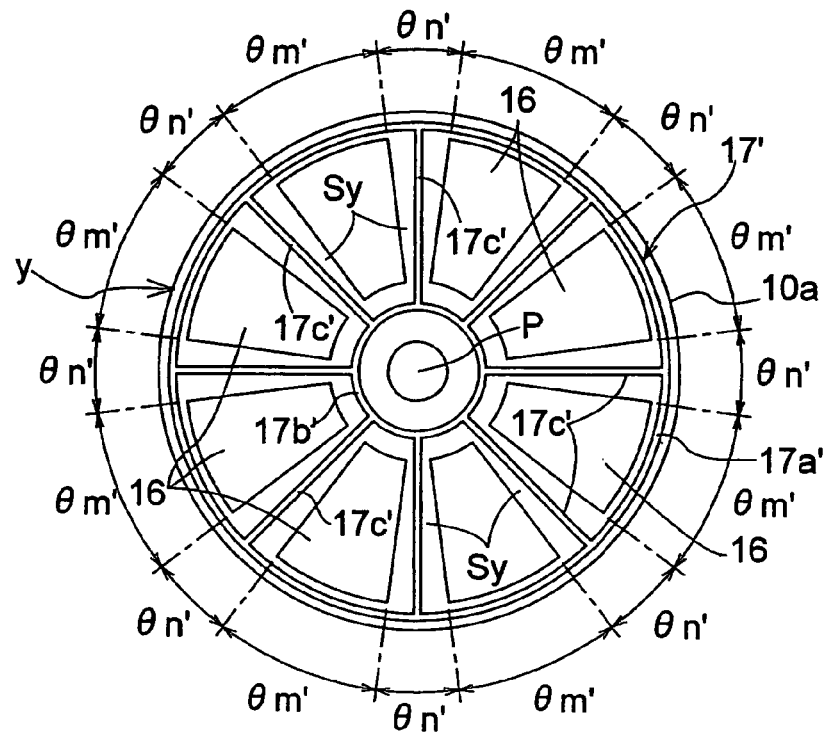
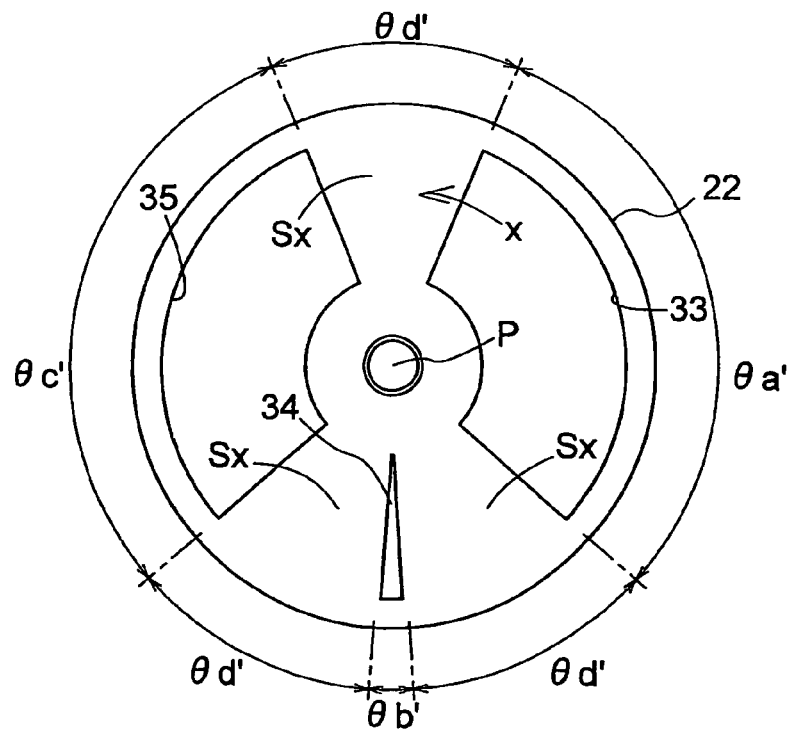
PRIOR ART

[Fig.38]
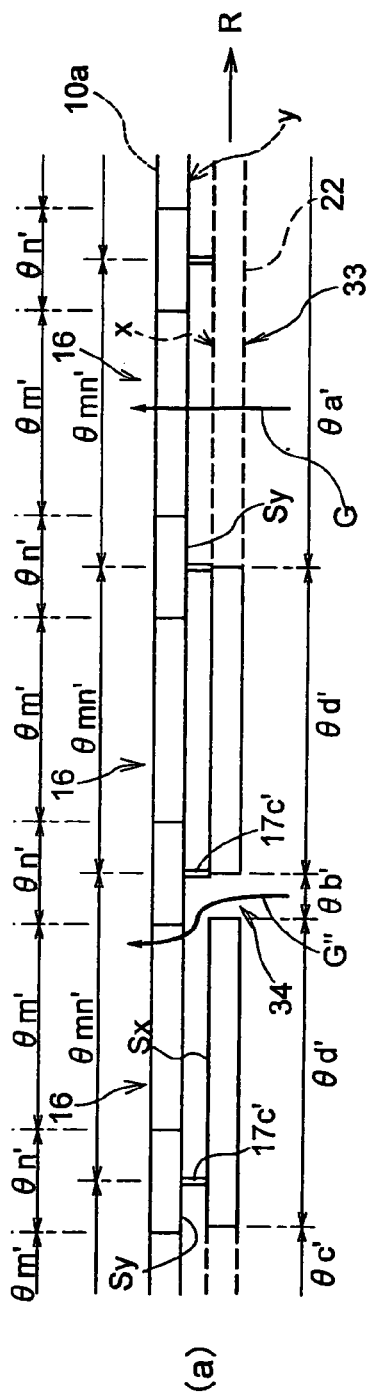
(a)
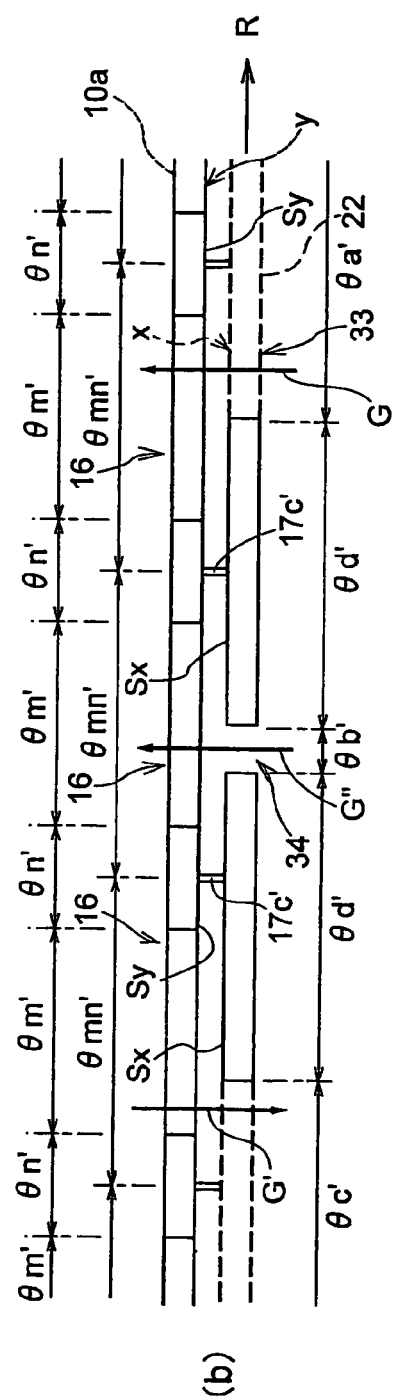
(b)
PRIOR ART

[Fig.39]
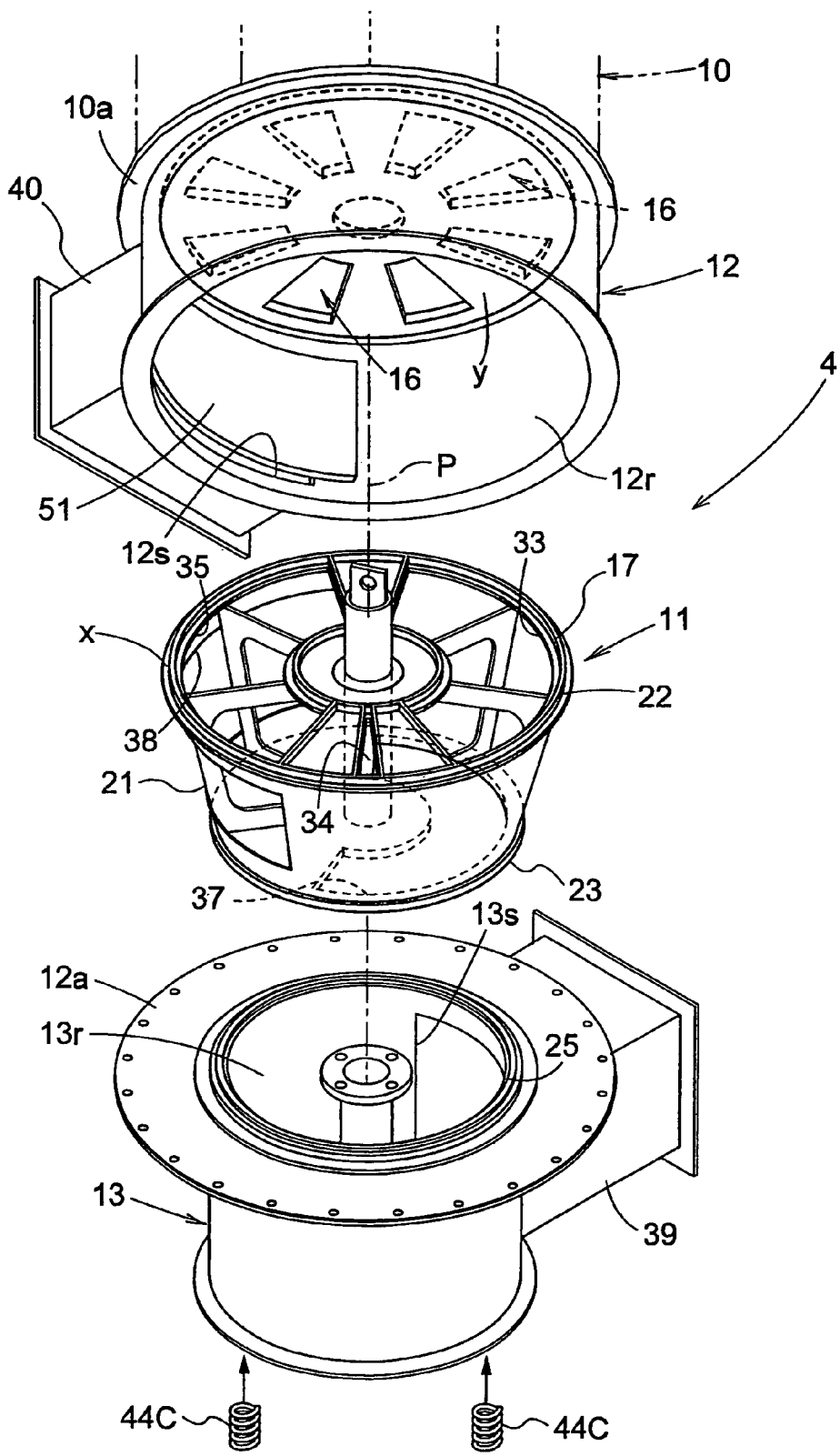
PRIOR ART

[Fig.40]
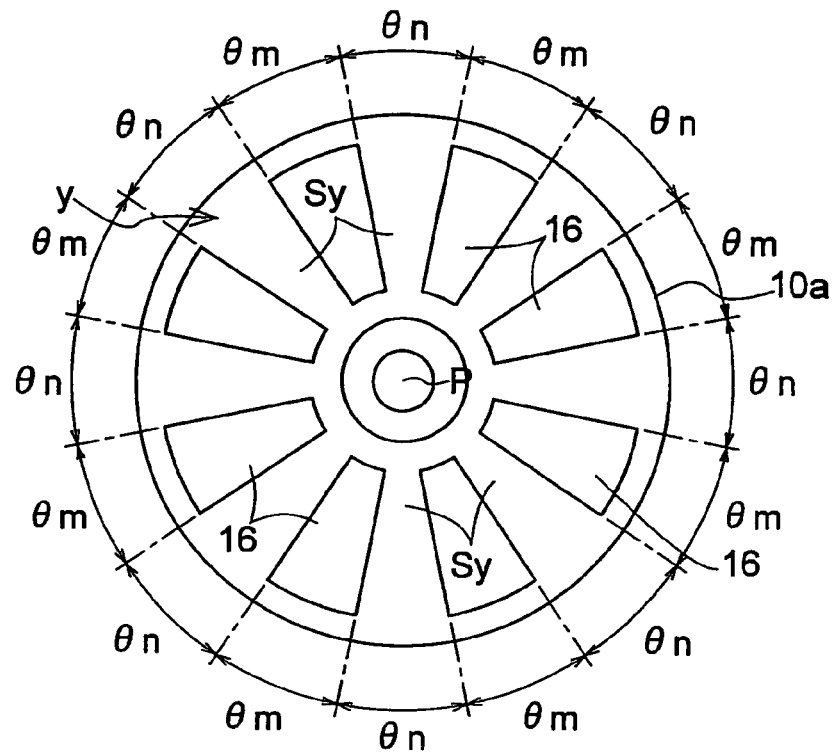
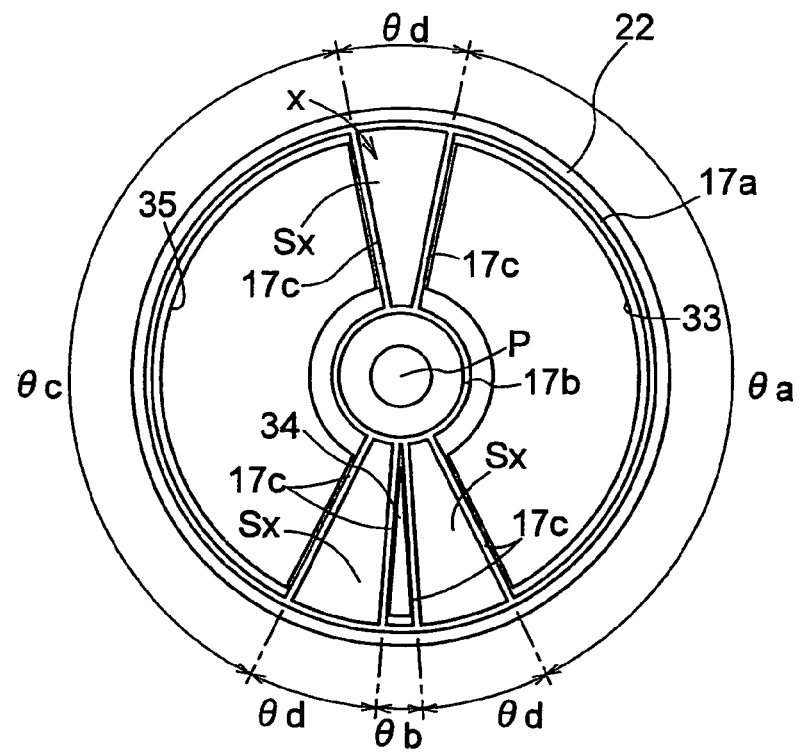
PRIOR ART

[Fig.41]
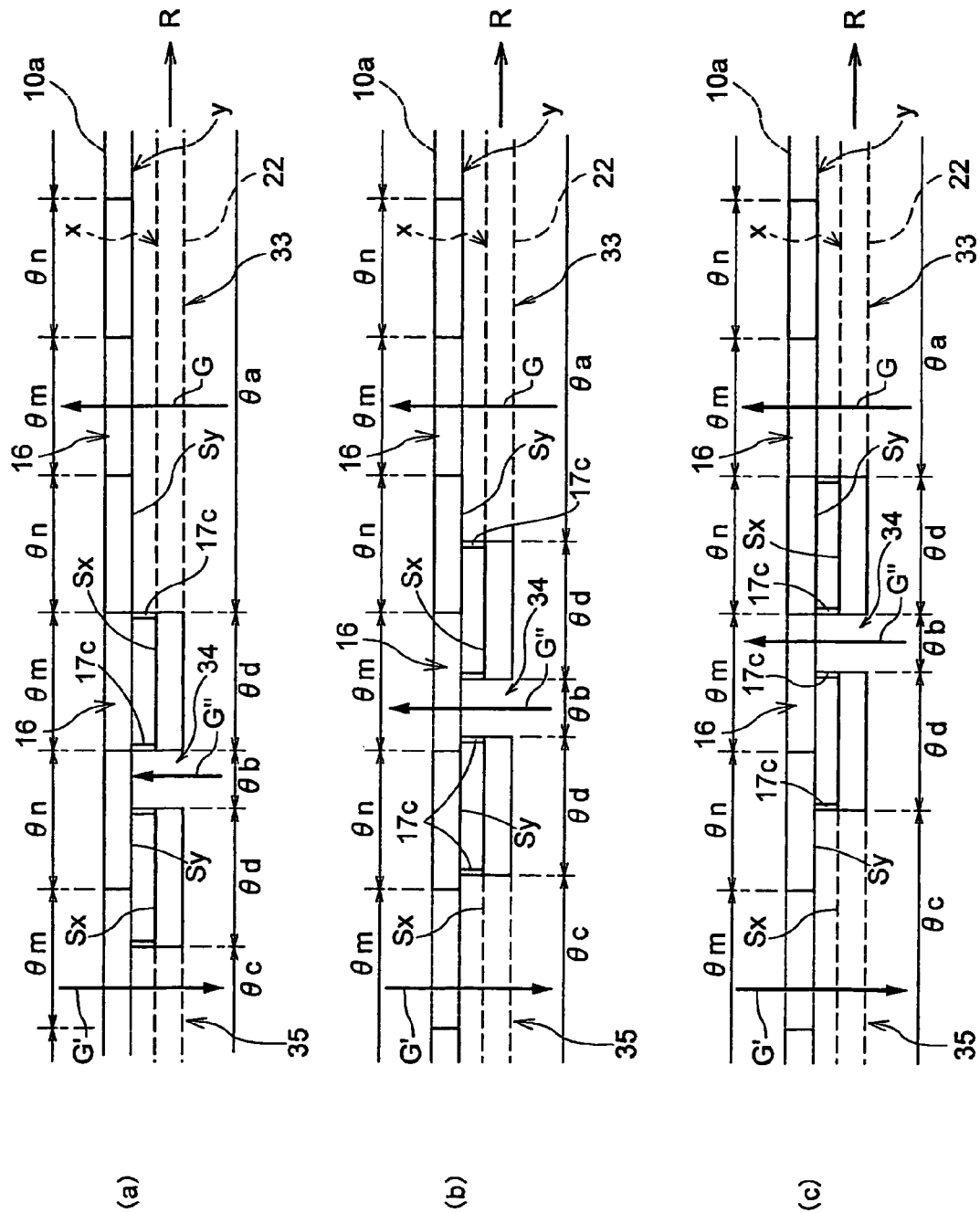

[Fig.42]
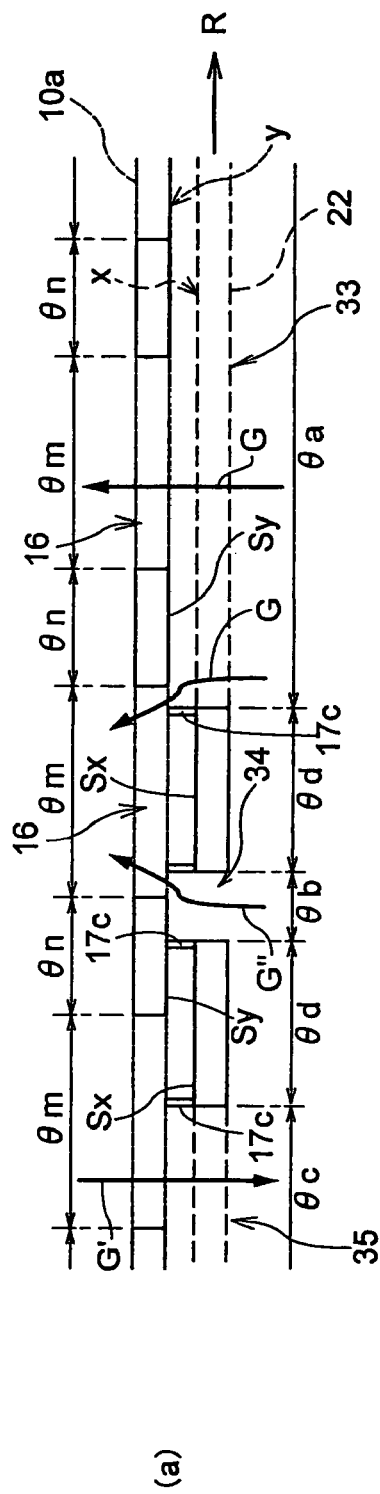
(a)
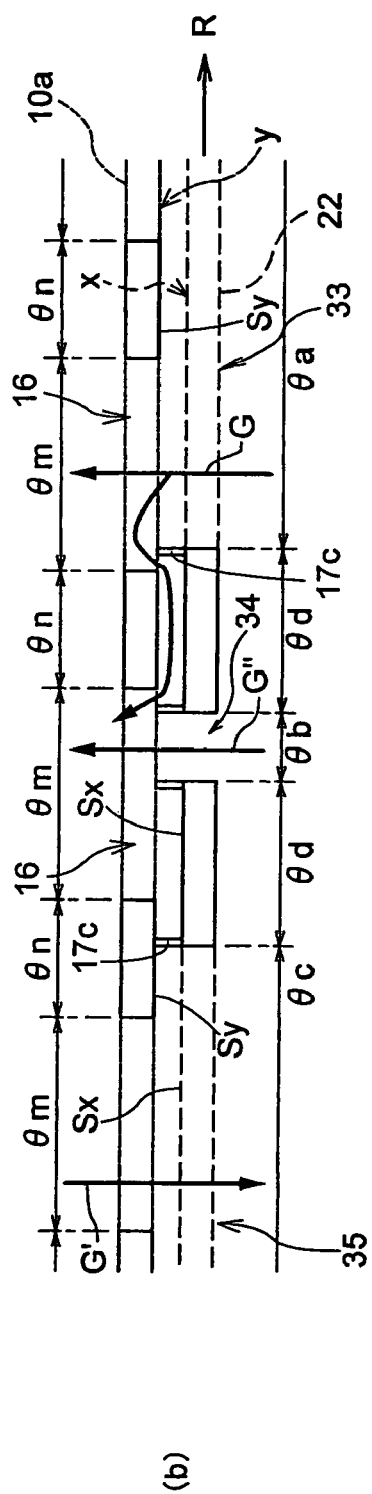
(b)
PRIOR ART

[Fig.43]
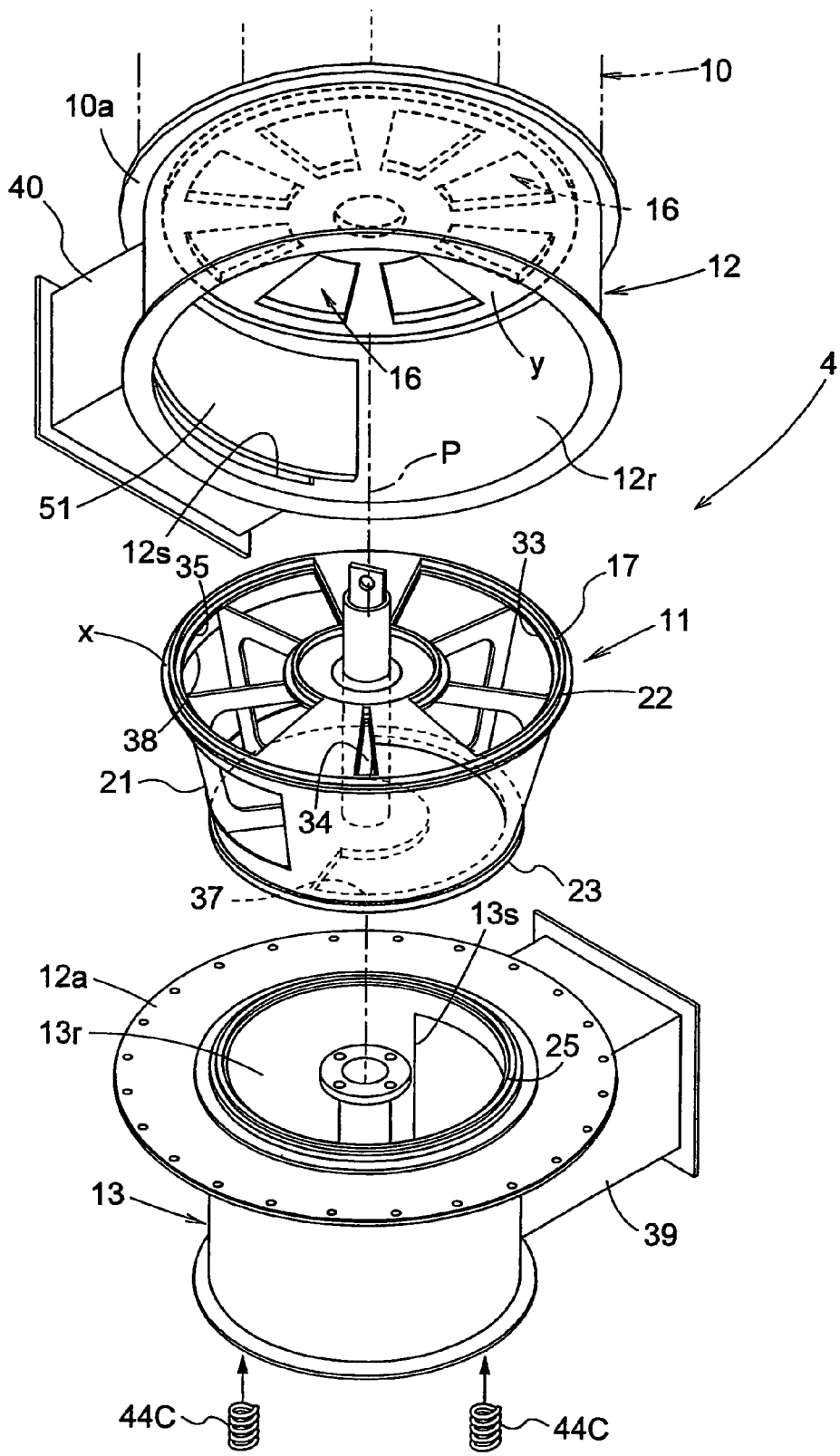
PRIOR ART

[Fig.44]
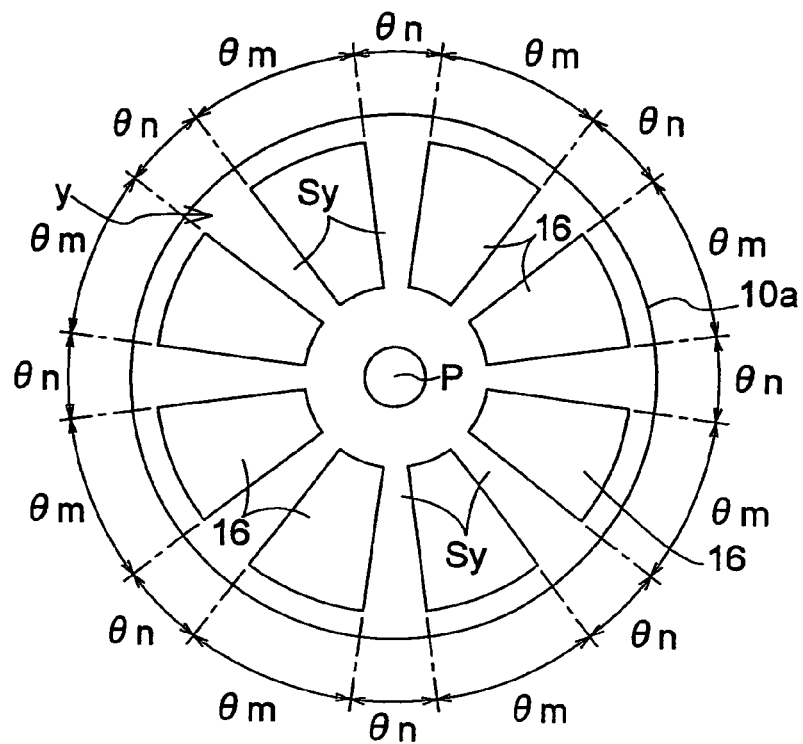
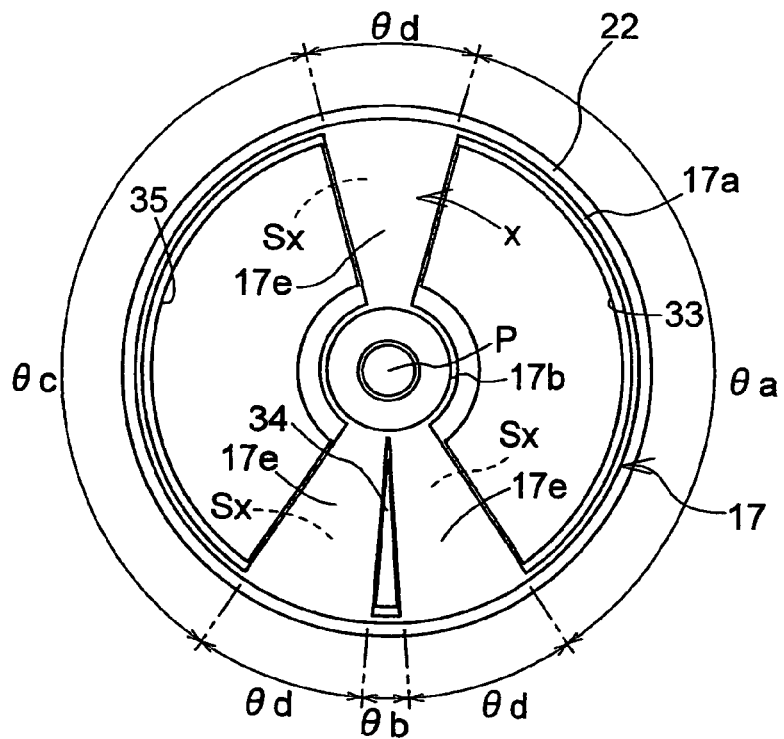
PRIOR ART

[Fig.45]
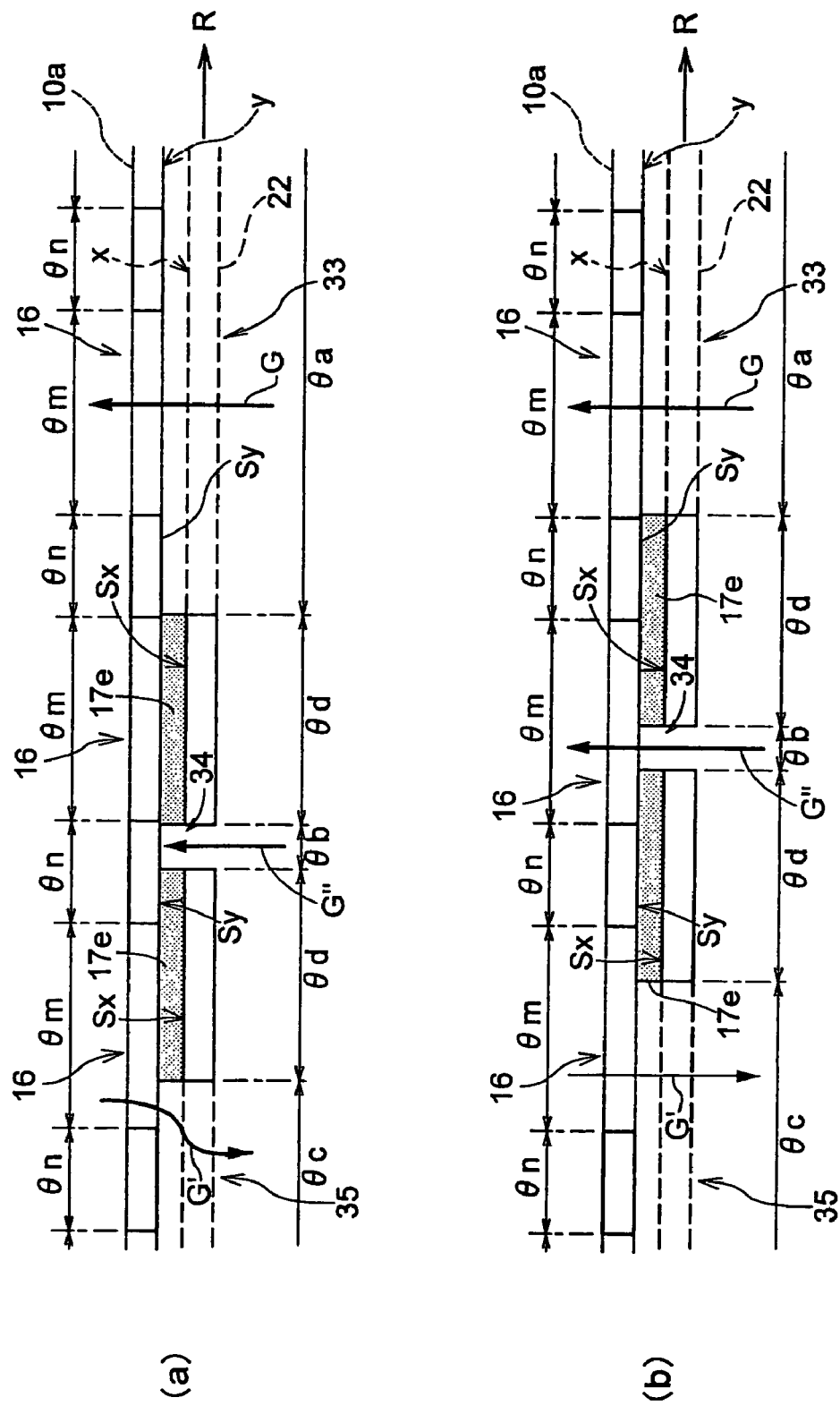

[Fig.46]
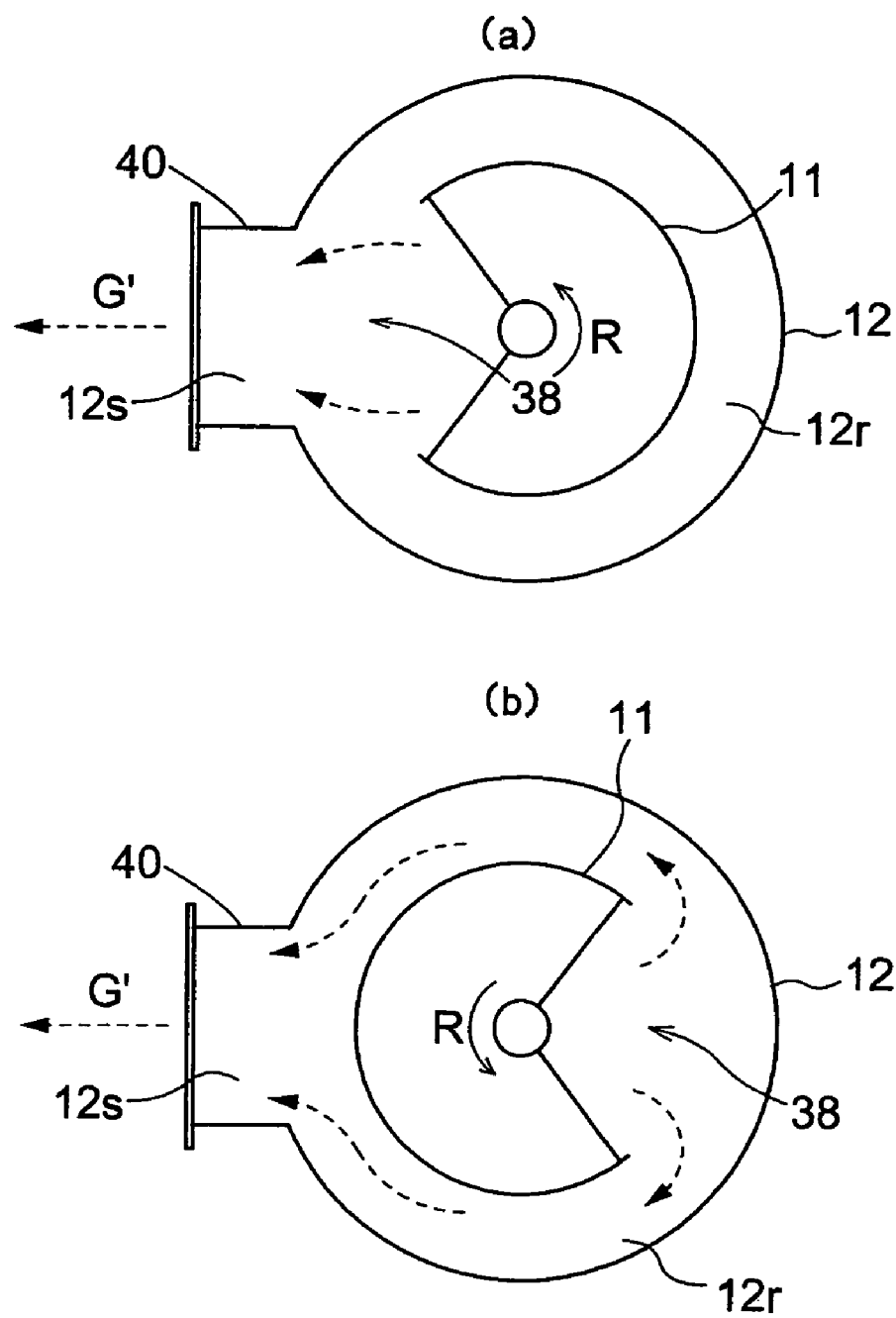

THERMAL STORAGE TYPE GAS TREATING APPARATUS

BACKGROUND OF THE INVENTION

1. Field of the Invention

The present invention relates to a thermal storage type gas treating apparatus comprising a plurality of thermal storage chambers containing a thermal storage medium, each of the thermal storage chambers having one end thereof communicating with a combustion chamber having a combustion device; a valve member disposed between a distributor and a gas chamber device to be rotatable in slidable contact with the distributor and the gas chamber device, the distributor defining a plurality of supply and exhaust ports arranged in a direction of rotation of the valve member, each of the supply and exhaust ports communicating with the other end of one of the thermal storage chambers; the valve member defining a supply port for a gas to be treated and an exhaust port for a treated gas arranged to oppose to and communicate with said supply and exhaust ports, with rotation of the valve member, the supply port and the exhaust port not opposing to or communicating with the same supply and exhaust ports simultaneously; a gas feed passage for communicating with the supply port in the valve member through the gas chamber device, and a gas exhaust passage for communicating with the exhaust port of the valve member through the gas chamber device; and a distributor-side seal element disposed between the distributor and the valve member for precluding communication between the supply port and the exhaust port through a gap between the distributor and the valve member; the valve member being rotatable to supply the gas to be treated introduced from the gas feed passage into the valve member to the distributor through the supply port, and to discharge the treated gas exhausted from the distributor to the valve member through the exhaust port to the gas exhaust passage.

The present invention also relates to a seal structure and a resistance adjusting mechanism of a rotation type selector valve usable with the thermal storage type gas treating apparatus.

Further, the present invention relates to a thermal storage medium layer cleaning method executed for the above thermal storage type gas treating apparatus.

2. Description of Related Art

As a thermal storage type gas treating apparatus of this type, and a rotation type selector valve usable with the thermal storage type gas treating apparatus, the following are known.

(Outline of the Thermal Storage Type Gas Treating Apparatus)

Conventionally, in the thermal storage type gas treating apparatus, a gas to be treated introduced into a valve member from a gas feed passage is passed through a supply port of the valve member and supply and exhaust ports opposed to and communicating with the supply port, and through part of thermal storage chambers to a combustion chamber. In the combustion chamber, contaminants, offensive odor substances and the like in the gas to be treated are disposed of by combustion.

The treated gas is passed through the other thermal storage chambers to store the heat in a thermal storage medium in the thermal storage chambers. Then, the gas is passed through the supply and exhaust ports opposed to the thermal storage chambers, and through an exhaust port of the valve member opposed to and communicating with the supply and exhaust ports, out into a gas exhaust passage.

In this process, the valve member is rotated to switch each of the supply port and exhaust port of the valve member to oppose to and communicate with successively different ones of the supply and exhaust ports (namely, to successively switch the thermal storage chambers for passing the gas to be treated and the thermal storage chambers for passing the treated gas). As a result, the thermal storage medium storing the heat from the treated gas having passed therethrough preheats the gas to be treated passing through each thermal storage chamber, thereby to achieve an improvement in thermal efficiency.

(Biasing Structure for the Seal Portion)

In this type of thermal storage type gas treating apparatus, a seal element (i.e. a distributor-side seal element) precludes communication between the supply port and exhaust port through a gap between a distributor and the valve member. Thus, the gas to be treated passing through the supply port is prevented from mixing into the treated gas discharged from the distributor to the exhaust port of the valve member. A seal element of a gas chamber device prevents the gas from leaking through a gap between the gas chamber device and valve members. As a result, the gas to be treated introduced through the supply port is prevented from mixing into the treated gas exhausted to the exhaust port of the valve member.

Conventionally, for the breaking of communication by the distributor-side seal element (i.e. sealing) between the valve member and distributor, the distributor-side seal element is attached to the distributor as attached to a biasing device such as elastic elements. By pressing the distributor-side seal element toward the valve member with this biasing device, the distributor-side seal element is reliably placed in pressure contact with the valve member. For the breaking of communication by the seal element of the gas chamber device between the valve member and gas chamber device, the seal element is attached to the gas chamber device as attached to a biasing device such as elastic elements. By pressing the seal element of the gas chamber device toward the valve member with this biasing device, the seal element of the gas chamber device is reliably placed in pressure contact with the valve member. A proposal has been made to enhance sealing performance with the two seal elements (see Patent Document 1, for example).

(Seal Structure of the Rotation Type Selector Valve)

The rotation type selector valve noted hereinbefore (see FIG. 36) switches an opposed and communicating relation between a plurality of main valve ports and a plurality of auxiliary valve ports by switching the main valve ports opposed to each auxiliary valve port with a relative rotation between a main valve component and an auxiliary valve component, thereby switching a connecting relation between a plurality of main passages and a plurality of auxiliary passages. Between a main opposite surface of the main valve component and an auxiliary opposite surface of the auxiliary valve component close and opposed thereto, a seal element is disposed for preventing fluids, which should pass through different main valve ports and auxiliary valve ports, from becoming mixed through a gap between the two opposite surfaces.

For attaching this seal element, there are a form in which the seal element attached to the auxiliary opposite surface is placed in slidable contact with the main opposite surface, and a form in which, conversely to the above, the seal element attached to the main opposite surface is placed in slidable contact with the auxiliary opposite surface. In the form of attaching the seal element to the auxiliary opposite surface of the auxiliary valve component, as shown in FIGS. 36 and 37, the seal element attached to the auxiliary opposite surface includes annular seal portions surrounding an axis of relative rotation between the main valve component and auxiliary valve component, and located at opposite outer sides (inside and outside in the illustrated example) in a direction of width of a row of the main valve ports, to be slidable in contact with the main opposite surface at opposite outer sides (also inside and outside in the illustrated example) of a row of the main valve ports, and dividing seal portions located in the middle of closed portions between the adjacent auxiliary valve ports, seen in the direction of the relative rotation, and having a linear shape extending between the two annular seal portions located at the opposite outer sides (inside and outside) in the direction of width of the row of the auxiliary valve ports, to be slidable in contact with the main opposite surface . . . Conventional Example 1 (see Patent Document 2).

In the form of attaching the seal element to the main opposite surface of the main valve component, on the other hand, as shown in FIGS. 39 and 40, the seal element attached to the main opposite surface includes annular seal portions surrounding the axis of relative rotation between the main valve component and auxiliary valve component, and located at opposite outer sides (inside and outside in the illustrated example) in a direction of width of a row of the main valve ports, to be slidable in contact with the auxiliary opposite surface at opposite outer sides (also inside and outside in the illustrated example) of a row of the auxiliary valve ports, and dividing seal portions located adjacent and outside two edges, seen in the direction of the relative rotation, of each of the main valve ports, and having a linear shape extending between the two annular seal portions located at the opposite outer sides (inside and outside) in the direction of width of the row of the main valve ports, to be slidable in contact with the auxiliary opposite surface . . . Conventional Example 2 (see Patent Document 3).

In the form of attaching the seal element to the main opposite surface of the main valve component, a proposal has been made to attach the seal element to the main opposite surface "x" as shown in FIGS. 43 and 44. The seal element includes annular seal portions surrounding the axis of relative rotation between the main valve component and auxiliary valve component, and located at opposite outer sides (inside and outside) in a direction of width of a row of the main valve ports, to be slidable in contact with the auxiliary opposite surface at opposite outer sides (inside and outside) of a row of the auxiliary valve ports, and planar dividing seal portions extending between the annular seal portions, and covering entire surfaces of the respective closed portions Sx between the main valve ports, to be slidable in contact with the auxiliary opposite surface . . . Conventional Example 3 (see Patent Document 4).

(Pressure Adjusting Mechanism of the Rotation Type Selector Valve)

A conventional rotation type selector valve of this type has a valve seat plate, and a rotary valve member rotatable in slidable contact with the valve seat plate. The valve seat plate defines a plurality of selectable passage ports arranged in a direction of rotation of the valve member. The valve member defines a first and a second internal passages each having a selecting side opening at one end thereof for becoming opposed to and communicating with the plurality of selectable passage ports successively with rotation of the valve member, and a common side opening at the other end movable in the direction of rotation of the valve member. The selecting side opening of the first internal passage and the selecting side opening of the second internal passage are arranged not to become opposed to or communicating with the same one of the selectable passage ports simultaneously.

A first passage chamber and a second passage chamber are provided in constant communication with the common side openings of the first and second internal passages movable in the direction of valve rotation with rotation of the valve member. A first common passage port opens into one location in the direction of valve rotation of the first passage chamber. A second common passage port opens into one location in the direction of valve rotation of the second passage chamber. This rotation type selector valve is used, for example as a switching device of the thermal storage type gas treating apparatus (Patent Document 2, for example).

(Gas Cooling Device)

Further, a conventional thermal storage type gas treating apparatus of this type switches, with a switching device, the thermal storage medium layer which passes the gas to be treated to the combustion chamber, and the thermal storage medium layer which passes the treated gas from the combustion chamber. The thermal storage medium storing the heat from the hot treated gas from the combustion chamber having passed therethrough preheats the gas to be treated passing through thermal storage medium in the next step. The preheated gas to be treated is put to combustion treatment in the combustion chamber. This reduces the amount of heating in the combustion chamber required for combustion treatment of the gas to be treated. Conventionally, in this type of thermal storage type gas treating apparatus, the hot treated gas from the combustion chamber having passed through the thermal storage medium layer for thermal storage is discharged as it is through a portion of the gas supply and exhaust gas passage where the switching device is mounted (Patent Documents 4 and 5, for example).

[Patent Document 1] Patent Publication "Kokai" No. 2001-74225

[Patent Document 2] Patent Publication "Kokai" No. H10-61940

[Patent Document 3] Patent Publication "Kokai" No. H7-305824

[Patent Document 4] Patent Publication "Kokai" No. 2001-304531

[Patent Document 5] Patent Publication "Kokai" No. H9-217918

However, the prior art noted above has the following problems.

(Biasing Structure for the Seal Portion)

The construction having the distributor-side seal element attached to the distributor as attached to the biasing device requires a construction that allows the distributor-side seal element alone to move toward and away from the valve member while also maintaining gastightness between the distributor-side seal element and distributor. This poses a problem of complicating the apparatus construction and rendering manufacture of the apparatus difficult.

Since the distributor-side seal element is displaced alone, the displacement tends to be accompanied by clattering. This poses a problem of lowering sealing performance all the more.

Similarly, the construction having the seal element of the gas chamber device attached to the gas chamber device as attached to the biasing device requires a construction that allows the seal element gas chamber device alone to move toward and away from the valve member while also maintaining gastightness between the seal element of the gas chamber device and the distributor. This poses a problem of complicating the apparatus construction and rendering manufacture of the apparatus difficult. Since the seal element of the gas chamber device is displaced alone, the displacement tends to be accompanied by clattering. This poses a problem of lowering sealing performance all the more.

In view of this state of the art, a primary object of the present invention is to solve the above problem effectively with a rational improvement.

(Seal Structure of the Rotation Type Selector Valve)

In the construction having the seal element attached to the auxiliary opposite surface (FIGS. 36 and 37), where the width θd' in the direction of rotation of the closed portion Sx between the main valve ports in the main opposite surface is equal to or larger than the interval θmn' between adjacent dividing seal portions (θd'≧θmn'; strictly, equal to or larger than the inside measurement interval between adjacent dividing seal portions) on the auxiliary opposite surface as shown in FIGS. 38 (a) and (b), it is possible to prevent mixing of the fluids which should pass through different main valve ports and auxiliary valve ports. Therefore, the width θn' in the direction of rotation of the closed portions Sy between the auxiliary valve ports in the auxiliary opposite surface may be made small. As a result, a large width θm' in the direction of rotation of each auxiliary valve port in the auxiliary opposite surface is secured (in other words, a large opening area of each auxiliary valve port is secured). This is advantageous in reduction of fluid pressure loss and compactness of the apparatus. However, the construction of the Conventional Example 2 of having the seal element attached to the main opposite surface "x" has a problem that the width θm the direction of rotation of each auxiliary valve port in the auxiliary opposite surface "y" is restricted to be small.

That is, in the construction of Conventional Example 2 (FIGS. 39 and 40), to avoid a fluid mixture in the form shown in FIG. 42 (a) and a fluid mixture in the form shown in FIG. 42 (b), as shown in FIG. 41 (a)-(c), the interval θd between adjacent dividing seal portions on the closed portion Sx between the main valve ports in the main opposite surface "x" (in short, the width in the direction of rotation of the closed portion Sx) must be made equal to or larger than the width θm in the direction of rotation of each auxiliary valve port in the auxiliary opposite surface, and the width θn in the direction of rotation of the closed portion between the auxiliary valve ports in the auxiliary opposite surface equal to or larger than the interval θd between adjacent dividing seal portions on the closed portion Sx between the main valve ports in the main opposite surface (θd≧θm and θn≧θd). Therefore, the width θm in the direction of rotation (opening area) of each auxiliary valve port in the auxiliary opposite surface is restricted to be small. A solution of this problem is desired since, in certain situations, such as because of design conditions, the seal element must be attached to the main opposite surface of the main valve component.

In the construction of Conventional Example 3, as shown in FIGS. 45 (a) and (b), as long as the width θd in the direction of rotation of the planar seal portions is equal to or larger than the width θm in the direction of rotation of each auxiliary valve port in the auxiliary opposite surface, it is possible to prevent mixing of the fluids which should pass through different main valve ports and auxiliary valve ports. Therefore, the width θn in the direction of rotation of the closed portions Sy between the auxiliary valve ports in the auxiliary opposite surface may be made small (that is, the width θm (opening area) in the direction of rotation of each auxiliary valve port 16 may be made large). However, the seal element cannot be formed only of linear seal portions. The seal element must have a special shape having planar dividing seal portions of large area equivalent to the closed portions Sx between the main valve ports. This poses problems that the manufacture cost of the seal element is high, an attachment mode of only fitting the linear seal portions in grooves is insufficient, and attachment of the seal element to the main opposite surface also is difficult.

In view of the state of the art noted above, a primary object of the present invention is, in the form of attaching a seal element provided between the main opposite surface and auxiliary opposite surface to the main opposite surface, to secure a large opening area of each auxiliary valve port in the auxiliary opposite surface, while avoiding specialization of the shape of the seal element as in Conventional Example 3, thereby realizing an improved performance of the thermal storage type gas treating apparatus.

(Pressure Adjusting Mechanism)

In the conventional rotation type selector valve described hereinbefore, in the movement of the common side opening of the first internal passage in the direction of rotation of the valve member accompanying a rotation of the rotary valve member, it alternately assumes the position shown in (a) of FIG. 46 having approached the first common passage port and the position shown in (b) of FIG. 46 away from the first common passage port. In the state where the common side opening of the first internal passage has approached the first common passage port, a small fluid passage resistance occurs between these openings. In the state where the common side opening of the first internal passage has moved away from the first common passage port, on the other hand, an increased fluid passage resistance occurs between these openings. The variations in the passage resistance pose a problem of periodic variations in the flow rate of the fluid through the first internal passage (the treated gas in the preceding example of thermal storage type gas treating apparatus) occurring with a rotation of the rotary valve member. There was also a problem of periodic variations in the flow rate of the fluid through the second internal passage (the gas to be treated in the preceding example of thermal storage type gas treating apparatus) occurring for the same reason.

Particularly, in the rotation type selector valve shown in FIG. 46, when the common side opening of the first internal passage has approached the first common passage port, the two openings are adjacent and facially opposed to each other in the first passage chamber. When the common side opening of the first internal passage has moved away from the first common passage port, on the other hand, the two openings communicate with each other through a narrow fluid passage extending circumferentially of the rotary valve member in the first passage chamber. In this valve construction, large variations occur in the fluid passage resistance between the two openings. Therefore, the periodic flow rate variations accompanying a rotation of the rotary valve member are especially notable.

In the thermal storage type gas treating apparatus using this rotation type selector valve, t the periodic flow rate variations of the passing fluid noted above (i.e. volume variations of the passing gas) gives rise to problems of a lowering of apparatus performance and operating trouble.

In view of this state of the art, a primary object of the present invention is to provide a rational improvement for preventing the periodic flow rate variations in the rotation type selector valve, and preventing a lowering of performance and operating trouble of the thermal storage type gas treating apparatus resulting from the periodic flow rate variations.

(Cooling Device)

In the conventional thermal storage type gas treating apparatus, the switching device has seal elements of various constructions in order to prevent mixing of the gas to be treated into the treated gas by leakage, and the leakage to the exterior of each gas. To avoid heat damage of the seal elements, the temperature of the treated gas discharged from the combustion chamber is restricted. Therefore, the temperature of the gas to be treated introduced into apparatus (inlet temperature in the thermal storage type gas treating apparatus) and the combustion temperature in the combustion chamber are also restricted to limit the gas that can be treated. There have been cases where sufficient combustion treatment cannot be performed in the combustion chamber.

In view of this state of the art, a primary object of the present invention is to solve the above problem effectively with a rational improvement.

SUMMARY OF THE INVENTION

A first characteristic construction of a thermal storage type gas treating apparatus according to the present invention lies in comprising:

a plurality of thermal storage chambers containing a thermal storage medium, each of the thermal storage chambers having one end thereof communicating with a combustion chamber having a combustion device;

a valve member disposed between a distributor and a gas chamber device to be rotatable in slidable contact with the distributor and the gas chamber device, the distributor defining a plurality of supply and exhaust ports arranged in a direction of rotation of the valve member, each of the supply and exhaust ports communicating with the other end of one of the thermal storage chambers;

the valve member defining a supply port for a gas to be treated and an exhaust port for a treated gas arranged to oppose to and communicate with said supply and exhaust ports, with rotation of the valve member, the supply port and the exhaust port not opposing to or communicating with the same supply and exhaust ports simultaneously;

a gas feed passage for communicating with the supply port of the valve member through the gas chamber device, or a gas exhaust passage for communicating with the exhaust port of the valve member through the gas chamber device; and a distributor-side seal element disposed between the distributor and the valve member for precluding communication between the supply port and the exhaust port through a gap between the distributor and the valve member;

the valve member being rotatable to supply the gas to be treated introduced from the gas feed passage into the valve member to the distributor through the supply port, and to discharge the treated gas exhausted from the distributor to the valve member through the exhaust port to the gas exhaust passage;

wherein the thermal storage type gas treating apparatus comprises a valve biasing device for supporting the valve member to be displaceable toward and away from the distributor, and pressing the valve member toward the distributor while being inoperative to the gas chamber device.

With this construction, the valve biasing device presses the valve member toward the distributor whereby the distributor-side seal element disposed between the distributor and the valve member may be placed in pressure contact with the valve member or distributor in the form of the valve member pressing the seal element (that is, in pressure contact with the valve member where the seal element is attached to the distributor, and in pressure contact with the distributor where the seal element is attached to the valve member).

With the seal element placed in pressure contact with the valve member or distributor by pressing action of the valve member, it is possible to avoid the situation where, as in the conventional apparatus described hereinbefore, the distributor-side seal element is attached to the distributor, and the distributor is required to have a construction that allows the distributor-side seal element alone to move toward and away from the valve member while also maintaining gastightness between the distributor and distributor-side seal element, and the situation where, conversely, the distributor-side seal element is attached to the valve member, and the valve member is required to have a construction that allows the distributor-side seal element alone to move toward and away from the distributor while also maintaining gastightness between the valve member and distributor-side seal element. While adopting the simple construction of fixedly attaching the seal element to the distributor or valve member, the seal element may be properly placed in pressure contact with the valve member or distributor by the biasing force of the valve biasing device.

Since the construction for pressing the valve member can be simplified, the complication of the apparatus construction as with the conventional apparatus noted hereinbefore may be avoided, and the manufacture of the apparatus is made easy. Further, since displacement of the seal element alone is not allowed, the problem of causing a lowering of sealing performance all the more because of the clattering occurring with the displacement is effectively avoided to assure high sealing performance reliably and stably.

With the seal element placed in pressure contact with the valve member or distributor by the biasing force of the valve biasing device as noted above, high sealing performance can be secured even where the seal element has low elasticity. It is therefore possible to use a seal element with low elasticity, excellent in wear and abrasion resistance and in heat resistance, or a seal element with low elasticity and a small coefficient of thermal expansion, compared with the past. As a result, the frequency of changing the distributor-side seal element may be reduced effectively, and sealing performance may be enhanced with more effectively also from the viewpoint of coping with heat.

Further, with the distributor-side seal element placed in pressure contact with the valve member or distributor by the valve biasing device pressing the valve member to the distributor, the manufacturing accuracy of the apparatus required to obtain a necessary sealing performance may be lowered. In this sense also, the manufacture of the apparatus may be made still easier.

As a different mode of placing the distributor-side seal element disposed between the distributor and valve member in pressure contact with the distributor or valve member, it is conceivable to adopt a construction in which a biasing device biases the gas chamber device toward the valve member and presses the gas chamber device on the valve member, thereby biasing the valve member toward the distributor (that is, the biasing device biases the valve member toward the distributor through the gas chamber device). With such a construction, since the gas chamber device plays a part, it is difficult to adjust the biasing force of the biasing device so that the distributor-side seal element may be placed in pressure contact with the distributor or valve member by an appropriate force.

However, with the first characteristic construction, the biasing force of the valve biasing device presses the valve member while being inoperative to the gas chamber device (in other words, the valve member is pressed toward the distributor by the valve biasing device independently without being pressed through the gas chamber device). Compared with the above different mode, it is easy to place the distributor-side seal element in pressure contact with the valve member or distributor by an appropriate force (e.g. the most advantageous force in terms of wear and abrasion resistance while securing sufficient gastightness). As a result, the frequency of changing the distributor-side seal element may be reduced effectively and sealing performance may be improved effectively.

In implementing the first characteristic construction, the distributor-side seal element may be attached to the distributor or may be attached to the valve member.

It is also possible to adopt either a construction for making the supply port in the valve member communicate with the gas feed passage through the gas chamber device, or a construction for making the exhaust port in the valve member communicate with the gas exhaust passage through the gas chamber device.

A second characteristic construction of the thermal storage type gas treating apparatus according to the present invention lies in further comprising a gas chamber device-side seal element disposed between the gas chamber device and the valve member for preventing gas leakage through a gap between the gas chamber device and the valve member; and a biasing device for the gas chamber device for supporting the gas chamber device to be displaceable toward and away from the valve member, and pressing the gas chamber device toward the valve member.

According to the second characteristic construction, the gas chamber device-side seal element disposed between the gas chamber device and valve member may be placed in pressure contact with the valve member or gas chamber device in the form of the gas chamber device pressing the seal element (that is, in pressure contact with the valve member where the seal element is attached to the gas chamber device, and in pressure contact with the gas chamber device where the seal element is attached to the valve member).

As a result, functional effects similar to the first characteristic construction may be produced for the gas chamber device-side seal element disposed between the gas chamber device and valve member.

Since the valve member and gas chamber device are biased individually, the biasing force of the biasing device for the gas chamber device may be weakened, compared with the biasing force of the biasing device in the different mode described in relation to the first characteristic construction. As a result, the gas chamber device may be formed of a low-strength, light-weight material, to realize a weight saving of the entire apparatus, and a lowering of manufacturing cost.

In implementing the second characteristic construction, the gas chamber device-side seal element may be attached to the gas chamber device, or may be attached to the valve member.

A third characteristic construction of the thermal storage type gas treating apparatus according to the present invention lies in comprising:

a plurality of thermal storage chambers containing a thermal storage medium, each of the thermal storage chambers having one end thereof communicating with a combustion chamber having a combustion device;

a valve member disposed between a distributor and a gas chamber device to be rotatable in slidable contact with the distributor and the gas chamber device, the distributor defining a plurality of supply and exhaust ports arranged in a direction of rotation of the valve member, each of the supply and exhaust ports communicating with the other end of one of the thermal storage chambers;

the valve member defining a supply port for a gas to be treated and an exhaust port for a treated gas arranged to oppose to and communicate with said supply and exhaust ports, with rotation of the valve member, the supply port and the exhaust port not opposing to or communicating with the same supply and exhaust ports simultaneously;

a gas feed passage for communicating with the supply port of the valve member through the gas chamber device, or a gas exhaust passage for communicating with the exhaust port of the valve member through the gas chamber device; and a gas chamber device-side seal element disposed between the gas chamber device and the valve member for preventing gas leakage through a gap between the gas chamber device and the valve member;

the valve member being rotatable to supply the gas to be treated introduced from the gas feed passage into the valve member to the distributor through the supply port, and to discharge the treated gas exhausted from the distributor to the valve member through the exhaust port to the gas exhaust passage;

wherein the thermal storage type gas treating apparatus comprises a valve biasing device for supporting the valve member to be displaceable toward and away from the gas chamber device, and pressing the valve member toward the gas chamber device while being inoperative to the distributor.

With this construction, the valve biasing device presses the valve member toward the gas chamber device whereby the gas chamber device-side seal element disposed between the gas chamber device and valve member may be placed in pressure contact with the valve member or gas chamber device in the form of the valve member pressing the seal element (that is, in pressure contact with the valve member where the seal element is attached to the gas chamber device, and in pressure contact with the gas chamber device where the seal element is attached to the valve member).

As a result, functional effects similar to the first characteristic construction may be produced for the gas chamber device-side seal element.

As a different mode of placing the gas chamber device-side seal element disposed between the gas chamber device and valve member in pressure contact with the gas chamber device or valve member, in the construction having the valve member disposed between the distributor and gas chamber device to be rotatable in slidable contact with the distributor and gas chamber device, it is conceivable to adopt a construction in which a biasing device biases the distributor toward the valve member and presses the distributor on the valve member, thereby biasing the valve member toward the gas chamber device (that is, the biasing device biases the valve member toward the gas chamber device through the distributor). With such a construction, since the distributor plays a part, it is difficult to adjust the biasing force of the biasing device so that the gas chamber device-side seal element may be placed in pressure contact with the gas chamber device or valve member by an appropriate force.

However, with the third characteristic construction, the biasing force of the valve biasing device presses the valve member while being inoperative to the distributor (in other words, the valve member is pressed toward the gas chamber device by the valve biasing device independently without being pressed through the distributor). Compared with the above different mode, it is easy to place the gas chamber device-side seal element in pressure contact with the valve member or gas chamber device by an appropriate force (e.g. the most advantageous force in terms of wear and abrasion resistance while securing sufficient gastightness). As a result, the frequency of changing the gas chamber device-side seal element may be reduced effectively and sealing performance may be improved effectively.

In implementing the third characteristic construction, the gas chamber device-side seal element may be attached to the gas chamber device or may be attached to the valve member.

It is also possible to adopt either a construction for making the supply port in the valve member communicate with the gas feed passage through the gas chamber device, or a construction for making the exhaust port in the valve member communicate with the gas exhaust passage through the gas chamber device.

A fourth characteristic construction of the thermal storage type gas treating apparatus according to the present invention, in implementing the third characteristic construction, lies in further comprising:

a distributor-side seal element disposed between the distributor and the valve member for precluding communication between the supply port and the exhaust port through a gap between the distributor and the valve member; and a distributor biasing device for supporting the distributor to be displaceable toward and away from the valve member, and pressing the distributor toward the valve member.

According to the fourth characteristic construction, the distributor-side seal element disposed between the distributor and valve member may be placed in pressure contact with the valve member or distributor in the form of the distributor pressing the seal element (that is, in pressure contact with the valve member where the seal element is attached to the distributor, and in pressure contact with the distributor where the seal element is attached to the valve member).

As a result, functional effects similar to the above are produced.

By biasing the valve member and distributor individually, the biasing force of the biasing device for the distributor may be weakened, compared with the mode of biasing the valve member and distributor with one biasing device. As a result, the distributor may be formed of a low-strength, lightweight material, to realize a weight saving of the entire apparatus, and a lowering of manufacturing cost.

In implementing the fourth characteristic construction, the distributor-side seal element may be attached to the distributor, or may be attached to the valve member.

A fifth characteristic construction of the thermal storage type gas treating apparatus according to the present invention lies in that the valve biasing device biases the valve member by biasing a rotary shaft of the valve member in a direction to extend or contract the rotary shaft.

According to the fifth characteristic construction, for pressing the valve member located between the distributor and gas chamber device toward the distributor or gas chamber device, the valve biasing device biases the valve member by biasing the rotary shaft of the valve member, which is independently rotatable between the distributor and gas chamber device, in the direction to extend or contract the rotary shaft. It is therefore possible to realize easily, without enlarging the apparatus, the construction for pressing the valve member toward the distributor while being inoperative to the gas chamber device, in implementing the first and second characteristic constructions, and the construction for pressing the valve member toward the gas chamber device while being inoperative to the distributor, in implementing the third and fourth characteristic constructions.

A sixth characteristic construction of the thermal storage type gas treating apparatus according to the present invention lies in that the rotary shaft has an elastic portion disposed between a driving device for driving the rotary shaft and the valve member, the valve biasing device exerting biasing action on a rotary shaft portion between the elastic portion and the valve member.

According to the sixth characteristic construction, the elastic portion disposed between the driving device for driving the rotary shaft and the valve member can absorb axial movements. Thus, axial movements are prevented from acting on the driving device for driving the rotary shaft. As a result, the valve member may be rotated stably by the driving device. It is also possible to avoid faults of the driving device caused by axial movements.

A seventh characteristic construction of the thermal storage type gas treating apparatus according to the present invention lies in that the valve biasing device includes a plurality of valve biasing elements arranged equidistantly around an axis of the rotary shaft.

With the seventh characteristic construction, the plurality of valve biasing elements bias the valve member uniformly. Thus, the valve member may be pressed toward the distributor or gas chamber device in a balanced way. As a result, the distributor-side seal element or gas chamber device-side seal element may be placed in pressure contact with the distributor, valve member or gas chamber device reliably.

An eighth characteristic construction according to the present invention relates to a rotation type selector valve, which is characterized by comprising:

a main valve component and an auxiliary valve component rotatable relative to each other, with mutually opposed surfaces located close to each other;

a plurality of auxiliary valve ports serving as passage ports of a plurality of auxiliary passages, the auxiliary valve ports being formed in an auxiliary opposite surface of the auxiliary valve component opposed to the main valve component, and arranged in a direction of the relative rotation about an axis of the relative rotation; and a plurality of main valve ports serving as passage ports of a plurality of main passages, the main valve ports being formed in a main opposite surface of the main valve component opposed to the auxiliary valve component, and arranged in the direction of the relative rotation about the axis of the relative rotation, for successively opposing to the plurality of auxiliary valve ports as a result of the relative rotation, such that two of the main valve ports adjoining each other in the direction of the relative rotation do not oppose to the same one of the auxiliary valve ports;

wherein the rotation type selector valve comprises a seal element disposed between the main opposite surface and the auxiliary opposite surface, said seal element including:

annular seal portions surrounding the axis of rotation, and located at opposite outer sides in a direction of width of a row of the main valve ports, to be slidable in contact with the auxiliary opposite surface at opposite outer sides in the direction of width of a row of the auxiliary valve ports as a result of the relative rotation;

dividing seal portions located adjacent and outside two edges, seen in the direction of the relative rotation, of each of the main valve ports, and having a linear shape extending between the two annular seal portions located at the opposite outer sides in the direction of width of the row of the main valve ports, to be slidable in contact with the auxiliary opposite surface as a result of the relative rotation; and auxiliary dividing seal portions located between the dividing seal portions adjoining each other in the closed portions between the main valve ports adjoining in the direction of the relative rotation, and having a linear shape extending between the two annular seal portions located at the opposite outer sides in the direction of width of the row of the main valve ports, to be slidable in contact with the auxiliary opposite surface as a result of the relative rotation.

That is, in the construction of Conventional Example 2 (FIGS. 39 and 40), as described hereinbefore, to avoid a fluid mixture in the form shown in FIG. 42 (*a*) and a fluid mixture in the form shown in FIG. 42 (*b*), as shown in FIG. 41 (*a*)-(*c*), the interval θd (strictly, outside measurement interval) between adjacent dividing seal portions on the closed portion Sx between the main valve ports in the main opposite surface must be made equal to or larger than the width θm in the direction of rotation of each auxiliary valve port in the auxiliary opposite surface, and the width θn in the direction of rotation of the closed portion Sy between the auxiliary valve ports in the auxiliary opposite surface "y" equal to or larger than the interval θd (strictly, inside measurement interval) between adjacent dividing seal portions on the closed portion Sx between the main valve ports in the main opposite surface (θd≧θm and θn≧θd).

On the other hand, according to the above eighth characteristic construction, as shown in FIGS. 16 and 17 (*a*)-(*c*), for example, the dividing seal portions adjoining each other (adjoining each other across an auxiliary dividing seal portion) in the closed portions Sx between the main valve ports in the main opposite surface are arranged at intervals θd which must be equal to or larger than the width θm of each auxiliary valve port in the auxiliary opposite surface in the direction of rotation (θd≧θm), as in Conventional Example 2 (substantially the same as in Conventional Example 1 also). However, the width θn in the direction of rotation of each closed portion Sy between the auxiliary valve ports in the auxiliary opposite surface need not be equal to or larger than the interval θd, but may be equal to or larger than the interval θe between the dividing seal portion and auxiliary dividing seal portion in each of the closed portions Sx between the main valve ports (θd≧θn≧θe). Then, it is possible to prevent mixing of the gases G, G' and G", which should pass through different main valve ports and different auxiliary valve ports.

That is, while adopting the form of attaching the seal element to the main opposite surface, the large width θm in the direction of rotation (i.e. opening area) is secured for each auxiliary valve port in the auxiliary opposite surface. This is advantageous in respect of reduction of fluid pressure loss and compactness of the apparatus.

According to the eighth characteristic construction, each of the dividing seal portions and auxiliary dividing seal portions is linear; the annular seal portions may be made linear. Thus, the seal element may be formed only of seal portions extending linearly, thereby to avoid a specialized shape of seal element as in Conventional Example 3 (FIGS. 43-45). As a result, it is possible to avoid an increase in manufacture cost of the seal element, and difficulty in attaching the seal element to the main opposite surface also.

In implementing the eighth characteristic construction, it is not absolutely necessary to equalize the width θm in the direction of rotation of the auxiliary valve ports arranged (generally arranged at equal intervals) in the direction of rotation about the axis of relative rotation between the main valve component and auxiliary valve component. Where the auxiliary valve ports are formed with different widths θm in the direction of rotation, the interval θd between the dividing seal portions adjoining each other (adjoining each other across an auxiliary dividing seal portion) in the closed portions Sx between the main valve ports in the main opposite surface may be equal to or larger than the largest of the widths θm in the direction of rotation of the auxiliary valve ports.

In implementing the eighth characteristic construction, it is not absolutely necessary to equalize the interval θe between the dividing seal portions adjoining each other and the auxiliary dividing seal portion therebetween in the closed portions Sx between the main valve ports in the main opposite surface. Where the interval θe between the dividing seal portions and the auxiliary dividing seal portions is differentiated, the width θn in the direction of rotation of each closed portion Sy between the auxiliary valve ports in the auxiliary opposite surface may be equal to or larger than the largest of the intervals θe between the dividing seal portions and the auxiliary dividing seal portions.

In implementing the eighth characteristic construction, the relative rotation between the main valve component and auxiliary valve component may be in the form of fixing the auxiliary valve component and rotating the main valve component, conversely in the form of fixing the main valve component fixation and rotating the auxiliary valve component, or in the form of rotating the main valve component and the auxiliary valve component in opposite directions, or rotating them in the same direction at different speeds.

In the eighth characteristic construction, the linear shape of the seal portions is not limited to such a shape that the seal portions are slidable in line contact with the auxiliary opposite surface. The seal portions may be shaped to be slidable in facial contact with the auxiliary opposite surface "y". The shape may be such that the width is small compared with the length, to the extent of being called elongate.

A ninth characteristic construction according to the present invention lies in that each of the closed portions between the main valve ports adjoining each other in the direction of the relative rotation has a plurality of auxiliary dividing seal portions arranged at intervals between adjacent ones of the dividing seal portions in the direction of the relative rotation.

According to the ninth characteristic construction, as shown in FIGS. 18 and 19 (*a*)-(*c*), for example, the interval θd between the dividing seal portions adjoining each other (i.e. the interval between the dividing seal portions adjoining each other across a plurality of auxiliary dividing seal portions) on each of the closed portions Sx between the main valve ports in the main opposite surface is divided into intervals θe by the plurality of auxiliary dividing seal portions (in the illustrated example, θe=⅓θd). Regarding these as object intervals, the width θn in the direction of rotation of each closed portion Sy between the auxiliary valve ports in the auxiliary opposite surface may be equal to or larger than the object interval θe. Then, it is possible to prevent mixing of the gases G, G' and G", which should pass through different main valve ports and different auxiliary valve ports.

That is, in the form of attaching the seal element to the main opposite surface, while avoiding the specialized shape of the seal element as in Conventional Example 3, a still larger width θm (opening area) may be secured in the direction of rotation of each auxiliary valve port in the auxiliary opposite surface.

In implementing the ninth characteristic construction, the number of the plurality of auxiliary dividing seal portions arranged at intervals in the direction of rotation between adjacent dividing seal portions on each of the closed portions Sx between the main valve ports is not limited to two, but may be three or more.

It is not absolutely necessary to equalize the interval between one of the dividing seal portions and the auxiliary dividing seal portion adjacent thereto on each closed portion Sx between the main valve ports, the interval between an adjacent pair of auxiliary dividing seal portions, and the interval between the other dividing seal portions and the auxiliary dividing seal portion adjacent thereto on each closed portion Sx between the main valve ports. Where these intervals are varied, the width θn in the direction of rotation of the closed portion Sy between the auxiliary valve ports in the auxiliary opposite surface "y" may be equal to or larger than the largest of the above intervals.

A tenth characteristic construction according to the present invention relates to a thermal storage type gas treating apparatus using the rotation type selector valve having the eighth or ninth characteristic construction, which is characterized by comprising:

a plurality of thermal storage chambers containing a thermal storage medium, each of the thermal storage chambers having one end thereof connected through a gas passage to a combustion chamber having a combustion device, each of the thermal storage chambers having the other end thereof connected through gas passages acting as the auxiliary passages to individual ones of the plurality of auxiliary valve ports at a side remote from the main valve component; and a feed passage of a gas to be treated, and an exhaust passage of a treated gas, connected through gas passages acting as the main passages to a gas supplying one of the main valve ports and a gas exhausting one of the main valve ports, respectively, at a side remote from the auxiliary valve component.

In such a gas treating apparatus, since, according to the above tenth characteristic construction, a large width (opening area) may be secured in the direction of rotation of each auxiliary valve port, the passage resistance to the gas to be treated and the treated gas in the apparatus is diminished to reduce the power required for transmitting the gases. As a result, the apparatus is made compact to realize a thermal storage type gas treating apparatus excellent in terms of installation and manufacture cost.

An eleventh characteristic construction according to the present invention lies in a rotation type selector valve comprising a valve member rotatable in slidable contact with a valve seat plate, the valve seat plate defining a plurality of selectable passage ports arranged in a direction of rotation of the valve member; the valve member defining an internal passage having a selecting side opening at one end thereof for becoming opposed to and communicating with the plurality of selectable passage ports successively with rotation of the valve member, and a common side opening at the other end movable in the direction of rotation of the valve member; a passage chamber in constant communication with the common side opening of the internal passage during rotation of the valve member, the passage chamber having a common passage port formed in one location in the direction of rotation of the valve member; wherein the rotation type selector valve comprises a resistance adjusting device that becomes an operative state for applying a fluid passage resistance to a fluid passage between the selectable passage ports opposed to and communicating with the selecting side opening of the internal passage and the common passage port when the common side opening of the internal passage approaches the common passage port by movement in the direction of rotation of the valve member accompanying the rotation of the valve member, and an inoperative state for removing the resistance when the common side opening of the internal passage moves away from the common passage port by movement in the direction of rotation of the valve member accompanying the rotation of the valve member.

According to the above eleventh characteristic construction, when the common side opening of the internal passage approaches the common passage port in the passage chamber by movement in the direction of rotation of the valve member accompanying the rotation of the valve member, the resistance adjusting device becomes an operative state for applying a fluid passage resistance to the fluid passage (i.e. the fluid passage in the valve) between the selectable passage ports opposed to and communicating with the selecting side opening of the internal passage and the common passage port. On the other hand, when the common side opening of the internal passage moves away from the common passage port by movement in the direction of rotation of the valve member accompanying the rotation of the valve member, the resistance adjusting device becomes an inoperative state for removing the fluid passage resistance from the fluid passage in the valve. As a result, the fluid passage resistance (i.e. fluid passage resistance between the selectable passage ports opposed to and communicating with the selecting side opening of the internal passage and the common passage port) may be uniformed regardless of variations in the passage length between the common passage port in the passage chamber and the common side opening of the internal passage.

With the uniform passage resistance is effective to prevent periodic flow rate variations (in other words, flow velocity variations) of the passing fluid caused by variations in the passage length between the common passage port in the passage chamber and the common side opening of the internal passage. As a result, compared with the conventional rotation type selector valve, this rotation type selector valve is excellent in flow rate stability or flow velocity stability.

In implementing the eleventh characteristic construction, the resistance adjusting device may apply the fluid passage resistance to the fluid passage in any mode or construction. In the operative state, the resistance adjusting device may apply the fluid passage resistance to any part (e.g. the passage chamber or the internal passage) the fluid passage between the selectable passage ports opposed to and communicating with the selecting side opening of the internal passage and the common passage port.

In implementing the eleventh characteristic construction, a specific construction of each part of the valve is not limited to the construction shown in FIGS. 20-23 with respect to the positional relationship between the common passage port and the common side opening of the internal passage having approached the common passage port, and the positional relationship between the common passage port and the common side opening of the internal passage having moved away from the common passage port.

A twelfth characteristic construction according to the present invention lies in that the resistance adjusting device comprises a fixed resistance plate formed in the passage chamber and becoming facially opposed to the common side opening of the internal passage in a position adjacent the valve member and away from the common passage port when the common side opening of the internal passage approaches the common passage port by movement in the direction of rotation of the valve member accompanying the rotation of the valve member.

According to the above twelfth characteristic construction, when the common side opening of the internal passage approaches the common passage port in the passage chamber, the resistance adjusting device becomes an operative state with the fixed resistance plate becomes facially opposed to the common side opening of the internal passage. The fixed resistance plate applies a fluid passage resistance to the fluid passage between the common side opening of the internal passage and the common passage port in the passage chamber.

When the common side opening of the internal passage moves away from the common passage port in the passage chamber, the resistance adjusting device becomes an inoperative state with the common side opening of the internal passage relieved from the facial opposition by the fixed resistance plate. The application of the fluid passage resistance is canceled by communication between the common side opening of the internal passage and the common passage port through a separating space between the common passage port and fixed resistance plate.

According to the twelfth characteristic construction, the resistance adjusting device can consist only of the fixed resistance plate disposed in the passage chamber for assuming the operative state and inoperative state in response to the movement of the common side opening of the internal passage in the direction of rotation of the valve member. This facilitates manufacture of the valve and lowers manufacture cost.

A thirteenth characteristic construction according to the present invention lies in that the resistance adjusting device is constructed to increase the resistance gradually as the common side opening of the internal passage approaches the common passage port by movement in the direction of rotation of the valve member accompanying the rotation of the valve member, and to decrease the resistance gradually as the common side opening of the internal passage moves away from the common passage port by movement in the direction of rotation of the valve member accompanying the rotation of the valve member.

According to the above thirteenth characteristic construction, the resistance applied increases gradually as the common side opening of the internal passage approaches the common passage port with the rotation of the valve member, and decreases gradually as the common side opening of the internal passage moves away from the common passage port. Thus, compared with the construction that simply switches the states of the resistance adjusting device between the operative state of applying a fixed fluid passage resistance and an inoperative state of canceling the resistance application, the fluid passage resistance may be uniformed much more effectively when the common side opening of the internal passage is in each moving position in the direction of rotation of the valve member. As a result, the rotation type selector valve is still more excellent in flow rate stability and flow velocity stability.

A fourteenth characteristic construction according to the present invention lies in that the internal passage comprises a first and a second internal passages formed in the valve member, a selecting side opening of the first internal passage and a selecting side opening of the second internal passage being formed in the valve member and arranged to become opposed to and communicate with the plurality of selectable passage ports successively with rotation of the valve member, with an arranging condition of not becoming opposed to or communicating with the same one of the selectable passage ports simultaneously; the passage chamber comprises a first and a second passage chambers, respectively, in constant communication with common side openings of the first and second internal passages movable in the direction of rotation of the valve member with rotation of the valve member; the common passage port comprises a first common passage port formed in one location of the first passage chamber in the direction of rotation of the valve member, and a second common passage port formed in one location of the second passage chamber in the direction of rotation of the valve member; and the resistance adjusting device is disposed in at least one of a fluid passage associated with the first internal passage and a fluid passage associated with the second internal passage.

According to the fourteenth characteristic construction, the selecting side opening of the first internal passage becomes opposed to and communicates with the plurality of selectable passage ports successively with rotation of the valve member, whereby the selectable passage ports are successively switched for communication with the first common passage port through the first internal passage, its common side opening and the first passage chamber. In parallel with this, the selecting side opening of the second internal passage becomes opposed to and communicates with the plurality of selectable passage ports successively with rotation of the valve member, whereby the selectable passage ports are successively switched for communication with the second common passage port through the second internal passage, its common side opening and the second passage chamber.

That is, the first common passage port and second common passage port can by turns communicate with each of the plurality of selectable passage ports. Since the selecting side opening of the first internal passage and the selecting side opening of the second internal passage do not become opposed to or communicate with the same one of the selectable passage ports simultaneously, the fluid in the first internal passage and the fluid in the second internal passage are prevented from mixing with each other. Thus, the valve may be used to perform such a switching action.

In the fourteenth characteristic construction, when the resistance adjusting device is disposed in the fluid passage associated with the first internal passage, the fluid passage resistance in the fluid passage associated with the first internal passage may be uniformed regardless of variations in the passage length between the first common passage port in the first passage chamber and the common side opening of the first internal passage. When the resistance adjusting device is disposed in the fluid passage associated with the second internal passage, the fluid passage resistance in the fluid passage associated with the second internal passage may be uniformed.

As a result, the rotation type selector valve is excellent in flow rate stability and flow velocity stability.

When the resistance adjusting device is disposed in both the fluid passage associated with the first internal passage and the fluid passage associated with the second internal passage, it is possible to prevent periodic flow rate variations of the passing fluid in the first internal passage and periodic flow rate variations of the passing fluid in the second internal passage. Thus, the rotation type selector valve is still more excellent in flow rate stability and flow velocity stability.

A fifteenth characteristic construction comprises a plurality of thermal storage chambers containing a thermal storage medium, each of the thermal storage chambers having one end thereof connected through a gas passage to a combustion chamber having a combustion device, each of the thermal storage chambers having the other end thereof connected through gas passages to the plurality of selectable passage openings at a side remote from the valve member; and an exhaust passage of a treated gas connected to the first common passage port from outside the first passage chamber, and a feed passage of a gas to be treated connected to the second common passage port from outside of the second passage chamber.

According to the fifteenth characteristic construction, it is possible to prevent periodic flow rate variations of the passing fluid caused by variations in the passage length between the first common passage port and the common side opening of the first internal passage, and periodic flow rate variations of the passing fluid caused by variations in the passage length between the second common passage port and the common side opening of the second internal passage. As a result, a lowering of performance and operating trouble of the thermal storage type gas treating apparatus resulting from the flow rate variations may be prevented.

A sixteenth characteristic construction according to the present invention relates to a thermal storage type gas treating apparatus, which is characterized by comprising:

a permeable, thermal storage medium layer disposed in each of a plurality of gas entrance/exit sections communicating with a combustion chamber;

certain of the thermal storage medium layer having passed a hot treated gas discharged from the combustion chamber in a preceding step passing a gas to be treated to the combustion chamber in a following step; and a switching device disposed in a gas supply and exhaust passage communicating with the combustion chamber for successively switching the thermal storage medium layers for passing the gas to be treated to the combustion chamber, and the thermal storage medium layers for passing the treated gas from the combustion chamber;

wherein the thermal storage type gas treating apparatus comprises a cooling device for cooling the treated gas from the combustion chamber, in a passage portion, of the gas supply and exhaust gas passage, from the treated gas exit of each of the thermal storage medium layers to the switching device, or in an treated gas entrance portion of the switching device.

With this construction, the hot treated gas is cooled by the cooling device in the gas passage portion, of the gas supply and exhaust, from the treated gas exit of each of the thermal storage medium layers to the switching device, or in a treated gas entrance portion of the switching device. As a result, the hot treated gas is cooled before passing through the position of the seal element in the switching device. It is therefore possible to prevent the seal element from being present under a high temperature atmospheric condition easy to cause heat damage.

Since this eases limitations to the temperature of the gas introduced into the apparatus to be treated or the combustion temperature in the combustion chamber, the limitation to the gas that can be treated is eased and the flexibility and treating performance of the apparatus are improved. Since heat damage of the seal element provided for the switching device can be prevented effectively, the burden of maintenance such as changing of the seal element is lightened, and the reliability of the apparatus in sealing is also improved.

A seventeenth characteristic construction according to the present invention comprises a main valve component and an auxiliary valve component rotatable relative to each other, with mutually opposed surfaces located close to each other; a plurality of supply and exhaust ports formed in an opposite surface of the auxiliary valve component opposed to the main valve component, and arranged in a direction of the relative rotation about an axis of the relative rotation; the main valve component defining, as partitioned from each other, a passage for the gas to be treated, and a passage for the treated gas; a supply opening acting as a passage port of the passage for the gas to be treated, and an exhaust opening acting as a passage port of the passage for the treated gas, formed in an opposite surface of the main valve component opposed to the auxiliary valve component, and arranged in the direction of rotation about the axis of rotation, such that the supply opening and the exhaust opening successively oppose to the plurality of supply and exhaust ports as a result of the relative rotation, and do not simultaneously oppose to the same one of the supply and exhaust ports; the main valve component and the auxiliary valve component being rotatable relative to each other with a seal element disposed between the opposite surfaces thereof, to switch each of the thermal storage medium layers between a state of passing the gas to be treated to the combustion chamber and a state of passing the treated gas from the combustion chamber; and the main valve component and the auxiliary valve component constituting a rotation type selector valve acting as the switching device.

That is, where the above rotation type selector valve is adopted as the switching device, the thermal storage medium layers for passing the gas to be treated and the thermal storage medium layers for passing the treated gas may be successively switched only by rotating the main valve component and auxiliary valve component relative to each other. This provides an advantage of the entire apparatus being simple and compact in construction, compared with a multiple valve type, thermal storage type gas treating apparatus having selector valves provided individually for a plurality of thermal storage medium layers, the thermal storage medium layers for passing the gas to be treated and the thermal storage medium layers for passing the treated gas being switched by the plurality of selector valves.

However, with a rotation type selector valve, the main valve component could be distorted by a difference in temperature within the gas passages, i.e. between passage for the gas to be treated and the passage for the treated gas defined as partitioned from each other in the main valve component. This results in a possibility of lowering the sealing between the opposed surfaces of the main valve component and auxiliary valve component (i.e. the position of the seal element).

However, with this construction, since the treated gas cooled by the cooling device may be passed through the treated gas passage in the main valve component, it is possible to inhibit effectively distortion of the main valve component by the difference in temperature within the gas passage between the passage for the gas to be treated and the passage for the treated gas in the main valve component. As a result, the reliability of the apparatus in sealing is further improved while retaining the advantage of using the rotation type selector valve.

An eighteenth characteristic construction according to the present invention lies in that the cooling device is constructed to spray cooling water to the treated gas discharged from the combustion chamber, thereby to cool the treated gas.

With this construction, the hot treated gas may be cooled by using not only sensible heat but also latent heat (evaporation heat of the water). Thus, the treated gas is cooled more effectively and efficiently than other types of cooling device such as an air cooling device that blows cold air, and a heat exchanger for performing a heat exchange between the treated gas and a cooling medium through a heat conduction wall. The simple construction for only spraying water provides an advantage in terms of manufacturing cost and running cost.

A nineteenth characteristic construction according to the present invention lies in that the cooling device is constructed to spray cooling water to the seal element disposed adjacent the exhaust opening, thereby to cool the seal element disposed adjacent the exhaust opening as well as the treated gas from the combustion chamber.

With this construction, the cooling device performs cooling action to apply cooling water directly to the seal element while spraying the cooling water on and cooling the hot treated gas. Thus, heat damage of the seal element may be prevented with increased effective. As a result, the burden of maintenance such as changing of the seal element is lightened with increased effect, and the reliability of the apparatus in sealing is also improved with increased effect.

A twentieth characteristic construction according to the present invention lies in that the cooling device is constructed to spray cooling water in the passage for the treated gas in the main valve component toward the exhaust opening, thereby to cool the treated gas from the combustion chamber.

With this construction, the cooling device for cooling the treated gas by spraying cooling water is constructed to spray constantly the cooling water in the passage for the treated gas in the main valve component toward the exhaust opening. This construction can reduce the number of cooling device and simplify the apparatus construction, compared, for example, with providing a cooling device for each of the gas passage portions (i.e. portions where the passing gas switches successively) extending in a parallel state from the exits of the treated gas in the respective thermal storage medium layers to the switching device (rotation type selector valve). Therefore, the apparatus is advantageous in respect of manufacture cost.

A twenty-first characteristic construction according to the present invention comprises an interlocking device operable, in response to switching of the gas passing states by the switching device, to switch a plurality of cooling devices arranged in parallel passage portions extending from the exits of the treated gas in the thermal storage medium layers to the switching device, or in the treated gas entrance portions of a plurality of switching devices respectively provided for the thermal storage medium layers.

With this construction, the cooling device is disposed in each of the parallel passage portions extending from the exits of the treated gas in the thermal storage medium layers to the switching device, or in each of the treated gas entrance portions of a plurality of switching devices respectively provided for the thermal storage medium layers. In this construction, the interlocking device successively switches those of the cooling devices that should perform the cooling operation in response to switching of the gas passage states by the switching device. Compared with performing the switching operation manually, the above construction can reliably prevent a wasteful cooling operation of the cooling devices of the parts where the treated gas is not passed. It can also reliably prevent a case where, conversely, the cooling devices of the parts requiring a cooling operation are inadvertently put to an inoperative state. As a result, the apparatus is made more advantageous in respect of energy saving and operating cost, has increased reliability in respect of prevention of heat damage.

A twenty-second characteristic construction according to the present invention comprises temperature sensors for detecting temperature of the treated gas discharged from the combustion chamber, in positions upstream of cooling positions of the cooling device with respect to a flowing direction of the treated gas, the cooling device being operated based on the temperature detected by the temperature sensors.

With this construction, the cooling device is operated based on the temperature of the treated gas detected by the temperature sensors in positions upstream of the cooling positions of the cooling device with respect to the flowing direction of the treated gas. Thus, when the treated gas is in a temperature state not requiring cooling, the cooling device is placed in the inoperative state. When the treated gas is in a temperature state requiring cooling, the cooling device is driven to perform the cooling operation. Such control is carried out automatically and reliably.

Thus, in preventing heat damage of the seal element due to variations in the temperature of the treated gas caused by variations in the flow rate or variations in the VOC concentration (volatile organic compound concentration) of the gas to be treated, the cooling device may be driven to perform the cooling operation automatically and reliably when the cooling operation of the cooling device is needed. When the cooling operation of the cooling device becomes unnecessary, the cooling device may be placed in the inoperative state automatically and reliably. As a result, the apparatus is made more advantageous in respect of energy saving and operating cost, while securing increased reliability in respect of prevention of heat damage.

For example, in the construction in which the cooling device is disposed in each of the parallel passage portions extending from the exits of the treated gas in the thermal storage medium layers to the switching device, or in each of the treated gas entrance portions of a plurality of switching devices respectively provided for the thermal storage medium layers, a temperature sensor, along with the cooling device, may be disposed in each of the above passage portions or in each of the treated gas entrance portions, and in a position upstream of the cooling position of the cooling device with respect to the flowing direction of the treated gas. Based on the temperature detected by each temperature sensor, the corresponding cooling device may be operated. Then, the function of the interlocking device noted hereinbefore can also be obtained.

A twenty-third characteristic construction according to the present invention comprises temperature sensors for detecting temperature of the treated gas discharged from the combustion chamber, in positions upstream of cooling positions of the cooling device with respect to a flowing direction of the treated gas, an amount of cooling by the cooling device being adjusted based on the temperature detected by the temperature sensors.

With this construction, the amount of cooling by the cooling device (i.e. the amount of cooling of the treated gas) is adjusted based on the temperature of the treated gas detected by the temperature sensors. It is thus possible to cope automatically with variations in required cooling amount occurring with temperature variations of the treated gas.

That is, when the temperature of the treated gas rises due to variations in the temperature of the treated gas caused by variations in the flow rate or variations in the VOC concentration (volatile organic compound concentration) of the gas to be treated, to increase the amount of cooling by the cooling device required to prevent heat damage of the seal element, the amount of cooling of the treated gas by the cooling device may be increased automatically based on the temperature detected by the temperature sensors. When the temperature of the treated gas falls to decrease the amount of cooling by the cooling device required to prevent heat damage of the seal element, the amount of cooling of the treated gas by the cooling device may be decreased automatically based on the temperature detected by the temperature sensors. As a result, the apparatus is made more advantageous in respect of energy saving and operating cost, while securing increased reliability in respect of prevention of heat damage.

A twenty-fourth characteristic construction according to the present invention comprises maintaining temperature of exit portions of the treated gas in the thermal storage medium layers at a predetermined cleaning temperature by passing a cleaning gas heated in the combustion chamber, to burn or evaporate objects to be removed having accumulated in the exit portions of the treated gas in the thermal storage medium layers.

Also in a thermal storage medium layer cleaning method for the conventional thermal storage type gas treating apparatus, the temperature of exit portions of the treated gas in the thermal storage medium layers is maintained at a predetermined cleaning temperature by passing a cleaning gas heated in the combustion chamber, to burn or evaporate objects to be removed, such as fatty substances, having accumulated in the exit portions of the treated gas in the thermal storage medium layers. However, since the cleaning temperature for burning or evaporating the objects to be removed is a high temperature, the cleaning gas having passed through the thermal storage medium layers for cleaning (i.e. at a temperature equal to or higher than the cleaning temperature) cannot be passed through the switching device because of the necessity of preventing heat damage of the seal element. In the conventional apparatus, therefore, in order to release the hot cleaning gas after the cleaning operation directly to the outside without passing through the switching device, a cleaning gas release passage may be provided separately each time a cleaning operation is carried out.

However, this thermal storage medium layer cleaning method, since the cooling device is provided to cool the treated gas discharged from the combustion chamber as noted hereinbefore, uses the cooling device to cool the hot cleaning gas after a cleaning operation in each of the passage portions extending from the exits of the treated gas in the thermal storage medium layers to the switching device, or in each of the treated gas entrance portions of the switching device. As a result, the cleaning gas after a cleaning operation, as in the treated gas in time of normal operation, may be discharged through the position of the switching device in the gas supply and exhaust passage of the thermal storage type gas treating apparatus. It is possible to exclude the burden of providing a cleaning gas release passage separately each time a cleaning operation is carried out as in the conventional apparatus.

A twenty-fifth characteristic construction according to the present invention lies in that a cleaning operation for passing the cleaning gas through the thermal storage medium layers is carried out successively for the plurality of thermal storage medium layers in response to switching of the gas passing states by the switching device.

That is, according to the twenty-fourth characteristic construction noted above, the cleaning gas after a cleaning operation may be discharged through the position of the switching device, and therefore the switching device is available for use also in time of cleaning operation. Having regard to this fact, in the above twenty-fifth characteristic construction, the cleaning operation for passing the cleaning gas through the thermal storage medium layers may be carried successively for the plurality of thermal storage medium layers by operating the switching device to switch the gas passing state. The cleaning operation may be carried out efficiently compared, for example, with a case of performing a cleaning operation successively for passing the cleaning gas through the thermal storage media layers while successively switching the connection of the separately provided cleaning gas release passage to the plurality of thermal storage medium layers.

BRIEF DESCRIPTION OF THE DRAWINGS

FIG. 1 Side view of a thermal storage type gas treating apparatus according to the present invention;

FIG. 2 Sectional plan view of a thermal storage chamber portion of the thermal storage type gas treating apparatus;

FIG. 3 Plan view in a distributor portion of the thermal storage type gas treating apparatus;

FIG. 4 Sectional side view of a switching device portion of the thermal storage type gas treating apparatus;

FIG. 5 Exploded plan view of a principal portion of a switching device of the thermal storage type gas treating apparatus;

FIG. 6 Exploded perspective view of the principal portion of the switching device of the thermal storage type gas treating apparatus;

FIG. 7 Exploded perspective view of a valve member of the thermal storage type gas treating apparatus;

FIG. 8 Exploded perspective view of a principal portion of a rotary shaft of the thermal storage type gas treating apparatus;

FIG. 9 Apparatus function explanatory view of the thermal storage type gas treating apparatus;

FIG. 10 Side view of an apparatus showing a second embodiment;

FIG. 11 Sectional side view of a switching device portion showing a third embodiment;

FIG. 12 Exploded perspective view of a principal portion of a rotary shaft showing the third embodiment;

FIG. 13 Exploded plan view of a rotation type selector valve according to different embodiment 1;

FIG. 14 Exploded perspective view of the rotation type selector valve according to different embodiment 1;

FIG. 15 Exploded perspective view of a valve member in the rotation type selector valve according to different embodiment 1;

FIG. 16 View showing an arrangement relation of a seal element and each valve port according to different embodiment 1;

FIG. 17 Developed view illustrating a sealing function of the seal element according to different embodiment 1;

FIG. 18 View showing an arrangement relation of the seal element and each valve port according to different embodiment 1;

FIG. 19 Developed view illustrating the sealing function of the seal element according to different embodiment 1;

FIG. 20 Sectional side view of a selector valve portion according to different embodiment 2;

FIG. 21 Explanatory view of functions of a thermal storage type gas treating apparatus according to different embodiment 2;

FIG. 22 Sectional side view of the selector valve portion according to different embodiment 2;

FIG. 23 Explanatory plan view illustrating functions of a fixed resistance plate according to different embodiment 2;

FIG. 24 Side view showing a first embodiment of a thermal storage type gas treating apparatus according to different embodiment 3;

FIG. 25 Sectional plan view of a thermal storage chamber portion according to different embodiment 3;

FIG. 26 Sectional side view of a selector valve portion according to different embodiment 3;

FIG. 27 Explanatory view of functions of the thermal storage type gas treating apparatus according to different embodiment 3;

FIG. 28 Sectional side view showing the selector valve portion according to different embodiment 3;

FIG. 29 Sectional side view showing the selector valve portion according to different embodiment 3;

FIG. 30 Explanatory view of functions of the thermal storage type gas treating apparatus according to different embodiment 3;

FIG. 31 Side view of a thermal storage type gas treating apparatus according to different embodiment 4;

FIG. 32 Sectional plan view of a thermal storage chamber portion according to different embodiment 4;

FIG. 33 Enlarged sectional plan view of the thermal storage chamber portion according to different embodiment 4;

FIG. 34 Perspective view, partly cut away, showing a structure of a partition wall according to different embodiment 4;

FIG. 35 Sectional side view of a selector valve portion according to different embodiment 5;

FIG. 36 Exploded perspective view showing a structure having a seal element according to conventional example 1;

FIG. 37 View showing an arrangement relation of the seal element and each valve port according to conventional example 1;

FIG. 38 Developed view illustrating a sealing function of the seal element according to conventional example 1;

FIG. 39 Exploded perspective view showing a structure having a seal element according to conventional example 2;

FIG. 40 View showing an arrangement relation of the seal element and each valve port according to conventional example 2;

FIG. 41 Developed view illustrating a sealing function of the seal element according to conventional example 2;

FIG. 42 Developed view illustrating a generation of a fluid mixture by the seal element according to conventional example 2;

FIG. 43 Exploded perspective view showing a structure having a seal element according to conventional example 3;

FIG. 44 View showing an arrangement relation of the seal element and each valve port according to conventional example 3;

FIG. 45 Developed view illustrating a sealing function of the seal element according to conventional example 3; and FIG. 46 Explanatory plan view illustrating passage resistance changes.

DETAILED DESCRIPTION OF THE PRESENT INVENTION

Thermal Storage Type Gas Treating Apparatus

FIGS. 1, 2 and 9 show a thermal storage type gas treating apparatus according to the present invention. The interior of a housing 1 disposed in an upper portion of the apparatus is divided by partition walls 2 into a group of thermal storage chambers 3. Thus, eight thermal storage chambers 3 are formed in a juxtaposed arrangement in the housing 1 in plan view. A switching device 4 is disposed below this housing 1 for switching gas passages for communication with each thermal storage chamber 3.

Each thermal storage chamber 3 stores thermal storage medium layers 5 of thermal storage medium 5a. The upper end of each thermal storage chamber 3 is open to communicate with a combustion chamber 6 formed in the upper portion in the housing 1. A burner 7 is provided for the combustion chamber 6.

As shown in FIGS. 3-6, the switching device 4 includes a distributor 10 in the form of an octagonal cylinder with eight supply and exhaust chambers 8 in an annular arrangement in plan view formed by partition walls 9, a cylindrical valve device 12 housing a valve member 11, and a cylindrical gas chamber device 13 for receiving gas G to be treated. The valve device 12 is fixed on an upper part of an installation mount 14, and the distributor 10 is disposed above and coaxially with the valve device 12 and fixedly connected to the valve device 12. The gas chamber device 13 is disposed below and coaxially with the valve device 12, is connected to an annular bottom plate 12a of the valve device 12 to be suspended therefrom, and is supported from below by a lower frame 14a of the installation mount 14.

The eight thermal storage chambers 3 have lower ends thereof individually communicating through supply and exhaust passages 15 to the eight supply and exhaust chambers 8 in the distributor 10 having a closed upper end. A bottom plate 10a of the distributor 10 which serves as a top plate of the valve device 12 defines eight fan-shaped supply and exhaust ports 16 in an annular arrangement (that is, arrangement in a direction of rotation of the valve member 11 to be described hereinafter) and in positions corresponding to the supply and exhaust chambers 8. A distributor-side seal element 17 is attached to the undersurface of the bottom plate 10a, which, as shown in FIG. 7, includes annular seal portions 17a, 17b and eight dividing seal portions 17c to surround the supply and exhaust ports 16 individually.

A central chamber 18 is defined by a partition pipe 19 in the central part of the distributor 10 for receiving a purging gas G". This central chamber 18 communicates with a purging gas feed passage 20 adjacent the upper end of the distributor 10.

As shown in FIGS. 4-8, the valve member 11 housed in the valve device 12 is in the form of an inverted truncated cone having a valve peripheral wall 21, a valve top plate 22, a valve bottom plate 23, and a cylindrical rotary shaft 24 in vertical posture. The valve member 11 is rotated in the direction indicated by arrow R in the drawings, about an axis of rotation P in the valve device 12, with the valve top plate 22 is placed in slidable contact with the bottom plate 10a of the distributor 10 (strictly, slidable contact with the seal element 17 by the distributor), and with the valve bottom plate 23 placed in slidable contact with the edge of the upper end opening of the gas chamber device 13 (strictly, slidable contact with an annular seal element 25 attached to the edge of the gas chamber device).

The interior of the valve member 11 is divided into a supply chamber 27 and an exhaust chamber 28 in plan view by two partition walls 26 extending between the valve peripheral wall 21 and cylindrical rotary shaft 24. In an upper portion of the valve member 11, and adjacent one of the partition walls 26, a purge chamber 31 is formed by an insole plate 29 and an upper partition wall 30. Thus, in the upper portion of the valve member 11, the supply chamber 27, purge chamber 31 and exhaust chamber 28 are arranged in the stated order from upstream to downstream in the rotation of the valve member 11, as an annular row of inner compartments. Numeral 32 denotes reinforcing rib plates defining communicating openings 32a for interior communication. A portion continuing downward from the upper partition wall 30 also has a similar reinforcing rib plate structure.

The valve top plate 22 defines a supply port 33 for supplying the gas to be treated, a purge port 34 and a treated gas exhaust port 35 disposed in an annular arrangement to correspond individually to the supply chamber 27, purge chamber 31 and exhaust chamber 28, and to oppose to and communicate with the supply and exhaust ports 16 of the distributor 10 successively with rotation of the valve member 11, and in an arrangement not to oppose to and communicate with the supply and exhaust ports 16 (strictly, areas surrounded by the distributor-side seal element 17 for the supply and exhaust ports 16) of the distributor 10 simultaneously.

The cylindrical rotary shaft 24 having the upper end thereof located in the central chamber 18 of the distributor 10 defines a purge communicating opening 36 for communicating the interior space with the purge chamber 31. The valve bottom plate 23 defines a gas chamber device communicating opening 37 for placing the supply chamber 27 in constant communication with the interior space of the gas chamber device 13. The valve peripheral wall 21 defines a valve device communicating opening 38 for placing the exhaust chamber 28 in constant communication with a device interior space 12r around the valve member 11 in the valve device 12. With this construction, the gas chamber device 13 has, connected thereto; a gas feed passage 39 for feeding the gas G to be treated. On the other hand, the valve member device 12 has, connected thereto, a gas exhaust passage 40 for exhausting treated gas G' from the valve device 12.

That is, with this thermal storage type gas treating apparatus, the gas G to be treated (e.g. air exhausted from a painting booth and containing an organic solvent) is introduced from the gas feed passage 39 through the gas chamber device 13 and the gas chamber communicating opening 37 into the supply chamber 27 of the valve member 11, and through the supply port 33 formed in the top plate 22 of the valve member 11, the supply and exhaust ports 16 of the distributor 10 opposed to and communicating with the supply port 33, the supply and exhaust chambers 8 communicating with the supply and exhaust ports 16, and the supply and exhaust passages 15 communicating with the supply and exhaust chambers 8, and through certain of the thermal storage chambers 3, into the combustion chamber 6. In this combustion chamber 6, contaminants, offensive odor substances and so on in the gas G are disposed of by combustion.

Treated gas G' is passed from the combustion chamber 6 through other thermal storage chambers 3 where the heat is stored in the thermal storage medium 5a. Subsequently, treated gas G' is led through supply and exhaust passages 15 communicating with the thermal storage chambers 3, the supply and exhaust chambers 8 of the distributor 10 communicating with the supply and exhaust passages 15, the supply and exhaust ports 16 communicating with the supply and exhaust chambers 8, and the exhaust port 35 of the valve member 11 opposed to and communicating with the supply and exhaust ports 16, into the exhaust chamber 28 of the valve member 11. Then, treated gas G' is passed through the valve device communicating opening 38 formed in the valve peripheral wall 21 of the valve member 11, and the device interior space 12r around the valve member 11 in the valve device 12, out into the gas exhaust passage 40.

The purging gas G" introduced from the purging gas feed passage 20 into the central chamber 18 of the distributor 10 is passed through a communicating bore 24a formed in the upper end of the cylindrical rotary shaft 24 of the valve member 11, the interior of the cylindrical rotary shaft 24, the purge communicating opening 36 formed in the cylindrical rotary shaft 24, into the purge chamber 31 of the valve member 11. Then, the purging gas G" is led through the purge port 34 formed in the valve top plate 22 of the valve member 11, the supply and exhaust port 16 of the distributor 10 opposed to and communicating with the purge port 34, the supply and exhaust chamber 8 communicating with the supply and exhaust port 16, the supply and exhaust passage 15 communicating with the supply and exhaust chamber 8, and other thermal storage chambers 3, into the combustion chamber 6 to join the treated gas G' subsequently.

During this process, the valve member 11 is rotated to switch successively the supply and exhaust ports 16 of the distributor 10 for opposing to communicating with the supply port 33, purge port 34 and exhaust port 35 formed in the valve top plate 22 of the valve member 11. This switching operation successively switches thermal storage chambers 3 for passing the gas G to be treated, the thermal storage chambers 3 for passing the purge gas G", and the thermal storage chambers 3 for passing the treated gas G'. And, as shown in FIG. 9, each thermal storage chamber 3 is switched to a state of passing the gas G to be treated, a state of passing the purge gas G", and a state of passing the treated gas G', successively in the stated order. Consequently, the thermal storage medium 5a having stored heat in advance by passing the treated gas G' preheats the gas G to be treated, passing through each thermal storage chamber 3.

After passage of the gas G to be treated, the purge gas G" is passed through each thermal storage chamber 3 next, before passing the treated gas G'. As a result, the gas G to be treated and remaining in the thermal storage chamber 3 is discharged to the combustion chamber 6 before next passage of the treated gas G'. Thus, the remaining gas G to be treated is prevented from mixing into the treated gas G' next passing through the thermal storage chamber 3.

The purge gas feed passage 20 is a passage branched from the gas exhaust passage 40. With this passage branching, part of the treated gas G' and discharged to the gas exhaust passage 40 is used as purge gas G".

(Biasing Structure for Seals of the Switching Device)

It is the composition of making the valve member 11 mounted in the valve device 12 is rotatable by a motor 43 through a driving rotary shaft 41 connected to the cylindrical rotary shaft 24 of the valve member 11 and a speed reducer 42. A compression coil spring 44A acting as a valve biasing device is disposed between the cylindrical rotary shaft 24 of the valve member 11 and the driving rotary shaft 41 (that is, in a rotary shaft X consisting of the cylindrical rotary shaft 24 and driving rotary shaft 41). In the position of the coil spring 44A, the cylindrical rotary shaft 24 and driving rotary shaft 41 are interconnected through a spline shaft coupling 45 to provide an elastic portion E of the rotary shaft X. While the valve member 11 is rotated in the direction indicated by arrow R about the vertical axis of rotation P in the valve device 12 by transmitting rotation of the driving rotary shaft 41 rotatable by the motor 43 to the cylindrical rotary shaft 24, movement of the rotary shaft X (specifically, the cylindrical rotary shaft 24) along the axis P is absorbed.

That is, the compression coil spring 44A applies a biasing action to the rotary shaft portion adjacent the valve member, as seen from the elastic part E (i.e. cylindrical rotary shaft 24), for extending the rotary shaft X. Thus, the valve member 11 is biased toward the distributor 10 to be vertically displaceable, while the biasing force of the compression coil spring 44A is kept inoperative to the gas chamber device 13. Further, the shaft coupling 45 of the elastic portion E absorbs movement of the cylindrical rotary shaft 24 along the axis P, thereby preventing the movement along the axis P from being transmitted to the driving device for rotating the rotary shaft X.

In order to enable vertical displacement of the gas chamber device 13 and valve member 11, the upper end of the cylindrical rotary shaft 14 in the valve body 11 is supported by distributor 10 through an upper bearing 46 which allows movement of the rotary shaft X along the axis P. Further, gastightness is secured between a lower portion of the gas chamber device 13 and the cylindrical rotary shaft 24, a lower bearing 47 is provided with a seal element to allow axial sliding movement of the cylindrical rotary shaft 24, and to prevent leakage of the gas G to be treated, outside through a gap between the gas chamber device 13 and cylindrical rotary shaft 24.

The annular bottom plate 12a of the valve device 12 connecting the gas chamber device 13 is formed of a tough and highly flexible metal plate. This flexibility allows the gas chamber device 13 to be vertically displaceable (i.e. displaceable toward and away from the valve member 11).

For supporting the gas chamber device 13 from below by the lower frame 14a of the installation mount 14, tension coil springs 44B are arranged in four positions at equal intervals around the axis P inside the lower frame 14a having a channel-shaped section, to act as a gas chamber device biasing device for elastically biasing the gas chamber device 13 upward (i.e. toward the valve member 11). Further, connecting rods 48 interconnecting a lower end flange 13f of the gas chamber device 13 and the lower frame 14a are arranged to extend through the centers of the tension coil springs 44B, respectively. The connecting rods 48 have screw threads formed thereon.

Each connecting rod 48 has one end fixed to the lower end flange 13f of the gas chamber device 13, and the other end extending through the upper surface of the lower frame 14a, thereby interconnecting the gas chamber device 13 and lower frame 14a while being capable of vertical displacement. Inside the lower frame 14a having a channel-shaped section, a nut 49 is fixed to the lower end of each connecting rod 48 and is connected to the lower end of the tension coil spring 44B for receiving the tensile biasing force of the tension coil spring 44B and biasing the gas chamber device 13 toward the valve member 11.

By pressing the valve member 11 toward the distributor 10 with the compression coil spring 44A acting as a valve biasing device as described above, the distributor-side seal element 17 attached to the bottom plate 10a of the distributor 10 may be placed reliably in pressure contact with the top plate 22 of the valve member 11, in the form of the valve member 11 pressing the seal element 17 between the distributor 10 and valve members 11. As a result, the distributor-side seal element 17 in slidable contact with the valve top plate 22 precludes the communication between the supply port 33 and exhaust port 35 and the communication between the supply port 33 and purge port 34 through a gap between the bottom plate 10a of the distributor 10 and the valve top plate 22 of the valve member 11. Thus, the gas G to be treated is reliably prevented from mixing into the treated gas G' by communication through the gap.

By pressing the gas chamber device 13 toward the valve member 11 with the tension coil springs 44B acting as a biasing device for the gas chamber device, the seal element 25 of the gas chamber device provided for the opening edge at the upper end of the gas chamber device 13 may be placed reliably in pressure contact with the bottom plate 23 of the valve member 11, in the form of the gas chamber device 13 pressing the seal element 25 between the gas chamber device 13 and valve members 11. As a result, the gas G to be treated is prevented from leaking from the gas chamber device 13 into the valve device 12, to prevent the gas G to be treated from mixing into the treated gas G'. By preventing the mixing, contaminants and offensive odor substances contained in the gas G to be treated are reliably prevented from being discharged, as untreated, along with the treated gas G' from the apparatus.

The pressing and biasing force of the compression coil spring 44A applied to the valve member 11 (in other words, a pressing force of the distributor-side seal element 17 applied to the bottom plate 10a of the distributor 10) and the tensile biasing force of the tension coil springs 44B applied to the gas chamber device 13 (in other words, a pressing force of the seal element 25 of the gas chamber device applied to the bottom plate 23 of the valve member 11) are separately adjustable.

In short, with this biasing structure, the valve member 11 is supported to be displaceable toward and away from the distributor 10, and is pressed toward the distributor 10, while the valve biasing device (compression coil spring 44A) is kept inoperative to the gas chamber 13. Consequently, the seal element 17 attached to the bottom plate 10a of the distributor 10 is pressed on the top plate 22 of the valve member 11 reliably by a suitable pressure.

The biasing device for the gas chamber device (tension coil springs 44B) is provided separately from the biasing device for the valve member (compression coil spring 44A). The gas chamber device 13 is supported to be displaceable toward and away from the valve member 11, and is pressed toward the valve member 11 by the biasing device for the gas chamber device (tension coil springs 44B). The seal element 25 provided on the edge of the upper opening of the gas chamber device 13 is pressed on the bottom plate 23 of the valve member 11 reliably by a suitable pressure.

The valve member 11 and gas chamber device 13 are biased individually by the compression coil spring 44A and tension coil springs 44B. Therefore, the valve member 11 and gas chamber device 13 may have strength only to withstand the biasing force of the compression coil spring 44A or tension coil springs 44B. Consequently, the entire apparatus may be reduced in weight and in manufacture cost.

The valve member 11 and gas chamber device 13 are supported individually by the compression coil spring 44A and tension coil springs 44B. The weight (deadweight) of the valve member 11 is not applied to the gas chamber device 13, which allows for a further reduction in the strength of the gas chamber device 13. As a result, the entire apparatus may be further reduced in weight and in manufacture cost.

Second Embodiment

FIG. 10 shows a thermal storage type gas treating apparatus improved, in implementing the present invention, on the thermal storage type gas treating apparatus in the first embodiment. In this thermal storage type gas treating apparatus, the set of distributor 10, valve device 12 and gas chamber device 13 shown in the first embodiment is reversed upside down (that is, arranged in the order of the gas chamber device 13, valve device 12 and distributor 10 from top). The valve member 11 is made vertically displaceable relative to (i.e. toward and away from) the fixed gas chamber device 13. The distributor 10 is made vertically displaceable relative to (i.e. toward and away from) the valve member 11.

As in the first embodiment, the valve member 11 mounted in the valve device 12 is rotatable by a motor 43 through a driving rotary shaft 41 connected to the cylindrical rotary shaft 24 of the valve member 11 and a speed reducer 42. A compression coil spring 44A acting as a valve biasing device is disposed between the cylindrical rotary shaft 24 of the valve member 11 and the driving rotary shaft 41 (that is, in a rotary shaft X consisting of the cylindrical rotary shaft 24 and driving rotary shaft 41), for elastically pressing the cylindrical rotary shaft 24 upward. In the position of the compression coil spring 44A, the cylindrical rotary shaft 24 and driving rotary shaft 41 are interconnected through a spline shaft coupling 45 to provide an elastic portion E of the rotary shaft X. While the valve member 11 is rotated by transmitting rotation of the driving rotary shaft 41 rotatable by the motor 43 to the cylindrical rotary shaft 24, movement of the rotary shaft X (specifically, the cylindrical rotary shaft 24) along the axis P is absorbed.

That is, the compression coil spring 44A applies a biasing action to the rotary shaft portion adjacent the valve member, as seen from the elastic part E (i.e. cylindrical rotary shaft 24), for extending the rotary shaft X. Thus, the valve member 11 is biased toward the gas chamber device 13 to be vertically displaceable, while the biasing force of the compression coil spring 44A is kept inoperative to the distributor 10. Further, the spline shaft coupling 45 of the elastic portion E absorbs movement of the cylindrical rotary shaft 24 along the axis P, thereby preventing the movement along the axis P from being transmitted to the driving device for rotating the rotary shaft X.

The distributor 10 is supported from below by the lower frame 14a of the installation mount 14. Tension coil springs 44B are arranged in four positions at equal intervals around the axis P inside the lower frame 14a having a channel-shaped section, to act as a distributor biasing device for elastically biasing the distributor 10 upward (i.e. toward the valve member 11). Further, connecting rods 48 interconnecting a lower end flange 10f of the distributor 10 and the lower frame 14a are arranged to extend through the centers of the tension coil springs 44B, respectively. The connecting rods 48 have screw threads formed thereon.

Each connecting rod 48 has one end fixed to the lower end flange 10f of the distributor 10, and the other end extending through the upper surface of the lower frame 14a, thereby interconnecting the distributor 10 and lower frame 14a while being capable of vertical displacement. Inside the lower frame 14a having a channel-shaped section, a nut 49 is fixed to the lower end of each connecting rod 48 and is connected to the lower end of the tension coil spring 44B for receiving the biasing force of the tension coil spring 44B and biasing the distributor 10 toward the valve member 11.

Supply and exhaust passages 15 communicating the distributor 10 and thermal storage chambers 3 have connections 15a to the distributor 10, which are extendible and contractible in response to vertical displacements of the distributor 10.

Thus, in the second embodiment, the valve member 11 is pressed toward the gas chamber device 13 by the compression coil spring 44A acting as a valve biasing device not operative with respect to the distributor 10. A gas chamber device-side seal element 25 attached to an opening edge of the gas chamber device 13 may be placed reliably in pressure contact with the bottom plate 23 (top plate in substance) of the valve member 11, in the form of the valve member 11 pressing the seal element 25. Further, by pressing the distributor 10 toward the valve member 11 with the tension coil springs 44B acting as a biasing device for the distributor, a seal element 17 of the distributor provided for the bottom plate 10a of the distributor 10 (in substance, the top plate of the distributor 10 in the second embodiment) may be placed reliably in pressure contact with the top plate 22 of the valve member 11 (in substance, the bottom plate 23 of the valve member 11).

Thus, in the second embodiment, the set of distributor 10, valve member 11 and gas chamber device 13 is disposed laterally of the housing 1 (that is, laterally of the set of thermal storage chambers 3). This arrangement reduces the overall apparatus height, thereby to facilitate indoor installation of the thermal storage type gas treating apparatus.

The other aspects of the construction are the same as in the first embodiment described hereinbefore. Like reference numerals are used to identify like parts which have the same constructions or the same functions as in the first embodiment and will not be described again.

Third Embodiment

FIGS. 5, 11 and 12 show a thermal storage type gas treating apparatus improved, in implementing the present invention, on the thermal storage type gas treating apparatus in the first embodiment and second embodiment. In this thermal storage type gas treating apparatus, flanges 24f and 41f are formed at the connections between the cylindrical rotary shaft 24 of the valve member 11 and the driving rotary shaft 41, respectively. The flange 24f of the cylindrical rotary shaft has four threaded bores arranged at equal intervals around the axis P for receiving and meshing with connecting bolts 50 that connect the cylindrical rotary shaft 24 and driving rotary shaft 41 (i.e. to form the rotary shaft X consisting of the cylindrical rotary shaft 24 and driving rotary shaft 41). The flange 41f of the driving rotary shaft has four bores 41a opposed in the direction along the axis P (vertically) to the four threaded bores 24b for receiving tip ends 50a of the connecting bolts 50. The connecting bolts 50, with the tip ends 50a inserted in the receiving bores 41a, transmit rotation by the motor 43 from the driving rotary shaft 41 to the cylindrical rotary shaft 24, thereby rotating the valve member 11 in the direction indicated by arrow R about the axis of rotation P in the valve device 12.

Between the flange 24f of the cylindrical rotary shaft and the flange 41f of the driving rotary shaft, compression coil springs 44A are fitted on the respective connecting bolts 50 to act as a valve biasing device for pressing upward the cylindrical rotary shaft 24 (i.e. pressing the valve member 11 toward the distributor 10 or gas chamber device 13).

Thus, in the third embodiment, the compression coil springs 44A acting as the valve biasing device biases and presses the valve member 11 toward the distributor 10 or gas chamber device 13 (that is, in the direction to extend the rotary shaft X toward the cylindrical rotary shaft 24). The seal element 17 attached to the bottom plate 10a of the distributor 10 or the seal element 25 on the opening edge of the gas chamber device 13 is thereby placed in pressure contact with the valve member 11. Further, the receiving bores 41a formed in the flange 41f of the driving rotary shaft 41 allow vertical displacement of the tip ends 50a of the connecting bolts 50, thereby forming an elastic portion E for allowing extension and contraction of the rotary shaft X.

For supporting the gas chamber device 13 from below by the lower frame 14a of the installation mount 14, tension coil springs 44B are arranged in four positions at equal intervals around the axis P inside the lower frame 14a having a channel-shaped section, to act as a gas chamber device biasing device for elastically biasing the gas chamber device 13 upward (i.e. toward the valve member 11). Further, connecting rods 48 interconnecting a lower end flange 13f of the gas chamber device 13 and the lower frame 14a are arranged to extend through the centers of the tension coil springs 44B, respectively. The connecting rods 48 have screw threads formed thereon.

Each connecting rod 48 has one end fixed to the lower end flange 13f of the gas chamber device 13, and the other end extending through the upper surface of the lower frame 14a, thereby interconnecting the gas chamber device 13 and lower frame 14a while being capable of vertical displacement. Inside the lower frame 14a having a channel-shaped section, a nut 49 is fixed to the lower end of each connecting rod 48 and is connected to the lower end of the tension coil spring 44B for receiving the tensile biasing force of the tension coil spring 44B and biasing the gas chamber device 13 toward the valve member 11.

As described above, the valve member 11 is pressed toward the distributor 10 by the plurality of (four) compression coil springs 44A arranged at equal intervals around the axis P to act as the valve biasing device. Thus, the valve member 11 may be pressed evenly against the distributor 10. As a result, the distributor-side seal element 17 may reliably be placed in pressure contact with the distributor 10. Further, even when the distributor-side seal element 17 is deformed, the pressing force of the valve member 11 applied to the distributor 10 may be increased partially for the deformed part of the distributor-side seal element 17. In this way, the deformed distributor-side seal element 17 may reliably be placed in pressure contact with the distributor 10. The gastightness of distributor-side seal element 17 may thereby be maintained with increased reliability.

Similarly, the gas chamber device 13 is pressed toward the valve member 11 by the plurality of (four) tension coil springs 44B arranged at equal intervals around the axis P to act as the gas chamber device biasing device. When the gas chamber device-side seal element 25 is deformed, the pressing force of the valve member 11 applied to the gas chamber device 13 may be increased partially for the deformed part of the gas chamber device-side seal element 25. Further, even when, with a deformation of the distributor-side seal element 17, the pressing force of the valve member 11 applied to the distributor 10 is increased partially and the valve member 11 becomes inclined relative to the distributor 10, the gas chamber device 13 also is inclined and pressed toward the valve member 11 in response to the inclination of the valve member 11. As a result, the gas chamber device-side seal element 25 may reliably be placed in pressure contact with the valve member 11.

The other aspects of the construction are the same as in the first embodiment described hereinbefore. Like reference numerals are used to identify like parts which have the same constructions or the same functions as in the first embodiment and will not be described again.

In the third embodiment, the gas chamber device 13, valve device 12 and distributor 10 may be arranged in the stated order of from top as in the second embodiment. In this case, the valve member 11 is pressed toward the gas chamber device 13 by the compression coil springs 44A acting as a valve biasing device, and the distributor 10 is pressed toward the valve member 11 by the tension coil springs 44B acting as a distributor biasing device.

Other Embodiments

Next, other embodiments of this invention will be listed.

In the first and third embodiments, for supporting the valve member 11 to be displaceable toward and away from the distributor 10, and pressing it toward the distributor 10 by the valve biasing device, the valve biasing device is disposed adjacent the gas chamber device 13 for biasing and pushing the valve member 11 toward the distributor 10 with the biasing force acting in the direction to extend the valve biasing device. Alternatively, the valve biasing device may be disposed adjacent the distributor 10 for biasing and pulling the valve member 11 toward the distributor 10 with a biasing force acting in the direction to contract the valve biasing device.

Similarly, in the second embodiment, for supporting the valve member 11 to be displaceable toward and away from the gas chamber device 13, and pressing it toward the gas chamber device 13 by the valve biasing device, the valve biasing device is disposed adjacent the distributor 10 for biasing and pushing the valve member 11 toward the gas chamber device 13 with the biasing force acting in the direction to extend the valve biasing device. Alternatively, the valve biasing device may be disposed adjacent the gas chamber device 13 for biasing and pulling the valve member 11 toward the gas chamber device 13 with a biasing force acting in the direction to contract the valve biasing device.

In the thermal storage type gas treating apparatus in the above first to third embodiments, the distributor 10, the valve device 12 housing the valve member 11, and the gas chamber device 13, are arranged vertically in the state order. The rotary shaft X of the valve member 11 may be placed to extend sideways, with the distributor 10, valve device 12 and gas chamber device 13, arranged horizontally in the state order.

The elastic portion E of the rotary shaft X may be constructed in any way as long as an axial movement of the rotary shaft X is prevented from transmitting to the driving devices 42 and 43 while being capable of transmitting rotation from the drive devices 42 and 43 to the valve member 11. Regarding the positional relationship, the valve biasing device may be provided in any position of the rotary shaft X as long as long as an axial movement of the rotary shaft X is prevented from transmitting to the driving devices 42 and 43.

The biasing device 44B for the gas chamber device in the first and third embodiments, and the distributor biasing device 44B in the second embodiment, are arranged inside the lower frame 14a of the installation mount 14 having a channel-shaped section. This arrangement is not limitative. The tension coil springs 44B acting as the biasing device for the gas chamber device or the distributor biasing device may be arranged in any position as long as they are constructed to bias the gas chamber device 13 or distributor 10 toward the valve member 11.

The biasing device 44B for the gas chamber device and the biasing device 44B for the distributor may be a biasing device having a biasing force for pressing and biasing the gas chamber device 13 or the distributor 10 toward the valve member 11.

The biasing device for the valve member, the biasing device for the gas chamber device, and the biasing device for the distributor, may employ various items such as springs, cylinders or motors.

A specific construction of the thermal storage chambers 3, and a specific construction of the gas passages between the plurality of thermal storage chambers 3 and the distributor 10, are changeable in various ways. Specific constructions of the valve member 11 and distributor 10 for successively communicating the gas feed passage 39 for feeding the gas G to be treated, and the gas exhaust passage 40 for exhausting the treated gas G', with the plurality of thermal storage chambers 3 through the supply and exhaust ports 16 formed in the distributor 10 and the supply port 33 and exhaust port 35 formed in the valve member 11 for opposing to and communicating with these, are not limited to the constructions shown in the foregoing embodiments, but may be changed in various ways.

The constructions for introducing the gas G to be treated from the gas feed passage 39 into the valve member 11, and exhausting the treated gas G' from the valve member 11 to the gas exhaust passage 40, in parallel with rotation of the valve member 11, are also not limited to the constructions of the gas chamber device 13 and valve device 12 shown in the foregoing embodiments, but may be changed in various ways.

The gas G to be treated not limited to exhaust gas from painting equipment or the like. Any type of gas is acceptable as long as it can be treated by combustion in the combustion chamber 6. The purpose of treatment also is not limited to cleaning or deodorization.

The combustion device provided for the combustion chamber 6 is not limited to the burner 7, but may be an electric heater or the like. Each thermal storage chamber 3 may include a catalyst disposed closer to the combustion chamber 6 than the thermal storage medium 5a to treat the gas G to be treated by catalytic combustion.

Different Embodiment 1

In the foregoing embodiments, the switching device 4 may be in the form of a rotation type selector valve having a seal structure shown in FIGS. 13 through 19. The components not referred to in this embodiment are the same as those in the foregoing embodiments.

A seal element 17 is disposed between the distributor 10 and valve member 11 for preventing the gas G to be treated from mixing into the treated gas G' or purge gas G" through a gap between a lower surface "y" of the bottom plate 10a of the distributor serving also as a valve seat plate and an upper surface "x". A seal element 25 for the gas chamber device is disposed between the valve member 11 and gas chamber device 13 for preventing the gas G to be treated from mixing into the treated gas G' through a gap between a lower surface of the valve bottom plate 23 and the edge of the upper end opening of the gas chamber device 13. By preventing the mixing, contaminants and offensive odor substances contained in the gas G to be treated are prevented from being discharged, as untreated, along with the treated gas G' from the apparatus.

Regarding the seal element 17 between the distributor 10 and valve member 11, the seal element 17 is attached to the upper surface "x" of the valve top plate 22. With rotation of the valve member 11, the seal element 17 is slidable in contact with the lower surface "y" of the bottom plate 10a of the distributor serving as a valve seat plate. Specifically, this seal element 17 includes the following three seal portions (A) to (C) (see FIGS. 16 and 17).

(A) Two annular seal portions 17a and 17b surrounding the valve member axis of rotation P, located inside and outside the row of the three main valve ports (supply port 33, purge port 34 and exhaust port 35), (in other words, opposite outer sides in the direction of width of the row of the main valve ports), and, with rotation of the valve member 11, slidable in contact with the lower surface "y" of the bottom plate 10a inside and outside the row of the auxiliary valve ports (supply and exhaust ports 16), (in other words, opposite outer sides in the direction of width of the row of the auxiliary valve ports).

(B) Dividing seal portions 17c located adjacent and outside the two edges, seen in the direction of valve member rotation, of the opening of each of the supply port 33, purge port 34 and exhaust port 35, having a linear shape extending radially of the rotation and between the two annular seal portions 17a and 17b, and, with rotation of the valve member 11, slidable in contact with the lower surface "y" of the bottom plate 10a.

(C) Auxiliary dividing seal portions 17d located in the middle between the dividing seal portions 17c adjoining each other on the closed portions Sx between the supply port 33, purge port 34 and exhaust port 35 adjoining in the direction of valve member rotation, having a linear shape extending radially of the rotation and between the two annular seal portions 17a and 17b, and, with rotation of the valve member 11, slidable in contact with the lower surface "y" of the bottom plate 10a.

The dividing seal portions 17c, auxiliary dividing seal portions 17d, and supply and exhaust ports 16 are in a positional relationship as shown in FIGS. 16 and 17. The dividing seal portions 17c adjoining each other across the auxiliary dividing seal portions 17d on the closed portions Sx between the supply port 33, purge port 34 and exhaust port 35 in the upper surface "x" of the valve top plate 22 are arranged at intervals $\theta d$ equal to or larger than a width $\theta m$ of each supply and exhaust port 16 in the direction of rotation. A width $\theta n$ in the direction of rotation of each closed portion Sy between the supply and exhaust ports 16 in the lower surface "y" of the bottom plate 10a is equal to or larger than an interval $\theta e$ ($=\frac{1}{2}\theta d$) between the dividing seal portion 17c and auxiliary dividing seal portion 17d in each of the closed portions Sx between the supply port 33, purge port 34 and exhaust port 35 (thus, $\theta d \geq \theta m$ and $\theta n \geq \theta e$).

The seal element 17 is attached to the valve top plate 22, with the linear seal portions 17a-17d fitted in the grooves "z" formed in the upper surface "x" of the valve top plate 22.

In the case of the rotation type selector valve acting as the switching device 4 in this embodiment, one example of positional relationship between the dividing seal portions 17c and auxiliary dividing seal portions 17d of the seal element 17 and the supply and exhaust ports 16 is as set out below.

An interval $\theta a$ between the dividing seal portions 17c opposed across the main valve port for gas supply (supply port 33)=131 degrees;

An interval $\theta b$ between the dividing seal portions 17c opposed across the main valve port for purging (purge port 34)=8 degrees;

An interval $\theta c$ between the dividing seal portions 17c opposed across the main valve port for gas exhaust=131 degrees;

The interval $\theta d$ between the dividing seal portions 17c opposed across each auxiliary dividing seal portion 17d=30 degrees;

The interval $\theta e$ between the dividing seal portion 17c and auxiliary dividing seal portion 17d=15 degrees;

The width $\theta m$ in the direction of rotation of each supply and exhaust port 16=30 degrees;

The width $\theta n$ in the direction of rotation of each closed portion Sy between the supply and exhaust ports 16=15 degrees.

(In this example, each of intervals $\theta a$ to $\theta e$ is a center interval.)

Regarding the seal element 25 for the gas chamber device, on the other hand, the seal element 25 is attached to the opening edge at the upper end of the gas chamber device 13. With rotation of the valve member 11, the seal element 25 is slidable in contact with the lower surface of the valve bottom plate 23. The seal element 25 for the gas chamber device is attached to the opening edge at the upper end of the gas chamber device 13 as fitted in an annular groove formed in the opening edge at the upper end of the gas chamber device 13.

In short, in this embodiment, the valve top plate 22 of the valve member 11 and the bottom plate 10a of the distributor 10 act as a main valve component and an auxiliary valve component rotatable relative to each other in a state of proximal surface-to-surface opposition. The upper surface "x" of the valve top plate 22 acts as a main opposite surface of the main valve component opposed to the auxiliary valve component. The lower surface "y" of the bottom plate 10a acts as an auxiliary opposite surface of the auxiliary valve component opposed to the main valve component.

A connection port 13s for gas supply, an interior space 13r of the gas chamber device 13, the communicating opening 37 for gas supply and an internal passage for gas supply (supply chamber 27) of the valve member 11 constitute a main gas supply passage having a passage port in the form of a main valve port for gas supply (supply port 33) formed in the upper surface "x" (main opposite surface) of the valve top plate 22. An internal passage for gas exhaust (exhaust chamber 28) of the valve member 11, the communicating opening 38 for gas exhaust, the device interior space 12r around the valve member 11 in the valve device 12 and a connection port 12s for gas exhaust constitute a main gas exhaust passage (gas exhaust passage 40) having a passage port in the form of a main valve port for gas exhaust (exhaust port 35) formed in the upper surface "x" (main opposite surface) of the valve top plate 22.

The central chamber 18 of the distributor 10, the communicating bore 24a in the upper end of the cylindrical rotary shaft 24, the interior of the cylindrical rotary shaft 24, the purge communicating opening 36 formed in the cylindrical rotary shaft 24 and the purge chamber 31 of the valve member 11 constitute a main purge passage having a passage port in the form of a main valve port for purge (purge port 34) formed in the upper surface "x" (main opposite surface) of the valve top plate 22. The plurality of supply and exhaust chambers 8 in the distributor 10 and the plurality of supply and exhaust passages 15 constitute auxiliary passages (supply and exhaust passages 16) having passage ports in the form of a plurality of auxiliary valve ports (supply and exhaust ports 16) formed in the lower surface "y" (auxiliary opposite surface) of the bottom plate 10*a*.

In this embodiment, the seal element 17 disposed between the upper surface "x" of the valve top plate 22 (the main opposite surface) and the lower surface "y" of the bottom plate 10*a* includes the annular seal portions 17*a* and 17*b*, dividing seal portions 17*c* and auxiliary dividing seal portions 17*d*. As noted described hereinbefore (see FIG. 17 (*a*)-(*c*)), the dividing seal portions 17*c* adjoining each other in the closed portions Sx between the main valve ports (supply port 33, purge port 34 and exhaust port 35) in the main opposite surface are arranged at intervals θd equal to or larger than the width θm of each auxiliary valve port (supply and exhaust port 16) in the auxiliary opposite surface "y" in the direction of rotation (θd≧θm). The width θn in the direction of rotation of each closed portion Sy between the auxiliary valve ports (supply and exhaust ports 16) in the auxiliary opposite surface "y" is equal to or larger than the interval θe between the dividing seal portion 17*c* and auxiliary dividing seal portion 17*d* in each of the closed portions Sx between the main valve ports (supply port 33, purge port 34 and exhaust port 35) (θ≧θn≧θe). Then, it is possible to prevent mixing of the gas G to be treated, treated gas G' and purge gas G", which should pass through different main valve ports (supply port 33, purge port 34 and exhaust port 35) and different auxiliary valve ports (supply and exhaust ports 16). As a result, while adopting the form of attaching the seal element 17 to the main opposite surface "x", and while avoiding a specialization of the shape of the seal element 17, the large width θm in the direction of rotation (i.e. opening area) is secured for each auxiliary valve port (supply and exhaust port 16) in the auxiliary opposite surface "y".

In above embodiment, while three main valve ports (supply port 33, purge port 34 and exhaust port 35) are formed in the valve top plate 22, eight auxiliary valve ports (supply and exhaust ports 16) are formed in the bottom plate 10*a*. In implementing this invention, the number of a plurality of main valve ports formed in the main opposite surface of the main valve component, and the number of a plurality of auxiliary valve ports (supply and exhaust ports 16) formed in the auxiliary opposite surface of the auxiliary valve component, are not limited to three or eight.

In the above embodiment, one auxiliary dividing seal portion 17*d* is formed between the dividing seal portions 17*c* adjoining each other in each of the closed portions Sx between the main valve ports (supply port 33, purge port 34 and exhaust port 35) in the upper surface "x" of the valve top plate 22. Alternatively, as shown in FIGS. 18 and 19, each of the closed portions Sx between the main valve ports (supply port 33, purge port 34 and exhaust port 35) in the main opposite surface "x" may have a plurality of auxiliary dividing seal portions 17*d* arranged at intervals between adjacent dividing seal portions 17*c* in the direction of relative rotation of the main valve component 22 and the auxiliary valve component 10*a*.

Specific shapes and constructions of the main valve component 22, auxiliary valve component 10*a*, the plurality of main passages having the main valve ports (supply port 33, purge port 34 and exhaust port 35) acting as the passage ports, and the plurality of auxiliary passages having the auxiliary valve ports (supply and exhaust ports 16) acting as the passage ports, are not limited to the shapes and constructions shown in the above embodiment, but may be changed in various ways.

In the above embodiment, the main opposite surface "x" (upper surface of the valve top plate 22) and auxiliary opposite surface "y" (lower surface of the bottom plate 10*a*) opposed to each other in the proximal surface-to-surface state are circular surfaces. Instead, a construction may be employed where the main opposite surface "x" and auxiliary opposite surface "y" are cylindrical surfaces.

The rotation type selector valve according to the present invention is applicable not only to switching of the gas passages in the thermal storage type gas treating apparatus as shown in the above embodiment, but to various uses that require switching of passages. The fluid to be treated may also be either gas or liquid.

Different Embodiment 2

In the gas treating apparatus according to the present invention, as shown in FIGS. 20 through 23, the switching device 4 may be in the form of a rotation type selector valve having a resistance adjusting mechanism described hereinafter. The components not referred to in this embodiment are the same as those in the foregoing embodiments.

A first common passage port (connection port 12*s*) for connecting the gas exhaust passage 40 for treated gas G' is formed in one location in the valve rotating direction circumferentially of the valve device machine 12. A first passage chamber (internal space 12*r* of the device) around the valve member 11 in the valve device 12 includes an arcuate, fixed resistance plate 51 extending along the valve peripheral wall 21 of the valve member 11 over a predetermined angular range a covering an upstream side and downstream side of the connection port 12*s* with respect to the valve rotating direction. When, as shown in FIGS. 22 and 23 (*a*), a common side opening (communicating port 38) for the valve device of a first internal passage (exhaust chamber 28) of the valve member 11 approaches the connection port 12*s* by movement in the valve rotating direction accompanying rotation of the valve member 11, the fixed resistance plate 51 in a position adjacent the valve member 11 and away from the connection port 12*s* is facially opposed to the common side opening (communicating port 38) of the first internal passage (exhaust chamber 28).

That is, this fixed resistance plate 51 acts as a resistance adjusting device "r". When the communicating port 38 of the exhaust chamber 28 approaches the connection port 12*s* by movement in the valve rotating direction accompanying rotation of the valve member 11 (FIGS. 22 and 23 (*a*)), a gas passage resistance is applied to the gas path between the supply and exhaust ports 16 in the bottom plate 10*a* opposed to and communicating with the selecting side opening (exhaust port 35) of the exhaust chamber 28 and the connection port 12*s*. When the communicating port 38 of the exhaust chamber 28 in the valve member 11 moves away from the connection port 12*s* of the valve device 12 by movement in the valve rotating direction accompanying rotation of the valve member 11 (FIGS. 20 and 23 (*c*)), the gas passage resistance is removed. That is, when the communicating port 38 of the exhaust chamber 28 approaches the connection port 12*s*, the fixed resistance plate 51 is facially opposed to the communicating port 38. Then, the fixed resistance plate 51 applies a gas passage resistance between the communicating port 38 and connection port 12*s*. On the other hand, when the communication port 38 moves away from the connection port 12*s*, the communicating port 38 of the exhaust chamber 28 is freed from the facial opposition by the fixed resistance plate 51. The communicating port 38 and connection port 12*s* of the exhaust chamber 28 communicate through a separating space S between the connection port 12*s* and fixed resistance plate 51, and the gas passage resistance is removed.

In the application and removal of the gas resistance with the fixed resistance plate 51, as shown in the order of FIG. 23 (*a*)-(*d*), as the communicating port 38 approaches the connection port 12*s* by movement in the valve rotating direction accompanying rotation of the valve member 11, the area of the fixed resistance plate 51 opposed to the communicating port 38 becomes larger to apply a gradually increasing resistance. On the other hand, as the communication port 38 moves away from the connection port 12*s* by movement in the valve rotating direction accompanying rotation of the valve member 11, the area of the fixed resistance plate 51 opposed to the communicating port 38 becomes smaller to apply a gradually decreasing resistance.

When the communicating port 38 approaches the connection port 12*s* in this way, a gas passage resistance is applied to the gas passage between the common side opening communicating port 38 of the exhaust chamber 28 and connection port 12*s*. On the other hand, when the communication port 38 of the exhaust chamber 28 moves away from the connection port 12*s*, the resistance is removed. This prevents periodic volume variations of the passing gas (treated gas G' and gas G to be treated) resulting from variations in the passage length between the connection port 12*s* and communication port 38. As a result, a lowering of apparatus performance and operation troubles due to gas volume variations are avoided.

Reference 51*a* denotes leg members connecting and supporting the fixed resistance plate 51 to the peripheral wall of the valve device 12 while securing the separating space S with respect to the connection port 12*s*.

In the above embodiment, only the fixed resistance plate 51 is provided in the first passage chamber (internal space 12*r* of the device). Instead, only a fixed resistance plate 52 may be provided in the second passage chamber (interior space 13*r*) as shown in broken lines in the drawings. When the common side opening (communicating port 37) of the second internal passage (supply chamber 27) for the gas chamber device 13 approaches the second common passage port (connection port 13*s*) by movement in the valve rotating direction accompanying rotation of the valve member 11, the fixed resistance plate 52 is facially opposed to the communicating port 37 in a position adjacent the valve member 11 and away from the interior space 13*r*. Or a composition may be employed that includes both the fixed resistance plate 51 in the first passage chamber (internal space 12*r* of the device) and the fixed resistance plate 52 in the second passage chamber (interior space 13*r*).

In the above embodiment, the resistance adjusting device "r" is in the form of the fixed resistance plate 51 (or 52). This is not limitative, but a specific construction of the resistance adjusting device "r" is changeable in various ways. For example, a valve may be employed that is switchable between an operative state and an inoperative state with rotation of the valve member 11.

Preferably, but not limitatively, the resistance adjusting device "r" is the type that applies a gradually varying resistance with rotation of the valve member 11. Instead, it may be the type that applies a resistance variable stepwise. Depending on the case, it may be the type that applies a fixed resistance in the operative state, and only removes the resistance in the inoperative state.

In the thermal storage type gas treating apparatus shown in the above embodiment, the interior space 12*r* of the valve device 12 is the first passage chamber for the treated gas G', and the interior space 13*r* of the gas chamber device 13 is the second passage chamber for the gas G to be treated. In implementing the thermal storage type gas treating apparatus according to the present invention, a construction may be employed where, conversely to the above, the interior space 12*r* of the valve device 12 is the second passage chamber for the gas G to be treated, and the interior space 13*r* of the gas chamber device 13 is the first passage chamber for the treated gas G'.

The rotation type selector valve according to the present invention is not limited to the construction where the valve member 11 has two internal passages, i.e. the first and second internal passages, but the valve member may have only one internal passage. Its purpose is not limited to switching of the gas passages in the thermal storage type gas treating apparatus, but it may be directed to various uses in various fields. The fluid handled is not limited to gas.

Further, in implementing the rotation type selector valve according to the present invention, specific constructions of various components such as the valve seat plate, valve member, internal passages and passage chambers are limited to the constructions shown in the above embodiment, but may be changed in various ways.

Different Embodiment 3

The gas treating apparatus according to the present invention may include a cooling mechanism as shown in FIGS. 24 through 30.

A portion below the thermal storage medium layer 5 in each thermal storage chamber 3, of each of the gas passages extending from treated gas outlets of the thermal storage medium layers 5 (i.e. the lower ends of the thermal storage medium layers 5) to the rotation type selector valve acting as the switching device 4, includes a temperature sensor "s" for detecting the temperature "t" of the gas passing through the thermal storage medium layer 5 and spray nozzles 54 for spraying cooling water W to the treated gas G' having passed through the thermal storage medium layer to cool the treated gas G'. The temperature sensor and spray nozzle are arranged in the stated order from an upstream side in the flowing direction of the treated gas. The cooling water W is supplied to each spray nozzle 54 through a supply channel 54A by a pump 53.

The supply channel 54A for each spray nozzle 54 includes a switch valve 55 for effecting and stopping spraying of cooling water W from each spray nozzle 54. The switch valve 55 is opened and closed by a control device C based on the temperature "t" detected by each temperature sensor "s" and a preset temperature ts.

Specifically, when the temperature "t" detected by one of the temperature sensors "s" equals or exceeds the preset temperature ts (t≧ts), the switch valves 55 corresponding to the temperature sensor "s" are opened to spray cooling water W from the corresponding spray nozzles 54. On the other hand, when the temperature "t" detected by one of the temperature sensors "s" falls below the preset temperature ts (t<ts), the switch valves 55 corresponding to the temperature sensor "s" are closed to stop spraying of cooling water W from the corresponding spray nozzles 54.

By selecting an appropriate temperature as the preset temperature ts for the cooling water spraying from the spray nozzles 54, the cooling water W is sprayed from the spray nozzles 54 of each thermal storage chamber 3 when hot treated gas G' passes through that thermal storage chamber 3, thereby to cool the treated gas G'. This is effective to prevent heat damage of the elements 17 and 25 done by hot treated gas G'.

Based on the temperature "t" detected by the temperature sensor "s" provided in each thermal storage chamber 3, the corresponding spray nozzles 54 are operated. With a successive switching of the thermal storage chambers 3 through which the treated gas G' passes, the spray nozzles 54 for injecting the cooling water W also switch successively.

In place of the gas cooling mechanism described above, it is possible to employ a construction shown in FIGS. 9 through 12. That is, spray nozzles 54 acting as a cooling device are arranged in the gas exhausting internal passage (exhaust chamber 28) of the valve member 11 for spraying cooling water W toward the exhaust port 35. The treated gas G' in the distributor 10 is cooled through the supply and exhaust ports 16 of the bottom plate 10a.

The spray nozzles 54, supply channels 54A, switch valves 55, pump 53, temperature sensors "s" and control device C constitute a cooling device. The temperature sensors "s" and control device C constitute the interlocking device.

In place of the above embodiment, the cooling mechanism may take the following form.

In FIGS. 28 through 30, three spray nozzles 54 are arranged in the exhaust chamber 28 of the valve member 11, at equal intervals in a radial direction from the cylindrical rotary shaft 24, and connected to the supply channel 54A extending inside the cylindrical rotary shaft 24. Cooling water W supplied through the supply channel 54A is sprayed so that the cooling water W may enter the distributor 10 from the whole region of the exhaust gas opening 35, thereby to cool treated gas G' in the distributor 10.

The spray nozzles 54 and supply channel 54A rotate as interlocked with rotation of the valve member 11. The cooling water W is supplied by the pump 53 to a feed section 54B relatively rotatably surrounding the cylindrical rotary shaft 24 under the gas chamber device 13. The water flows from the feed section 54B into the supply channel 54A through an inflow port 5a of the supply channel 54A formed in a feed section arranging position of the cylindrical rotary shaft 24, and sprayed from the spray nozzles 54.

The pump 53 is operable to deliver the cooling water W under control of the control device C based on the temperature "t" detected by temperature sensor "s" provided under the thermal storage medium layer 5 in each thermal storage chamber 3. When the temperature "it" detected by at least one of the temperature sensors "s" equals or exceeds the preset temperature ts (that is, when treated gas G' at a temperature with a possibility of causing heat damage to the seal elements 17 and 25 passes through one of the thermal storage chambers 3), the control device operates the pump 53 to spray the cooling water W from the spray nozzles 54. On the other hand, when the temperatures "t" detected by all the temperature sensors "s" are below the preset temperature ts, the pump 53 is stopped to stop the spraying of the cooling water W from the spray nozzles 54.

With this construction, heat damage to the seal elements 17 and 25 may be prevented with the small number of spray nozzles 54, supply pipe 54a and switch valves 55.

By selecting an appropriate temperature as the preset temperature ts, an unnecessary cooling water spraying from the spray nozzles 54 may be avoided in time of treated gas G' or purge gas G" passing through the thermal storage chambers 3. A wasteful cooling water spraying from the spray nozzles 54 may be avoided when treated gas G' passing through the thermal storage chambers 3 is at a temperature not causing damage to the seal elements 17 and 25.

In the above embodiment, the spray nozzles 54 are employed as the cooling device for cooling the treated gas G' from the combustion chamber 6, Cooling water W is sprayed from the spray nozzles 54 to the treated gas G to cool the treated gas G'. This construction is not limitative. The treated gas G' may be cooled by an air cooling device that blows off cold air, or a different cooling device such as a heat exchanger for effecting a heat exchange between the treated gas and a cooling heat transfer medium through a heat conducting wall. Where the nozzles 54 for spraying cooling water W are employed as the cooling device, the cooling water W may be sprayed in a form such as in mist or shower.

Where the nozzles 54 for spraying cooling water W are employed as the cooling device, the sprayed cooling water W may be applied directly to the seal element of the switching device (particularly the seal element 17 located adjacent the exhaust port 35) to cool directly the seal element along with the treated gas G'.

In the above embodiment, the spray nozzles 54 constituting the cooling device are arranged under the thermal storage medium layer 5 in each thermal storage chamber 3. In the second embodiment, the spray nozzles 54 are provided in the exhaust chamber 28 of the valve member 11 in the rotation type selector valve. The arranging position of the cooling device in the gas supply and exhaust passages extending to the combustion chamber 6 may be the passage portions extending from the outlets of the treated gas G' of the thermal storage chambers 3 in the thermal storage medium layers 5 to the rotation type selector valve (supply and exhaust passages 15 and supply and exhaust chambers 8), or the inlet (the portion of the exhaust port 35) of the treated gas G' in the switching device.

In the above embodiment, the cooling device is switched between the operative state and inoperative state based on the temperature "t" detected by each temperature sensor "s". The construction for switching the cooling device between the operative state and inoperative state is not limited to this construction, but various other constructions may be employed.

The temperature of treated gas G' discharged from the combustion chamber 3 is detected by the temperature sensors "s" upstream of the cooling position by the cooling device with respect to the flowing direction of the treated gas. Based on the detected temperature "t", the amount of cooling for the treated gas G' by the cooling device (e.g. the quantity of water sprayed from the spray nozzles 54) may be adjusted.

Further, where an interlocking device is provided to be operable to switch the plurality of cooling devices in response to the switching of the gas passing state by the switching device, the interlocking device is not limited to the switching of the cooling devices based on the temperature detection as shown in the first embodiment described above, but various other switching modes are applicable.

Next, a method of cleaning the thermal storage medium layers 5 in the above thermal storage type gas treating apparatus will be described.

The above thermal storage type gas treating apparatus treats the gas G to be treated G by combustion in the combustion chamber 6, and exhausts treated gas G' to the exhaust passage 40. When this gas treating operation is carried out for a certain period, a resin-like combustion by-product, dust and the like accumulate in lower portions of the thermal storage medium layers 5 (i.e. the exit sides for the treated gas G'). This accumulation increases the passage resistance of the thermal storage medium layers 5, for example, to lower the gas treating performance. Therefore, an operation is carried out periodically to remove the deposits of resin-like combustion by-product, dust and the like as objects to be removed by combustion or evaporation from the thermal storage medium layers 5. The cleaning operation is carried out as follows.

In place of the treated gas G'in time of the gas treating operation, a cleaning gas "g" heated in the combustion chamber 6 is passed through part of the thermal storage medium layers 5 (thermal storage medium layers 5 passing to the exhaust port 35 of the rotary valve member 11) for a longer time than a passage time of the gas G to be treated and treated gas G' in time of the gas treating operation. The passage of this cleaning gas "g" maintains the temperature of the exit sides of treated gas G' in these thermal storage medium layers 5 at a predetermined cleaning temperature. This burns or evaporates the objects to be removed (resin-like combustion by-product and dust) in the exit sides. The burned or evaporated objects are discharged, along with the used cleaning gas g', through the same passages as the passages of the treated gas G' in time of the gas treating operation and through the switching device 4 to the exhaust passage 40, thereby cleaning the thermal storage medium layers 5.

Then, the switching device 4 is operated to change the gas passage state, i.e. to switch the thermal storage medium layers 5 that pass the cleaning gas "g". In this way, the same cleaning operation is carried out successively for the thermal storage medium layers 5, to clean all the thermal storage medium layers 5.

In this cleaning operation, as in the gas treating operation, the control device C causes cooling water to be sprayed from the spray nozzles 54 based on the temperature "t" detected by the temperature sensor "s". This prevents heat damage of the seal element 17 and seal element 25 by the used cleaning gas g'.

According to the thermal storage type gas treating apparatus in this embodiment, as described above, in time of both gas treating operation and cleaning operation, heat damage to the seal element 17 and seal element 25 in the switching device 4 is prevented effectively.

In time of gas treating operation, the treated gas G' is prevented from doing heat damage to the seal elements 17 and 25, to ease a limitation to the temperature of gas to be treated G introduced into the apparatus, and the combustion temperature in the combustion chamber 6. The versatility of the apparatus and the treating performance of the combustion process are also improved. It is also possible to lighten the burden of maintenance such as changing of the two seal elements 17 and 25, and to improve the reliability of the apparatus with respect to sealing.

In time of cleaning operation, the used cleaning gas g' is prevented from doing heat damage to the seal elements 17 and 25. Without installing separately a cleaning gas exhaust passage for exclusive use for discharging the used cleaning gas g', the used cleaning gas g' may be discharged through the switching device 4. By switching the switching device 4, the cleaning operation may be carried out efficiently for each thermal storage medium layer 5.

Different Embodiment 4

In the thermal storage type exhaust gas treating apparatus according to this invention, the housing 1 and partition walls 2 may be constructed as shown in FIGS. 32 through 34.

The housing 1 is formed of an outer stainless plate 1a and an inner fire-resistant heat insulating block 1b. The inner surfaces of the housing 1 define fitting grooves F for fitting the partition walls 2 therein.

As shown in FIGS. 33 and 34, each partition wall 2 defining the thermal storage chambers 3 is formed of a ceramic fiberboard 2a consisting of a ceramic fiber material which is a nonmetallic inorganic material formed into a plate form to act as a wall main material, and a stainless steel material 2b which is a film-like metal material in foil form about 0.05 mm thick. The construction of the partition wall 2 is such that two wall materials 2A, each having one foil-like stainless steel material 2b applied to one surface of one ceramic fiberboard 2a, are joined together with the foil-like stainless steel materials 2b opposed to and contacting each other. In this state, the partition wall 2 is fixedly fitted in a fitting groove F formed inside the housing 1.

The ceramic fiberboard 2a, as the wall main material, has good handling convenience because of a very small contraction factor, its rigidity, excellent heat resistance and corrosion resistance, and its lightness.

Further, the partition wall 2 may be advantageous in respect of cost and manufacture by using, as the thin film-like metal material, the foil-like stainless steel material 2b excellent in heat resistance and processability, and relatively inexpensive. Since the stainless steel material is excellent also in corrosion resistance, a good gastight state may be maintained also when treating a corrosive gas.

Different Embodiment 5

In the foregoing embodiments, the seal biasing structure may be modified as shown in FIG. 35.

For supporting the gas chamber device 13 from below by the lower frame 14a of the installation mount 14, coil springs 44C are arranged between the lower frame 14a and gas chamber devices 13 to act as support elements for elastically pressing the gas chamber device 13 upward (i.e. pressing toward the valve member 11). In supporting state for allowing vertical displacement of the gas chamber device 13 and valve member 11 as described hereinbefore, the gas chamber device 13 is pressed upward by the coil springs 44C. As a result, the valve member 11 is pressed upward (i.e. toward the distributor 10 side press) by the coil springs 44C through the gas chamber device 13.

By pressing the valve member 11 toward the distributor 10 in this way, the seal element 17 attached to the bottom plate 10a of the distributor 10, as pressed by the valve member 11, is reliably placed in pressure contact with the valve top plate 22 of the valve member 11. As a result, the seal element 17 reliably performs the sealing function between the distributor 10 and valve member 11, to reliably preclude the communication between the supply port 33 and exhaust port 35 and the communication between the supply port 33 and purge port 34 through a gap between the bottom plate 10a of the distributor 10 and the valve top plate 22 of the valve member 11.

By pressing the gas chamber device 13 toward the valve member 11 with the coil springs 44C, the valve member 11 is pressed through the gas chamber device 13 toward the distributor 10. This construction places the seal element 17 attached to the bottom plate 10a of the distributor 10 in pressure contact with the valve top plate 22 of the valve member 11 as noted above, and at the same time reliably places the seal element 25 of the gas chamber device provided for the opening edge at the upper end of the gas chamber device 13 in pressure contact with the bottom plate 23 of the valve member 11 as pressed by the gas chamber device 13. As a result, the gas G to be treated is reliably prevented from leaking from the gas chamber device 13 into the valve device 12.

Numeral 49' in the drawing denotes double nut mechanisms for adjusting positions of bearing seats 48' to the coil springs 44C. This positional adjustment of the bearing seats 48' adjusts the biasing force of the coil springs 44C applied to the gas chamber device 13 and valve member 11 (in other words, the pressing force of the seal element 17 applied to the bottom plate 10a of the distributor 10, and the pressing force of the seal element 25 applied to the valve bottom plate 23 of the valve member 11).

For allowing vertical displacement of the gas chamber device 13 and valve member 11, the upper end of the cylindrical rotary shaft 14 of the valve member 11 is supported by the distributor 10 through a bearing 47 that allows sliding movement axially of the object shaft. Similarly, the drive shaft 41 connected to the speed reducer 42 through a shaft coupling 45' that allows sliding movement axially of the object axis.

In short, the valve member 11 is supported to be displaceable toward and away from the distributor 10, and is pressed toward the distributor 10 by the biasing device. Consequently, the seal element 17 attached to the bottom plate 10a of the distributor 10 is pressed on the top plate 22 of the valve member 11 reliably by a suitable pressure.

In the construction having the valve member 11 disposed between the distributor 10 and gas chamber device 13, the valve member 11 is pressed toward the distributor 10 by the biasing device which presses the gas chamber device 13 toward the valve member 11. Thus, in this construction, the biasing device presses the valve member 11 toward the distributor 10 through the gas chamber device 13, the coil springs 44C are used as the biasing device.

INDUSTRIAL UTILITY

The present invention is applicable to rotation type selector valves for use in thermal storage type gas treating apparatus, rotation type selector valves for a switching device for use in rotation type thermal storage apparatus, and rotation type selector valves for other uses.

What is claimed is:

1. A thermal storage gas treating apparatus comprising:
   a plurality of thermal storage chambers containing a thermal storage medium, each of the thermal storage chambers having one end thereof communicating with a combustion chamber having a combustion device;
   a valve member disposed between a distributor and a gas chamber device to be rotatable in slidable contact with the distributor and the gas chamber device, the distributor defining a plurality of supply and exhaust ports arranged in a direction of rotation of the valve member, each of the supply and exhaust ports communicating with the other end of one of the thermal storage chambers;
   the valve member defining a supply port for a gas to be treated and an exhaust port for a treated gas arranged to oppose to and communicate with the supply and exhaust ports of the distributor, with rotation of the valve member, the supply port and the exhaust port not opposing to or communicating with the same supply and exhaust ports simultaneously;
   a gas feed passage for communicating with the supply port of the valve member through the gas chamber device, or a gas exhaust passage for communicating with the exhaust port of the valve member through the gas chamber device; and
   a distributor-side seal element disposed between the distributor and the valve member for precluding communication between the supply port and the exhaust port through a gap between the distributor and the valve member;
   the valve member being rotatable to supply the gas to be treated introduced from the gas feed passage into the valve member to the distributor through the supply port, and to discharge the treated gas exhausted from the distributor to the valve member through the exhaust port to the gas exhaust passage;
   wherein the thermal storage gas treating apparatus comprises a valve biasing device for supporting the valve member to be displaceable toward and away from the distributor, and pressing the valve member toward the distributor while being inoperative to the gas chamber device.

2. The thermal storage gas treating apparatus as defined in claim 1, further comprising:
   a gas chamber device-side seal element disposed between the gas chamber device and the valve member for preventing gas leakage through a gap between the gas chamber device and the valve member; and a biasing device for the gas chamber device for supporting the gas chamber device to be displaceable toward and away from the valve member, and pressing the gas chamber device toward the valve member.

3. The thermal storage gas treating apparatus as defined in claim 1, wherein the valve biasing device biases the valve member by biasing a rotary shaft of the valve member in a direction to extend or contract the rotary shaft.

4. The thermal storage gas treating apparatus as defined in claim 3, wherein the rotary shaft has an elastic portion disposed between a driving device for driving the rotary shaft and the valve member, the valve biasing device exerting biasing action on a rotary shaft portion between the elastic portion and the valve member.

5. The thermal storage gas treating apparatus as defined in claim 3, wherein the valve biasing device includes a plurality of valve biasing elements arranged equidistantly around an axis of the rotary shaft.

6. A thermal storage gas treating apparatus comprising:
   a plurality of thermal storage chambers containing a thermal storage medium, each of the thermal storage chambers having one end thereof communicating with a combustion chamber having a combustion device;
   a valve member disposed between a distributor and a gas chamber device to be rotatable in slidable contact with the distributor and the gas chamber device, the distributor defining a plurality of supply and exhaust ports arranged in a direction of rotation of the valve member, each of the supply and exhaust ports communicating with the other end of one of the thermal storage chambers;
   the valve member defining a supply port for a gas to be treated and an exhaust port for a treated gas arranged to oppose to and communicate with the supply and exhaust ports of the distributor, with rotation of the valve member, the supply port and the exhaust port not opposing to or communicating with the same supply and exhaust ports simultaneously;
   a gas feed passage for communicating with the supply port of the valve member through the gas chamber device, or a gas exhaust passage for communicating with the exhaust port of the valve member through the gas chamber device; and
   a gas chamber device-side seal element disposed between the gas chamber device and the valve member for preventing gas leakage through a gap between the gas chamber device and the valve member;
   the valve member being rotatable to supply the gas to be treated introduced from the gas feed passage into the valve member to the distributor through the supply port, and to discharge the treated gas exhausted from the distributor to the valve member through the exhaust port to the gas exhaust passage;

wherein the thermal storage gas treating apparatus comprises a valve biasing device for supporting the valve member to be displaceable toward and away from the gas chamber device, and pressing the valve member toward the gas chamber device while being inoperative to the distributor.

7. The thermal storage gas treating apparatus as defined in claim 6, further comprising:

a distributor-side seal element disposed between the distributor and the valve member for precluding communication between the supply port and the exhaust port through a gap between the distributor and the valve member; and a distributor biasing device for supporting the distributor to be displaceable toward and away from the valve member, and pressing the distributor toward the valve member.

8. The thermal storage gas treating apparatus as defined in claim 6, wherein the valve biasing device biases the valve member by biasing a rotary shaft of the valve member in a direction to extend or contract the rotary shaft.

9. The thermal storage gas treating apparatus as defined in claim 8, wherein the rotary shaft has an elastic portion disposed between a driving device for driving the rotary shaft and the valve member, the valve biasing device exerting biasing action on a rotary shaft portion between the elastic portion and the valve member.

10. The thermal storage gas treating apparatus as defined in claim 8, wherein the valve biasing device includes a plurality of valve biasing elements arranged equidistantly around an axis of the rotary shaft.

11. A rotation selector valve comprising:

a main valve component and an auxiliary valve component rotatable relative to each other, with mutually opposed surfaces located close to each other;

a plurality of auxiliary valve ports serving as passage ports of a plurality of auxiliary passages, the auxiliary valve ports being formed in an auxiliary opposite surface of the auxiliary valve component opposed to the main valve component, and arranged in a direction of the relative rotation about an axis of the relative rotation; and a plurality of main valve ports serving as passage ports of a plurality of main passages, the main valve ports being formed in a main opposite surface of the main valve component opposed to the auxiliary valve component, and arranged in the direction of the relative rotation about the axis of the relative rotation, for successively opposing to the plurality of auxiliary valve ports as a result of the relative rotation, such that two of the main valve ports adjoining each other in the direction of the relative rotation do not oppose to the same one of the auxiliary valve ports;

wherein the rotation selector valve comprises a seal element disposed between the main opposite surface and the auxiliary opposite surface, said seal element including:

annular seal portions surrounding the axis of rotation, and located at opposite outer sides in a direction of width of a row of the main valve ports, to be slidable in contact with the auxiliary opposite surface at opposite outer sides in a direction of a width of a row of the auxiliary valve ports as a result of the relative rotation;

dividing seal portions located adjacent and outside two edges, seen in the direction of the relative rotation, of each of the main valve ports, and having a linear shape extending between the two annular seal portions located at the opposite outer sides in the direction of the width of the row of the main valve ports, to be slidable in contact with the auxiliary opposite surface as a result of the relative rotation; and auxiliary dividing seal portions located between the dividing seal portions adjoining each other in the closed portions between the main valve ports adjoining in the direction of the relative rotation, and having a linear shape extending between the two annular seal portions located at the opposite outer sides in the direction of width of the row of the main valve ports, to be slidable in contact with the auxiliary opposite surface as a result of the relative rotation.

12. The rotation selector valve as defined in claim 11, wherein each of the closed portions between the main valve ports adjoining each other in the direction of the relative rotation has a plurality of auxiliary dividing seal portions arranged at intervals between adjacent ones of the dividing seal portions in the direction of the relative rotation.

13. The thermal storage gas treating apparatus using a rotation selector valve as defined in claim 11, comprising:

a plurality of thermal storage chambers containing a thermal storage medium, each of the thermal storage chambers having one end thereof connected through a gas passage to a combustion chamber having a combustion device, each of the thermal storage chambers having the other end thereof connected through gas passages acting as the auxiliary passages to individual ones of the plurality of auxiliary valve ports at a side remote from the main valve component; and a feed passage of a gas to be treated, and an exhaust passage of a treated gas, connected through gas passages acting as the main passages to a gas supplying one of the main valve ports and a gas exhausting one of the main valve ports, respectively, at a side remote from the auxiliary valve component.

14. The thermal storage gas treating apparatus using a rotation selector valve as defined in claim 12, comprising:

a plurality of thermal storage chambers containing a thermal storage medium, each of the thermal storage chambers having one end thereof connected through a gas passage to a combustion chamber having a combustion device, each of the thermal storage chambers having the other end thereof connected through gas passages acting as the auxiliary passages to individual ones of the plurality of auxiliary valve ports at a side remote from the main valve component; and a feed passage of a gas to be treated, and an exhaust passage of a treated gas, connected through gas passages acting as the main passages to a gas supplying one of the main valve ports and a gas exhausting one of the main valve ports, respectively, at a side remote from the auxiliary valve component.

15. A rotation selector valve comprising:

a valve member rotatable in slidable contact with a valve seat plate, the valve seat plate defining a plurality of selectable passage ports arranged in a direction of rotation of the valve member;

the valve member defining an internal passage having a selecting side opening at one end thereof for becoming opposed to and communicating with the plurality of selectable passage ports successively with rotation of the valve member, and a common side opening at the other end movable in the direction of rotation of the valve member;

a passage chamber in constant communication with the common side opening of the internal passage during rotation of the valve member, the passage chamber having a common passage port formed in one location in the direction of rotation of the valve member;

wherein the rotation selector valve comprises a resistance adjusting device that becomes an operative state for applying a fluid passage resistance to a fluid passage between the selectable passage ports opposed to and communicating with the selecting side opening of the internal passage and the common passage port when the common side opening of the internal passage approaches the common passage port by movement in the direction of rotation of the valve member accompanying the rotation of the valve member, and an inoperative state for removing the resistance when the common side opening of the internal passage moves away from the common passage port by movement in the direction of rotation of the valve member accompanying the rotation of the valve member.

16. The rotation selector valve as defined in claim 15, wherein the resistance adjusting device comprises a fixed resistance plate formed in the passage chamber and becoming facially opposed to the common side opening of the internal passage in a position adjacent the valve member and away from the common passage port when the common side opening of the internal passage approaches the common passage port by movement in the direction of rotation of the valve member accompanying the rotation of the valve member.

17. The rotation selector valve as defined in claim 15, wherein the resistance adjusting device is constructed to increase the resistance gradually as the common side opening of the internal passage approaches the common passage port by movement in the direction of rotation of the valve member accompanying the rotation of the valve member, and to decrease the resistance gradually as the common side opening of the internal passage moves away from the common passage port by movement in the direction of rotation of the valve member accompanying the rotation of the valve member.

18. The rotation selector valve as defined in claim 16, wherein the resistance adjusting device is constructed to increase the resistance gradually as the common side opening of the internal passage approaches the common passage port by movement in the direction of rotation of the valve member accompanying the rotation of the valve member, and to decrease the resistance gradually as the common side opening of the internal passage moves away from the common passage port by movement in the direction of rotation of the valve member accompanying the rotation of the valve member.

19. The rotation selector valve as defined in claim 15, wherein:

the internal passage comprises a first internal passage and a second internal passage formed in the valve member, a selecting side opening of the first internal passage and a selecting side opening of the second internal passage being formed in the valve member and arranged to become opposed to and communicate with the plurality of selectable passage ports successively with rotation of the valve member, with an arranging condition of not becoming opposed to or communicating with the same one of the selectable passage ports simultaneously;

the passage chamber comprises a first internal passage chamber and a second passage chamber, respectively, in constant communication with common side openings of the first and second internal passages movable in the direction of rotation of the valve member with rotation of the valve member;

the common passage port comprises a first common passage port formed in one location of the first passage chamber in the direction of rotation of the valve member, and a second common passage port formed in one location of the second passage chamber in the direction of rotation of the valve member; and the resistance adjusting device is disposed in at least one of a fluid passage associated with the first internal passage and a fluid passage associated with the second internal passage.

20. A thermal storage gas treating apparatus using a rotation selector valve as defined in claim 19, comprising:

a plurality of thermal storage chambers containing a thermal storage medium, each of the thermal storage chambers having one end thereof connected through a gas passage to a combustion chamber having a combustion device, each of the thermal storage chambers having the other end thereof connected through gas passages to the plurality of selectable passage openings at a side remote from the valve member; and an exhaust passage of a treated gas connected to the first common passage port from outside the first passage chamber, and a feed passage of a gas to be treated connected to the second common passage port from outside of the second passage chamber.

21. A thermal storage gas treating apparatus comprising:

a permeable, thermal storage medium layer disposed in each of a plurality of gas entrance/exit sections communicating with a combustion chamber;

at least a portion of the thermal storage medium layer having passed a hot treated gas discharged from the combustion chamber in a preceding step passing a gas to be treated to the combustion chamber in a following step; and a switching device disposed in a gas supply and exhaust passage communicating with the combustion chamber for successively switching the thermal storage medium layers for passing the gas to be treated to the combustion chamber, and the thermal storage medium layers for passing the treated gas from the combustion chamber;

wherein the thermal storage gas treating apparatus comprises a cooling device for cooling the treated gas from the combustion chamber, in a passage portion, of the gas supply and exhaust passage, from the treated gas exit of each of the thermal storage medium layers to the switching device, or in a treated gas entrance portion of the switching device.

22. The thermal storage gas treating apparatus as defined in claim 21, comprising:

a main valve component and an auxiliary valve component rotatable relative to each other, with mutually opposed surfaces located close to each other;

a plurality of supply and exhaust ports formed in an opposite surface of the auxiliary valve component opposed to the main valve component, and arranged in a direction of the relative rotation about an axis of the relative rotation;

the main valve component defining, as partitioned from each other, a passage for the gas to be treated, and a passage for the treated gas;

a supply opening acting as a passage port of the passage for the gas to be treated, and an exhaust opening acting as a passage port of the passage for the treated gas, formed in an opposite surface of the main valve component opposed to the auxiliary valve component, and arranged in the direction of rotation about the axis of rotation, such that the supply opening and the exhaust opening successively oppose to the plurality of supply and exhaust ports as a result of the relative rotation, and do not simultaneously oppose to the same one of the supply and exhaust ports;

the main valve component and the auxiliary valve component being rotatable relative to each other with a seal element disposed between the opposite surfaces thereof, to switch each of the thermal storage medium layers between a state of passing the gas to be treated to the combustion chamber and a state of passing the treated gas from the combustion chamber; and the main valve component and the auxiliary valve component constituting a rotation selector valve acting as the switching device.

23. The thermal storage gas treating apparatus as defined in claim 21, wherein the cooling device is constructed to spray cooling water to the treated gas discharged from the combustion chamber, thereby cooling the treated gas.

24. The thermal storage gas treating apparatus as defined in claim 23, wherein the cooling device is constructed to spray cooling water to the seal element disposed adjacent the exhaust opening, thereby cooling the seal element disposed adjacent the exhaust opening as well as the treated gas from the combustion chamber.

25. The thermal storage gas treating apparatus as defined in claim 23, wherein the cooling device is constructed to spray cooling water in the passage for the treated gas in the main valve component toward the exhaust opening, thereby cooling the treated gas from the combustion chamber.

26. The thermal storage gas treating apparatus as defined in claim 21, further comprising an interlocking device operable, in response to switching of the gas passing states by the switching device, to switch a plurality of cooling devices arranged in parallel passage portions extending from the exits of the treated gas in the thermal storage medium layers to the switching device, or in the treated gas entrance portions of a plurality of switching devices respectively provided for the thermal storage medium layers.

27. The thermal storage gas treating apparatus as defined in claim 21, further comprising temperature sensors for detecting temperature of the treated gas discharged from the combustion chamber, in positions upstream of cooling positions of the cooling device with respect to a flowing direction of the treated gas, the cooling device being operated based on the temperature detected by the temperature sensors.

28. The thermal storage gas treating apparatus as defined in claim 21, further comprising temperature sensors for detecting temperature of the treated gas discharged from the combustion chamber, in positions upstream of cooling positions of the cooling device with respect to a flowing direction of the treated gas, an amount of cooling by the cooling device being adjusted based on the temperature detected by the temperature sensors.

29. A thermal storage medium cleaning method for a thermal storage gas treating apparatus as defined in claim 21, the thermal storage medium cleaning method comprising:

maintaining a temperature of exit portions of the treated gas in the thermal storage medium layers at a predetermined cleaning temperature by passing a cleaning gas heated in the combustion chamber; and burning or evaporating objects to be removed that have accumulated in the exit portions of the treated gas in the thermal storage medium layers.

30. The thermal storage medium cleaning method as defined in claim 29, wherein a cleaning operation for passing the cleaning gas through the thermal storage medium layers is carried out successively for the plurality of thermal storage medium layers in response to switching of the gas passing states by the switching device.

* * * * *